US012756486B2

(12) United States Patent
Harpe et al.

(10) Patent No.: US 12,756,486 B2
(45) Date of Patent: Oct. 6, 2026

(54) DISTRIBUTED RADIO FREQUENCY SIGNAL PROCESSING SYSTEMS AND METHODS

(71) Applicant: Distributed Spectrum Inc., New York, NY (US)

(72) Inventors: Benjamin Harpe, New York, NY (US); Alexander Wulff, New York, NY (US); Isaac Struhl, New York, NY (US); Samuel Wolfson, White Plains, NY (US); Kalman Chapman, New York, NY (US); Eric Fernandez, Jersey City, NJ (US)

(73) Assignee: Distributed Spectrum Inc., New York, NY (US)

( * ) Notice: Subject to any disclaimer, the term of this patent is extended or adjusted under 35 U.S.C. 154(b) by 337 days.

(21) Appl. No.: 18/637,387

(22) Filed: Apr. 16, 2024

(65) Prior Publication Data

US 2024/0348354 A1 Oct. 17, 2024

Related U.S. Application Data

(60) Provisional application No. 63/602,105, filed on Nov. 22, 2023, provisional application No. 63/459,972, filed on Apr. 17, 2023.

(51) Int. Cl.
*H04B 17/309* (2015.01)
*H04B 17/336* (2015.01)
(Continued)

(52) U.S. Cl.
CPC ......... *H04B 17/391* (2015.01); *H04B 17/309* (2015.01); *H04B 17/336* (2015.01);
(Continued)

(58) Field of Classification Search
None
See application file for complete search history.

(56) References Cited

U.S. PATENT DOCUMENTS 9,485,266 B2 11/2016 Baxley et al.
9,485,267 B2 11/2016 Baxley et al.
(Continued)

FOREIGN PATENT DOCUMENTS

EP 3910822 A1 11/2021

OTHER PUBLICATIONS

U.S. Appl. No. 18/637,351, filed Apr. 16, 2024, Harpe et al.
(Continued)

*Primary Examiner* — Shukri Taha
(74) *Attorney, Agent, or Firm* — Wolf, Greenfield & Sacks, P.C.

(57) ABSTRACT

Described herein are RF systems and techniques for detecting the presence of and/or characterizing RF signals among RF radiation received by the system. In some embodiments, RF signal characterization may be achieved with high accuracy and low sensitivity while using low cost, scalable electronics that are versatile for deployment in a variety of environments, whether centralized, distributed, and/or vehicle-based. In some embodiments, underlying such systems and techniques are trained models that may be executed by a processor and configured to detect the presence of and/or characterize received RF signals. In some embodiments, received RF signals may be encoded into compact data structure representations that may be transmitted over low bandwidth links and/or processed using fewer computing resources than processing the underlying RF radiation data itself, facilitating deployment of distributed RF sensing systems.

20 Claims, 46 Drawing Sheets

(51) Int. Cl.
*H04B 17/391* (2015.01)
*H04W 24/10* (2009.01)

(52) U.S. Cl.
CPC ..... *H04B 17/3912* (2015.01); *H04B 17/3913* (2015.01); *H04W 24/10* (2013.01)

(56) References Cited

U.S. PATENT DOCUMENTS

| | | | |
|---|---|---|---|
| 9,551,781 B2 | 1/2017 | Baxley et al. | |
| 9,560,060 B2 | 1/2017 | Baxley et al. | |
| 9,591,013 B2 | 3/2017 | Baxley et al. | |
| 9,635,044 B2 | 4/2017 | Baxley et al. | |
| 9,736,175 B2 | 8/2017 | Baxley et al. | |
| 9,739,868 B2 | 8/2017 | Baxley et al. | |
| 9,880,256 B2 | 1/2018 | Baxley et al. | |
| 9,945,928 B2 | 4/2018 | Baxley et al. | |
| 10,104,098 B2 | 10/2018 | Baxley et al. | |
| 10,122,736 B2 | 11/2018 | Baxley et al. | |
| 10,338,191 B2 | 7/2019 | Baxley et al. | |
| 10,473,749 B1 | 11/2019 | Baxley et al. | |
| 10,578,730 B2 | 3/2020 | Cardno et al. | |
| 11,259,197 B2 | 2/2022 | Dzierwa et al. | |
| 11,347,967 B2 * | 5/2022 | Cruz | G06F 18/2155 |
| 11,916,605 B2 | 2/2024 | Wulff et al. | |
| 2005/0174961 A1 | 8/2005 | Hrastar | |
| 2007/0198445 A1 | 8/2007 | Zen | |
| 2013/0064328 A1 | 3/2013 | Adnani et al. | |
| 2013/0234894 A1 | 9/2013 | Oka et al. | |
| 2016/0127907 A1 | 5/2016 | Baxley et al. | |
| 2016/0127931 A1 * | 5/2016 | Baxley | G06T 7/60 455/67.16 |
| 2017/0026222 A1 * | 1/2017 | Butussi | H04L 27/2649 |
| 2017/0222719 A1 | 8/2017 | Haas et al. | |
| 2017/0238304 A1 | 8/2017 | Ling et al. | |
| 2017/0261615 A1 | 9/2017 | Ying et al. | |
| 2018/0324595 A1 | 11/2018 | Shima | |
| 2020/0252412 A1 | 8/2020 | Prasad Koppisetti et al. | |
| 2020/0327397 A1 * | 10/2020 | Govea | H04L 27/36 |
| 2021/0091829 A1 | 3/2021 | Shake et al. | |
| 2022/0070822 A1 | 3/2022 | Behboodi et al. | |
| 2022/0386249 A1 | 12/2022 | Meshkati et al. | |
| 2022/0399946 A1 | 12/2022 | Marshall | |
| 2023/0021777 A1 | 1/2023 | Wulff et al. | |
| 2023/0027182 A1 | 1/2023 | Wulff et al. | |
| 2023/0027893 A1 * | 1/2023 | Wulff | H04B 17/102 |
| 2024/0348348 A1 | 10/2024 | Harpe et al. | |
| 2024/0348353 A1 | 10/2024 | Harpe et al. | |
| 2024/0348355 A1 | 10/2024 | Harpe et al. | |

OTHER PUBLICATIONS

U.S. Appl. No. 18/637,369, filed Apr. 16, 2024, Harpe et al.
U.S. Appl. No. 18/637,380, filed Apr. 16, 2024, Harpe et al.
PCT/US2022/038012, Oct. 6, 2022, International Search Report and Written Opinion.
PCT/US2022/038012, Feb. 1, 2024, International Preliminary Report on Patentability.
International Search Report and Written Opinion dated Oct. 6, 2022, in connection with International Application No. PCT/US2022/038012.
International Preliminary Report on Patentability dated Feb. 1, 2024, in connection with International Application No. PCT/US2022/038012.
[No Author Listed], Fireside Hacks: A Conversation with Distributed Spectrum | NSIN Track. YouTube. Oct. 19, 2021. https://www.youtube.com/watch?v=CquBWk4Jq4E [Last Accessed Aug. 17, 2020]. 3 pages.
[No Author Listed], Modular , Real-Time RF Spectrum. Distributed Spectrum. 2021. 9 pages.
[No Author Listed], Modular and Highly-Scalable Spectrum. Distributed Spectrum, LLC. 2021. 1 page.
[No Author Listed], OmniSIG Sensor and the DeepWave AIR-T. DeepSig Blog. Apr. 13, 2021. 4 pages. https://www.deepsig.ai/news/omnisig-sensor-and-the-deepwave-air-t (Last accessed Aug. 7, 2023).
[No Author Listed], Radio Frequency Detection, Spectrum Analysis, and Direction Finding Equipment. Market Survey Report. NUSTL. Apr. 2019. 22 pages.
[No Author Listed], Report ITU-R SM.2355-1. SM Series Spectrum Management. 2019. 34 pages.
[No Author Listed], RTL-SDR Blog V3 Datasheet. https://www.rtl-sdr.com [Last Accessed Aug. 17, 2022] 8 pages.
[No Author Listed], TDOA Transmitter Localization with RTL-SDRs. Panoradio SDR. Jun. 8, 2022. 14 pages.
Aksu et al. Requirements for Spectrum Monitoring in Industrial Environments. NISTIR 8195. Nov. 2017. 24 pages.
Bhattacharya et al., Selection of Sensors for Efficient Transmitter Location. IEEE Infocom. 2020:2410-2419.
Cheng et al., An Algorithm for Jammer Localization in Wireless Sensor Networks. IEEE 26th International Conference on Advanced Information Networking and Applications. 2012:724-731.
Ezzati et al. Distributed Spectrum Sensing Using Radio Environment Maps in Cognitive Radio Networks. Wireless Pers Communication. 2018;101:2241-2254.
Figueiredo et al., Low Cost SDR Solution for Spectrum Sensing. ResearchGate. Jul. 2015. 6 pages.
Hanna et al., Deep Learning Based Transmitter Identification using Power Amplifier Nonlinearity. arXiv:. Nov. 12, 2018; 1811.04521(1):7 pages.
Harp et al., Machine Vision and Deep Learning for Deep Learning for Classification of Radio SETI Signals. arXiv: Feb. 6, 2019;1902.02426: 31 pages.
Haykin et al., Cognitive Radio: Brain-empowered wireless communications. IEEE Journal on Selected Areas in Comm. Feb. 2005;23(2):201-220.
Kumar et al., LTE Radio Analytics Made Easy and Accessible. SIGCOMM. Aug. 17-22, 2014. 12 pages.
Li et al., A Deep Convolutional Network for Multi-Type Signal Detection in Spectrogram. Preprints. May 12, 2020. 13 pages.
Li et al., Scaling Deep Learning Models for Spectrum Anomaly Detection. ACM.Jul. 2-5, 2019. 10 pages.
Morin et al., Deep Learning-based Transmitter identification on the physical layer. 2020. 23 pages.
Mosiane et al., Radio Frequency Interference Detection Using Machine Learning. IEEE Radio and Antenna Days of The Indian Ocean. IOP Conf. Series: Materials Science and Engineering. 2017;198(012012):5 pages.
Nika et al., Empirical Validation of Commodity Spectrum Monitoring. SenSys. Nov. 14-16, 2016. 12 pages.
O'Shea et al., Over the Air Deep Learning Based Radio Signal Classification. arXiv:1712.04578v1. 13 pages.
O'Shea et al., Practical Signal Detection and Classification in GNU Radio. Proceedings of the SDR 07. Technical Conference and Product Exposition. 2007. 6 pages.
Pfammatter et al., A Software-defined Sensor Architecture for Large-scale Wideband Spectrum Monitoring. IPSN. Apr. 14-16, 2015. 12 pages.
Robertson et al., Distributed Transmitter Localization by Power Difference of Arrival (PDOA) on a Network of GNU Radio Sensors. Naval Research Laboratory. Feb. 3, 2015:16 pages.
Schmitz et al., Demonstration Abstract: Real-time Indoor Localization with TDOA and Distributed Software Defined Radio. IEEE. 2016. 2 pages.
Yiwere et al., Sound Source Distance Estimation Using Deep Learning: An Image Classifcaiton Approach. Sensors. 2020;20(172):19 pages.
Zha et al., A Deep Learning Framework for Signal Detection and Modulation Classification. Sensors. 2019; 19(4042): 21 pages.
Zubow et al., DeepTxFinder: Multiple Transmitter Localization by Deep Learning in Crowdsourced Spectrum Sensing. 2020 29th International Conference on Computer Communications and Networks (ICCCN). 2020:1-8.
International Search Report and Written Opinion mailed Jul. 24, 2024, in connection with International Application No. PCT/US2024/024828.

(56) References Cited

OTHER PUBLICATIONS

Hall et al., Reference Datasets for Training and Evaluating RF Signal Detection and Classification Models. IEEE. 2019. 5 Pages.
Draganov et al., Open Set Recognition through Unsupervised and Class-Distance Learning. Association for Computing Machinery. WiseML'20. Jul. 13, 2020. 7 Pages. doi.org/10.1145/3395352.3402901.
Shen et al., Radio Frequency Fingerprint Identification for Security in Low-Cost IoT Devices. 55th Asilomar Conference on Signals, Systems, and Computers. 2021. 5 Pages. doi:10.1109/IEEECONF53345.2021.9723287.
Shi et al., Deep Learning for RF Signal Classification in Unknown and Dynamic Spectrum Environments. IEEE International Symposium on Dynamic Spectrum Access Networks. 2019. 10 pages.
Xie et al., Few-Shot Unsupervised Specific Emitter Identification Based on Density Peak Clustering Algorithm and Meta-Learning. IEEE Sensors Journal. Sep. 15, 2022;22(18):18008-20.

* cited by examiner

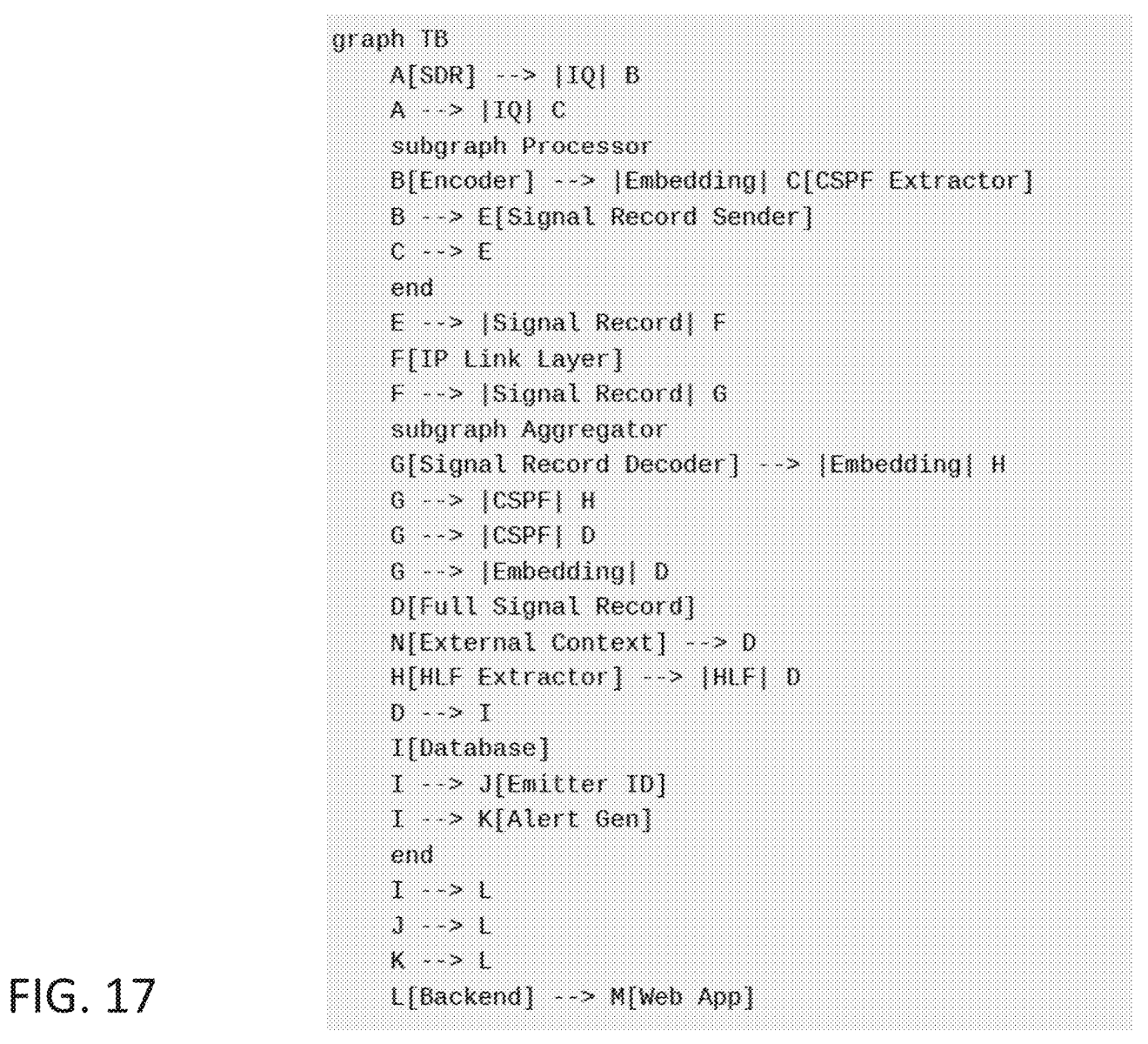

```
graph TB
    A[SDR] --> |IQ| B
    A --> |IQ| C
    subgraph Processor
    B[Encoder] --> |Embedding| C[CSPF Extractor]
    B --> E[Signal Record Sender]
    C --> E
    end
    E --> |Signal Record| F
    F[IP Link Layer]
    F --> |Signal Record| G
    subgraph Aggregator
    G[Signal Record Decoder] --> |Embedding| H
    G --> |CSPF| H
    G --> |CSPF| D
    G --> |Embedding| D
    D[Full Signal Record]
    N[External Context] --> D
    H[HLF Extractor] --> |HLF| D
    D --> I
    I[Database]
    I --> J[Emitter ID]
    I --> K[Alert Gen]
    end
    I --> L
    J --> L
    K --> L
    L[Backend] --> M[Web App]
```

FIG. 17

DISTRIBUTED RADIO FREQUENCY SIGNAL PROCESSING SYSTEMS AND METHODS

RELATED APPLICATIONS

This application claims the benefit under 35 U.S.C. § 119 (c) of U.S. Provisional Application Ser. No. 63/459,972, filed Apr. 17, 2023, and entitled "VEHICLE-BASED RADIO-FREQUENCY SIGNAL PROCESSING SYSTEMS AND METHODS," the contents of which are herein incorporated by reference in their entirety.

This application claims the benefit under 35 U.S.C. § 119 (c) of U.S. Provisional Application Ser. No. 63/602,105, filed Nov. 22, 2023, and entitled "LIGHTWEIGHT, SPACE-EFFICIENT RADIO-FREQUENCY SIGNAL PROCESSING SYSTEMS AND METHODS," the contents of which are herein incorporated by reference in their entirety.

BACKGROUND

Radio frequency (RF) systems may include one or more transmitters and/or receivers and may be deployed in indoor and/or outdoor environments, such as for short and long range communication and/or radar applications. Such RF systems are susceptible to RF interference from other transmitters in the environment that broadcast RF signals in the operating frequency range of the RF system.

Some existing systems detect the presence of RF signals using one or more RF receivers. Some existing systems process RF signals to determine the location of the source of the RF signals. For example, in a time difference of arrival (TDOA) system, multiple RF receivers may be positioned in different locations to receive and process the same RF signal, and time differences between the arrival of the RF signal at the different RF receivers may be used to determine the location of the source of the RF signal relative to the RF receivers.

BRIEF SUMMARY

The present disclosure provides RF systems and techniques for detecting the presence of RF signals among RF radiation received by the system, determining the type of RF source that transmitted the RF signals, and/or determining the location of the RF source with high precision and low sensitivity while using low cost, scalable electronics that are versatile for deployment in a variety of environments. In some embodiments, underlying such systems and techniques are trained models that may be executed by a processor and configured to detect the presence of received RF signals, identify a type of RF source that sent the RF signals, and/or determine the location of the RF source in the surrounding geographical area. The inventors recognized that RF signals may be detected and RF sources classified and located based on unique RF signal characteristics that are detectable using trained models described herein, even in high noise or non-line of sight (LOS) environments and with low cost, low resolution RF receiver hardware.

The inventors recognized that existing systems for RF signal detection are inflexible, expensive, and lack portability, which limits the utility of such systems in a wide variety of applications. For example, TDOA systems are often used to calculate the precise arrival times of received RF signals in order to locate the source of the RF signals with sufficient accuracy to be useful. However, to achieve satisfactory performance, such systems typically rely on RF receivers with expensive, high-resolution electronics with ultra-precise, synchronized clocks and/or high digital signal sampling rates. Currently, a typical system employing high resolution electronics and ultra-precise clocks costs hundreds of thousands of dollars to implement. A low-end system having a small number of sensors currently costs at least tens of thousands of dollars to implement. In addition, non-LOS environments typically demand dense arrangements of sensors, resulting in high implementation cost.

In some embodiments, systems described herein may employ a processing architecture conducive to distributed execution, facilitating the use of low cost, low power, and/or highly portable RF sensors in network communication (e.g., over a low-bandwidth link) with remote computing systems for further downstream RF signal processing. For example, RF processing architectures described herein may be configured to encode one or more RF signals detected onboard an RF sensor (e.g., among digital samples of RF radiation received by the RF sensor) into an output readable (e.g., as an input) by a trained model and/or that may be analyzed using its encoded content, and then the input may be transmitted over a low bandwidth link to a separate computer system (e.g., base station and/or another RF sensor) to be decoded and/or subsequently processed as-is by one or more trained models and/or using statistical (e.g., regressive) techniques. In some embodiments, RF signal encoding may be performed using a trained model executed onboard an RF sensor using relatively few computing resources, which may permit execution onboard low cost, low power, and highly portable RF sensors. In some embodiments, RF signal encodings made onboard an RF sensor may be lossy, reducing the amount of bandwidth necessary for transmission, which may be achieved by training an encoding model together with models used downstream for decoding and/or subsequent processing.

In some embodiments, processing architectures described herein may facilitate co-locating one or more RF sensors with a vehicle (e.g., drone). For example, the RF sensor(s) may be integrated with and/or within the vehicle, and/or may be affixed to the vehicle. In some embodiments, processing architectures described herein may be further configured to receive information from one or more systems onboard the vehicle (e.g., data from a global navigational satellite system (GNSS) device and/or inertial measurement unit (IMU), vehicle bearing data, and/or temperature data). For example, such information may be used in conjunction with a trained model (e.g., executed on the RF sensor and/or a separate computing system in communication with the RF sensor) to enhance accuracy and/or precision of localizing RF sources in the environment (e.g., with respect to the location of the RF sensor and/or vehicle). Some embodiments may include a network link between an RF sensor and a separate computing system (e.g., centralized and/or distributed computing system and/or another RF sensor) for reception of real-time detected RF signal characteristics, identified RF sources, and/or predicted locations of RF sources from the RF sensor, such as for displaying resulting information to an operator of the vehicle during flight. Alternatively or additionally, some embodiments may provide for offloading information from an RF sensor following completion of deployment (e.g., after completion of a flight), with processing performed onboard the RF sensor prior to offloading and/or performed on a separate computing system after offloading.

In some embodiments, systems described herein may be configured to provide RF characteristic data (e.g., indications and/or samples of detected RF signals and/or features, such as frequency information, thereof) to an interface (e.g., over a network link) for a user and/or vehicle system (e.g., of an autonomous and/or semi-autonomous vehicle) to access. For example, where an RF sensor is configured to send RF signal encodings to a separate computer system, the separate computer system may be configured to provide RF characteristic data to the interface, though the RF sensor may be alternatively or additionally configured to provide RF characteristic data directly to the interface.

It should be appreciated, however, that processing architectures described herein may be performed entirely on one computer system (e.g., entirely onboard an RF sensor) without departing from the scope of the present aspects. For example, an RF sensor may be configured to extract RF characteristics and/or RF signal data (e.g., samples and/or a time-frequency representation of an RF signal) and provide that data to an interface directly. Alternatively or additionally, an RF sensor may be configured to encode received RF signals and perform, on the RF sensor, further processing steps such as described above being executed on a separate computer system.

The inventors recognized that the potential for modularity in processing architectures described herein may permit flexible deployment of the same processing pipeline in both standalone and networked component configurations. For example, in one configuration, RF signal data may be encoded onboard an RF sensor and processed by a downstream trained model executed on the same RF sensor. For instance, some applications may benefit from little to no wireless network communication between RF sensors and other computer systems to prevent detection of the RF sensors by another system. Some applications may benefit from using a standalone (e.g., battery-powered) RF sensor deployed in a static location using low power, such that the RF sensor may be active for long periods of time. In another configuration, RF signal data may be encoded onboard an RF sensor and processed by a downstream trained model executed by a separate (e.g., network linked) computer system. In some cases, the same system may be easily reconfigured and/or switched between operating modes due to modularity in the processing architecture, such as by permitting the same trained encoding techniques to be executed on both standalone and networked RF sensors. While some implementations may include a network link between such an RF sensor and a separate computing system for reception of real-time detected RF signal characteristics, identified RF sources, and/or predicted locations of RF sources from the RF sensor, some implementations may offload such information from an RF sensor following completion of deployment.

Some aspects of the present disclosure relate, at least in part, to generating and/or processing an encoding (e.g., vector representation) of an RF signal. For example, an encoding of an RF signal may be output by a trained model in response to receiving RF radiation data (e.g., digital samples of RF radiation) as an input. For example, the trained model may encode characteristics of an RF signal within the RF radiation data into content in dimensions of a vector representation. In some embodiments, an encoding (e.g., vector representation) may be compressed with respect to the RF radiation data input to the trained model, such that characteristics of the RF signal may be contained, exchanged, and/or analyzed in a compact data structure. Downstream components of the system (e.g., trained in tandem with the trained model) may be configured to analyze and/or unpack characteristics of the encoding, making it unnecessary for encodings to be human-readable, which may assist in making encodings compact as compared to the RF radiation data from which they are generated.

The inventors have recognized that encodings of RF signals, according to some embodiments, provide a useful tool for analyzing RF signals, individually and/or with respect to other RF signals, using few computing resources, and/or in a distributed system in which information about an RF signal may be exchanged over a low bandwidth network link. As one example, an encoding of a received RF signal may be generated at an RF sensor and transmitted to a computer (e.g., over a low bandwidth link) for further individual processing of the RF signal. As another example, an encoding of a previously received RF signal may be transmitted (e.g., over a low bandwidth link) to an RF sensor for comparing against newly received RF signals, such as to determine whether the same RF signal or a similar RF signal (e.g., from the same RF source or a same type of RF source) has been received. As yet another example, a computer having a database of encodings of received RF signals may perform computationally efficient analysis (e.g., grouping and/or comparison) of a wide variety of RF signals (e.g., live or recorded at various times), across a variety of characteristics, and without needing to operate directly on digital samples of the RF signals.

In some embodiments, encodings may be configured to provide both qualitative and quantitative analyses of RF signals, including analysis of well-defined, common quantitative radio frequency characteristics such as frequency and power level, as well as qualitative characteristics, which may not be as well-defined, such as to what extent a signal appears to be digital or analog, AM or FM, and/or similar to a reference signal used for comparison. For example, an encoding may provide a vector representation of an RF signal having contents in dimensions of the vector representation that may be analyzed to associate the RF signal with other RF signals or groups of RF signals having similar characteristics, whether the similar characteristics are well-defined within the RF field (e.g., modulation type) or not (e.g., at least 75% similar to a CDMA, low band cell phone signal).

In some embodiments, a method of determining a characteristic of an RF signal may include obtaining a vector representation of an RF signal generated using digital samples of RF radiation received by an RF sensor. For example, the vector representation may be obtained onboard and/or from the RF sensor (e.g., via an RF-front end of the RF sensor and/or received at a computer remote from the RF sensor over a communication network). In some embodiments, the method may further include performing a processing step selected from the group consisting of detecting a presence of the RF signal among the RF radiation and determining a characteristic of the RF signal. For example, the vector representation may be a compressed version of RF radiation data including the RF signal that is indicative of the presence and/or characteristics of the RF signal. For instance, a vector representation may be a compressed version of an RF signal by having content encoded in dimensions of the vector representation that express characteristics of the RF signal using less data than digital samples or a time-frequency representation of the RF signal, such that the compressed version may be used to reconstruct the RF signal and/or to analyze the RF signal in place of the RF signal in some respects. In some embodiments, the method may further include determining a characteristic of the RF signal using the vector representation. For example, the characteristic may include frequency and/or modulation information of the RF signal.

In some embodiments, the method may further include receiving the RF radiation, including the RF signal, at the RF sensor. For example, the RF radiation may be received at the RF sensor (e.g., by an RF-front end) and sampled, and the samples may be obtained by a processor of the RF sensor.

In some embodiments, the method may further include identifying, among the digital samples of the RF radiation, a subset of the digital samples indicating the RF signal. For example, the subset of the digital samples may be identified using a signal detection model (e.g., a trained signal detection model). In some embodiments, obtaining the digital samples, generating the vector representation, and determining the characteristic may use the subset of the digital samples indicating the RF signal. For example, a vector representation may be generated to represent only the subset of the digital samples indicating the RF signal. In some embodiments, identifying the subset of the digital samples indicating the RF signal may be performed at least in part by inputting the digital samples to a trained model and obtaining the indication of the subset of the digital samples as an output from the trained model. For example, the trained model may be configured to output a time-frequency representation (e.g., spectrogram) of the subset of the digital samples, and/or may be configured to output the subset of the digital samples (e.g., filtered from the rest of the digital samples input to the model).

In some embodiments, obtaining the vector representation may include obtaining the digital samples of the RF radiation via an RF antenna of the RF sensor that received the RF radiation and may further include generating, by a same processor as obtained the digital samples, the vector representation of the RF signal extracted from the RF radiation. In some embodiments, a same processor that obtained the digital samples and generated the vector representation may be configured to transmit the vector representation over a communication network. Alternatively or additionally, in some embodiments, obtaining the vector representation may include receiving the vector representation over a communication network from an RF sensor that received the RF radiation and generated the vector representation. For example, a same processor that received the vector representation over the communication network may perform the processing step.

In some embodiments, where the vector representation is received over a communication network from an RF sensor, the vector representation may be received together with an indication of a second characteristic selected from the group consisting of a confidence metric of the RF signal being amplitude modulated (AM); a confidence metric of the RF signal being frequency modulated (FM); a confidence metric of the RF signal being a chirp; a confidence metric of the RF signal being frequency-shift keyed (FSK); a confidence metric of the RF signal being amplitude-shift keyed (ASK); a confidence metric of the RF signal being phase-shift keyed (PSK); a confidence metric of the RF signal being a chirp spread spectrum (CSS); and a confidence metric of the RF signal being constellation modulated.

In some embodiments, the characteristic may include a center frequency, operating frequency band, power level, bandwidth, modulation type, pulse rate, and/or signal-to-noise ratio (SNR) of the RF signal, an extent to which the RF signal matches another RF signal, an extent to which the RF signal is analog and/or digital, and/or a type and/or location of an RF source that transmitted the RF signal. For example, such characteristics may be obtained by processing the vector representation through a model trained on vector representations generated by another trained model. In some embodiments, multiple characteristics, selected from among center frequency, operating frequency band, power level, bandwidth, modulation type, pulse rate, and/or signal-to-noise ratio (SNR) of the RF signal, extent to which the RF signal matches another RF signal, and/or extent to which the RF signal is analog and/or digital, may be determined using the vector representation of the RF signal.

In some embodiments, the digital samples may include in-phase and quadrature (I/Q) samples of the RF radiation. For example, the RF radiation may be digitized (e.g., by an RF front end of the RF sensor) to provide the I/Q samples. In some embodiments, the I/Q samples may be provided by a software-defined radio (SDR) (e.g., executed onboard the RF sensor).

In some embodiments, the vector representation may include a compressed vector representation of the RF signal output by a trained encoding model. For example, the trained encoding model may be trained similarly to an image compression and/or natural language processing model to generate the compressed vector representation in a form readable to another trained model for further processing.

In some embodiments, determining the characteristic may include inputting the vector representation to a trained model and determining the characteristic based on an output of the trained model. For example, a compressed vector representation of the RF signal may be input to a trained decoding model trained together with a trained encoding model that generated the vector representation to further process representations output by the trained encoding model. In some embodiments, the method may further include obtaining, as an output of the trained decoding model in response to providing the compressed vector representation of the RF signal, a decompressed representation of the RF signal. For example, the decompressed representation may include digital samples indicating an RF signal and/or a time-frequency representation (e.g., a spectrogram) of the RF signal, though the decompressed representation may be at least partially lossy with respect to the digital samples as obtained. In some embodiments, determining the characteristic may be performed using the decompressed representation of the RF signal. For example, the decompressed representation may be input to a model (e.g., trained model) configured to output an indication of the characteristic.

In some embodiments, the vector representation may be indicative of time of reception, frequency, and power levels of the RF radiation that includes the RF signal. For example, the time of reception, frequency, and/or power level may be encoded into the vector representation (e.g., ascertainable by processing using a model trained with a trained encoding model that generated the vector representation) and/or may be included as data together with the vector representation (e.g., ascertainable as one or more time, frequency, and/or power level values). In some embodiments, the vector representation is indicative of a spectrogram of the RF radiation that includes the RF signal (e.g., ascertainable by processing using a model trained with a trained encoding model that generated the vector representation). In some embodiments, the vector representation may be indicative of fewer than 90%, 75%, 50%, and/or 25% of the digital samples of the RF radiation. In some embodiments, the vector representation may be indicative of a time at which extracting was performed (e.g., having encoded therein and/or included there with an extraction timestamp). In some embodiments the vector representation may be indicative of a frequency (e.g., center frequency and/or bandwidth, etc.) of the RF radiation.

In some embodiments, the digital samples may be obtained at a sampling rate of 100 Msps or lower, 50 Msps or lower, 20 Msps or lower, and/or 10 Msps or lower (e.g., 5 Msps).

In some embodiments, the method may further include transmitting the vector representation over a communication network at a data transfer rate less than or equal to 50 kbps, less than or equal to 30 kbps, and/or less than or equal to 20 kbps. In some embodiments, the communication network may use a low power wide area networking (LPWAN) communication protocol. In some embodiments, the communication network may use a LoRaWAN protocol. In some embodiments, the method may further include transmitting the vector representation over a communication network in a message having a size less than or equal to 100 bytes, less than or equal to 50 bytes, and/or less than or equal to 10 bytes.

In some embodiments, the characteristic may include a type and/or location of an RF source that transmitted the RF signal.

In some embodiments, a method of determining a characteristic of an RF signal may include obtaining a vector representation of the RF signal, the vector representation generated using digital samples of RF radiation that includes the RF signal, and determining, using the vector representation, a characteristic of the RF signal. For example, the vector representation may be obtained onboard and/or from an RF sensor (e.g., over a communication network).

In some embodiments, the characteristic may include a center frequency, operating frequency band, power level, bandwidth, modulation type, pulse rate, and/or signal-to-noise ratio (SNR) of the RF signal, an extent to which the RF signal matches another RF signal, and/or an extent to which the RF signal is analog and/or digital. For example, such characteristics may be obtained by processing the vector representation using a trained model trained together with a trained encoding model that generated the vector representation. In some embodiments, multiple characteristics, selected from among center frequency, operating frequency band, power level, bandwidth, modulation type, pulse rate, and/or signal-to-noise ratio (SNR) of the RF signal, extent to which the RF signal matches another RF signal, and/or extent to which the RF signal is analog and/or digital, are determined using the vector representation of the RF signal. In some embodiments, the characteristic may include a type and/or location of an RF source that transmitted the RF signal.

In some embodiments, the vector representation may include a compressed vector representation of the RF signal output by a trained encoding model. In some embodiments, the method may further include providing the compressed vector representation of the RF signal to a trained decoding model (e.g., trained together with the trained encoding model), and obtaining, as an output of the trained decoding model in response to providing the compressed vector representation of the RF signal, a decompressed representation of the RF signal. In some embodiments, determining the characteristic may be performed using the decompressed representation of the RF signal.

In some embodiments, the vector representation may be indicative of time of reception, frequency, and power levels of the RF radiation that includes the RF signal. In some embodiments, the vector representation may be indicative of a spectrogram of the RF radiation that includes the RF signal. In some embodiments, the vector representation is indicative of fewer than 90%, fewer than 75%, fewer than 50%, and/or fewer than 25% of the digital samples of the RF radiation. In some embodiments, the vector representation may be indicative of a time at which extracting was performed. In some embodiments, the vector representation may be indicative of a frequency of the RF radiation.

Some aspects of the present disclosure relate, at least in part, to associating vector representations of a plurality of RF signals using content in dimensions of the vector representations.

In some embodiments, an RF signal processing method may include associating vector representations of a plurality of RF signals, received at one or more RF sensors, using content in dimensions of the vector representations of the plurality of signals. For example, the vector representations may include outputs of one or more trained models in response to the trained model(s) receiving RF radiation data including the plurality of RF signals as input. For instance, the trained model(s) may be executed on an RF sensor that received the plurality of RF signals (e.g., over time), and/or may be executed on multiple RF sensors that received the plurality of RF signals (e.g., at the same and/or at various times).

In some embodiments, the vector representations may be compressed with respect to the RF radiation data. For example, the vector representations may be output by the trained model(s) in a lossy form, such as by having content distinguishing characteristics of the RF signals in dimensions of the vector representations while losing content (e.g., from the underlying RF radiation data) that does not contribute as significantly to distinguishing characteristics of the RF signals.

According to various embodiments, associating the vector representations may include comparing a first vector representation of a first RF signal with a second vector representation of a second RF signal, and/or grouping a first vector representation of a first RF signal with a plurality of associated vector representations of a plurality of associated RF signals. For example, comparison may include determining whether and/or an extent to which the first and second RF signals are a same RF signal, and/or grouping may include determining whether and/or the extent to which characteristics of the first RF signal and the associated RF signals are the same and/or similar. For instance, the vector representations may occupy similar vector space due to similarity in content in dimensions of the vector representations.

In some embodiments, grouping a first vector representation with a plurality of associated vector representations may be based on determining that a vector-based distance between content in dimensions of the first vector representation is within a predetermined threshold of a vector space associated with a category, and the plurality of associated vector representations are associated with the category. For example, a vector-based distance may be a Euclidean distance, and/or may use statistical representation (e.g., mean and/or variance) of the content. In some embodiments, the category may be based on user input received via an interface (e.g., indicating a user instruction to associate applicable RF signals with the category.

In some embodiments, grouping a first vector representation of a first RF signal with a plurality of associated vector representations of a plurality of associated RF signals may be based on determining, using content in dimensions of the first vector representation, that a characteristic of the first RF signal satisfies a constraint, and the constraint may be based on use input received via an interface. For example, statistical analysis of content in dimensions of a vector representation may indicate a confidence metric of a characteristic of the underlying RF signal, which may be compared against a constraint on that characteristic indicated in user input (e.g., indicating a user instruction to associate applicable RF signals satisfying the constraint). In some embodiments, associating vector representations may include determining whether a vector-based distance between content within dimensions of a first vector representation of a first RF signal and content within dimensions of a second vector representation of a second RF signal is within a predetermined threshold. For example, the predetermined threshold may be set as a basis for determining that the first and second RF signals are a same RF signal, from a same RF source, and/or fit a same category.

In some embodiments, associating vector representations may include inputting a first vector representation of a first RF signal into a trained decoder model (e.g., trained with a model that output the vector representation) and, based on an output from the trained decoder model, determining that a characteristic of the first RF signal satisfies a constraint also satisfied by a second vector representation of a second RF signal. For example, the characteristic may be determined using a reconstructed version of RF radiation data of the first RF signal and/or the second RF signal, and/or may indicate a same RF source and/or RF source location of the first RF signal and the second RF signal.

In some embodiments, at least some of the vector representations may be stored in a database and may be loaded from the database for associating.

In some embodiments, the method may include inputting RF radiation data of RF radiation including a first RF signal into a first trained model and obtaining a first vector representation of the first RF signal as an output of the first trained model, and associating the vector representations may include comparing and/or grouping the first vector representation with a second vector representation of a second RF signal based on instructions received over a communication network. For example, the RF radiation data may be received at a processor via an RF antenna of an RF sensor that includes the processor, and the processor may further input the RF radiation data into the first trained model and associate the vector representations. For instance, the instructions may be received at the RF sensor over the communication network (e.g., indicating the second vector representation and/or a grouping that includes the second vector representation) for associating.

In some embodiments, the method may include receiving a first vector representation of a first RF signal over a communication network from an RF sensor that received RF radiation including the first RF signal, and a processor that receives the first vector representation over the communication network may perform the associating. For example, the processor may be configured to perform aggregation with another vector representation (e.g., stored in a database) remote from the RF sensor.

Some aspects of the present disclosure relate, at least in part, to aggregating characteristics of a plurality of RF signals together with sensor information.

In some embodiments, a method of processing a plurality of RF signals received at one or more RF sensors may include aggregating characteristics of the plurality of RF signals together with sensor information to generate aggregated characteristics. For example, the sensor information may include information from sensors other than the RF sensor, such as antenna, GNSS, and/or IMU information, which may be further indicative of characteristics of the RF signals. In some embodiments, the method may further include, using the aggregated characteristics, detecting that the plurality of RF signals include an RF signal received a plurality of times by an RF sensor of the one or more RF sensors, detecting that the plurality of RF signals include an RF signal received by multiple RF sensors of the one or more RF sensors, identifying a type of RF source of an RF signal of the plurality of RF signals, and/or locating an RF source of an RF signal of the plurality of RF signals. For example, the sensor information may indicate detection of the same RF signal (e.g., at the same or a different RF sensor), the type of RF source of the RF signal, and/or the location of the RF source.

In some embodiments, the sensor information may include IMU data of an IMU co-located with an RF sensor of the one or more RF sensors, GNSS (e.g., GPS) data of a GNSS unit co-located with an RF sensor of the one or more RF sensors, temperature data of a temperature monitoring unit co-located with an RF sensor of the one or more RF sensors, vehicle heading and/or bearing data of a vehicle co-located with an RF sensor of the one or more RF sensors, and/or antenna directivity data of an antenna of an RF sensor of the one or more RF sensors. In some embodiments, data indicating the RF signal(s) (e.g., a vector representation thereof) may be input to a trained model (e.g., in combination with some or all sensor information) with the output indicating detection of the same RF signal (e.g., at the same or a different RF sensor) and/or a type and/or location of an RF source of an RF signal.

In some embodiments, the sensor information may include antenna directivity data, and the antenna directivity data may include an orientation and antenna pattern of the RF sensor that is predetermined based on a physical configuration and/or placement of the RF sensor (e.g., one or more directions known to be within the beam of an antenna of the RF sensor). In some embodiments, the method includes locating the RF source, and the RF source is located in a direction from the RF sensor determined based on the orientation and antenna pattern of the RF sensor (e.g., known based on the known direction(s) of the beam(s) of the antenna(s) of the RF sensor).

In some embodiments, the method may further include generating a confidence metric (e.g., probability distribution) for a result of the detection, identification, and/or location. In some embodiments, the method may further include displaying a location of the RF source on a map based on a probability distribution of the confidence metric. For example, the probability distribution may be superimposed on the map, and/or a radius around a point on the map may be displayed as having a certain confidence that the location is within the radius of the point (e.g., based on the probability distribution).

In some embodiments, the sensor information may include the vehicle heading and/or bearing data of the vehicle, and the method may further include displaying a result of the detection, identification, and/or location to an operator of the vehicle (e.g., with respect to the vehicle heading and/or bearing, such as to guide the operator toward the location of the RF source).

In some embodiments, aggregating may include grouping RF signals received from the same RF source (e.g., at the same or different RF sensors). In some embodiments, the characteristics of the plurality of RF signals may indicate different arrival times of the plurality of RF signals at the RF sensor(s) and/or reception of the plurality of RF signals by a plurality of the RF sensor(s). For example, times of reception of the RF signals may themselves be indicative of the same RF signal at the same or different RF sensors, such as when the times of reception are spaced apart too far to correspond to the same RF signal at the same RF sensor and/or when the times of reception are too close to one another in time to correspond to different RF signals at different RF sensors. Alternatively or additionally, comparison of the RF signals (e.g., using a matched filter, a trained model, and/or content in dimensions of vector representations of the RF signals) may be used to detect the same RF signal received at the same or a different RF sensor.

Alternatively or additionally, comparison of the RF signals (e.g., using a matched filter, a trained model, and/or content in dimensions of vector representations of the RF signals) may be used to detect the same RF signal received at the same or a different RF sensor. For example, statistical analysis of (e.g., Euclidean distances between) vector representations of RF signals may indicate a likelihood that the RF signals are the same, and/or at least that the RF signals have similar characteristics.

In some embodiments, aggregating may be performed using a trained model. In some embodiments, the characteristics of the RF signals may include vector representations of the plurality of RF signals extracted from digital samples of RF radiation received at the one or more RF sensors, the RF radiation including the plurality of RF signals. In some embodiments, the vector representations may be generated by inputting the digital samples of the RF radiation to one or more first trained models that output the vector representations, and the aggregation step may include inputting the vector representations to a second trained model that performs the detection, identification, and/or location. For example, the first trained model(s) may include a trained encoding model configured to generate a vector representation and the second trained model may be trained together with the first trained model to further process the vector representation to perform the detection, identification, and/or location.

Some aspects of the present disclosure relate, at least in part, to generating a graphical user interface (GUI) displaying an indication of a predicted location of an RF source.

In some embodiments, a system may include a processor operatively coupled to memory and configured to generate a GUI displaying an indication of a predicted location of an RF source and an indication of a location of an RF sensor. For example, the indications of the predicted location of the RF source and the location of the RF sensor may be displayed as icons on a map of an operating environment in which the RF sensor and RF source are at least predicted to be located. In some embodiments, the predicted location of the RF source may be based on one or more RF signals transmitted by the RF source and received by the RF sensor.

In some embodiments, the indication of the location of the RF sensor may include a location of a vehicle and/or person co-located with the RF sensor. For example, the RF sensor may be mounted to the vehicle and/or worn by the person. In some embodiments, the indication of the location of the RF sensor may include a location of a vehicle co-located with the RF sensor derived from a GNSS device onboard the vehicle. In some embodiments, the indication of the location of the RF sensor may include a known location of the RF sensor stored in the memory.

In some embodiments, the predicted location of the RF source may be obtained using RF radiation data generated by the RF sensor in response to receiving the RF signal(s). In some embodiments, the predicted location of the RF source may be obtained using an output of a trained model generated in response to the trained model receiving the RF radiation data as an input. In some embodiments, the output of the trained model may be generated in response to the trained model further receiving an indication of the location of the RF sensor.

In some embodiments, the predicted location may include a probability distribution over a geographical area. In some embodiments, the GUI may further display an indication of a signal metric of at least one of the RF signal(s). In some embodiments, the signal metric may include an SNR of the RF signal(s). In some embodiments, the GUI may further display at least a portion of a spectrogram that includes the RF signal(s). In some embodiments, the GUI may further include a filter option permitting a user to select one or more types of RF sources for which to display a predicted location.

In some embodiments, the system may further include the RF sensor. In some embodiments, the processor may be configured to receive the predicted location of the RF source over a communication network via an application programming interface (API) (e.g., executed onboard the RF sensor and/or a separate computing system). In some embodiments, the processor may be configured to receive the location of the RF sensor via the API.

Some aspects of the present disclosure relate, at least in part, to displaying characteristics of an RF signal in a GUI.

In some embodiments, an RF signal processing method may include generating a GUI displaying characteristics (e.g., center frequency, bandwidth, signal metric, confidence that an RF signal is analog and/or digital, etc.) of an RF signal, of an RF sensor that received the RF signal (e.g., location), and/or of an RF source of the RF signal (e.g., location and/or type). For example, the characteristics may be based on a vector representation of the RF signal generated using RF radiation data of RF radiation including the RF signal received by the RF sensor.

In some embodiments, the characteristics may be based on an output of a trained model, the output generated in response to the trained model receiving RF radiation data, and the RF radiation data generated by the RF sensor in response to receiving the RF signal. For example, the trained model may be executed onboard the RF sensor. In some embodiments, the vector representation may be compressed with respect to the RF radiation data input to the trained model.

In some embodiments, the characteristics may include a characteristic based on comparing and/or associating the vector representation with a second vector representation of a second RF signal generated using RF radiation data of RF radiation including the second RF signal. For example, content in dimensions of the vector representations may be compared and/or associated (e.g., in vector space) to perform quantitative and/or qualitative comparison and/or association of the underlying RF signals. In some embodiments, the characteristic may indicate an association of the RF signal with the second RF signal based on a vector-based distance between the vector representation and the second vector representation.

In some embodiments, the characteristic may be based on associating the vector representation with the second vector representation based on user input received via the GUI. For example, the GUI may provide for user input (e.g., a reference vector representation and/or a constraint on characteristics of an RF signal) that may serve as the basis for associating vector representations with one another. In some embodiments, the method may further include loading at least the second vector representation from a database for association with the vector representation, and/or loading both the vector representation from the database for association.

In some embodiments, the method may further include determining whether the characteristic of the RF signal satisfies a constraint and in response to determining that the characteristic satisfies the constraint, displaying in the GUI an indication of a category of the RF signal. For example, the category and constraint may be based on user input received via the GUI. For instance, the user input may indicate an association of the constraint with the category, which may serve as an instruction to associate RF signals having the characteristic satisfying the constraint (individually and/or in combination with other characteristic constraints) with the category.

In some embodiments, the characteristics include a characteristic selected from the group consisting of modulation type of the RF signal; pulse rate of the RF signal; signal-to-noise ratio (SNR) of the RF signal; type and/or location of an RF source that transmitted the RF signal; a confidence metric of the RF signal being analog and/or digital; a confidence metric of the RF signal matching another RF signal; a confidence metric of the RF signal being amplitude modulated (AM); a confidence metric of the RF signal being frequency modulated (FM); a confidence metric of the RF signal being a chirp; a confidence metric of the RF signal being frequency-shift keyed (FSK); a confidence metric of the RF signal being amplitude-shift keyed (ASK); a confidence metric of the RF signal being phase-shift keyed (PSK); a confidence metric of the RF signal being a chirp spread spectrum (CSS); and a confidence metric of the RF signal being constellation modulated.

Some aspects of the present disclosure relate, at least in part, to an RF sensor receiving a constraint over a communication network and performing a processing step based on an output a trained model indicating that an RF signal satisfies the constraint.

In some embodiments, an RF sensing method may include receiving a constraint over a communication network, receiving RF radiation via an RF antenna of an RF sensor that receives the constraint, inputting RF radiation data of the RF radiation to a trained model, and based on an output from the trained model indicating that the RF signal satisfies the constraint, perform a processing step. For example, the processing step may be selected from the group consisting of storing, in memory, a vector representation of the RF signal and/or digital samples of the RF signal and transmitting, over the communication network, a vector representation of the RF signal, an indication of a characteristic of the RF signal, and/or digital samples of the RF signal. For example, the constraint may be used as a basis to limit storage in memory and/or transmission of data indicating received RF signal, which may be communicated as an instruction to the RF sensor (e.g., within a distributed system). In some embodiments, the processing step may include storing the vector representation and/or the digital samples of the RF signal in non-volatile memory (e.g., onboard the RF sensor).

In some embodiments, the output of the trained model may include the vector representation of the RF signal, and the vector representation may be compressed with respect to the RF radiation data.

In some embodiments, the constraint may include a reference vector representation of a reference RF signal and/or the constraint may include a filter on content in dimensions of the vector representation of the RF signal. For example, where the constraint includes a reference vector representation, the processing step may be performed based on content in dimensions of the vector representation being within a predetermined vector-based distance of content in dimensions of the reference vector representation. For instance, the constraint may filter storage and/or reporting of data indicating RF signals similar to the reference RF signal. Alternatively or additionally, where the constraint includes a filter on content in dimensions of the vector representation, the processing step may be performed based on the content in the dimensions of the vector representation satisfying the constraint. For instance, the constraint may include the content in in the dimensions of the vector representation being within a predetermined vector-based distance of a vector space (e.g., associated with a category).

In some embodiments, the constraint may constrain the characteristic of the RF signal, and the processing step may be performed in response to determining, using content in dimensions of the vector representation, that the characteristic of the RF signal satisfies the constraint. For example, the constraint may be on modulation type and/or a confidence metric of the RF signal being analog and/or digital to a constrained extent, and (e.g., encoded) content in dimensions of the vector representation may be analyzed (e.g., using logistic regression and/or trained decoding) to determine whether the characteristic satisfies the constraint. In some embodiments, the output of the trained model may include the vector representation of the RF signal and the method may include determining the characteristic using content in dimensions of the vector representation (e.g., using logistic regression and/or trained decoding).

In some embodiments, the processing step may include transmitting the indication of the characteristic of the RF signal.

According to various embodiments, the characteristic may be selected from the group consisting of: modulation type of the RF signal; pulse rate of the RF signal; signal-to-noise ratio (SNR) of the RF signal; type and/or location of an RF source that transmitted the RF signal; a confidence metric of the RF signal being analog and/or digital; a confidence metric of the RF signal matching another RF signal; confidence metric of the RF signal being amplitude modulated (AM); a confidence metric of the RF signal being frequency modulated (FM); confidence metric of the RF signal being a chirp; a confidence metric of the RF signal being frequency-shift keyed (FSK); a confidence metric of the RF signal being amplitude-shift keyed (ASK); a confidence metric of the RF signal being phase-shift keyed (PSK); a confidence metric of the RF signal being a chirp spread spectrum (CSS); and a confidence metric of the RF signal being constellation modulated.

It should be appreciated that the foregoing aspects may be implemented individually and/or in various combinations.

BRIEF DESCRIPTION OF DRAWINGS

FIG. 17 is an example code flow diagram illustrating an example process flow of the aggregator and extractor of FIG. 14, according to some embodiments.

DETAILED DESCRIPTION

As mentioned above, the inventors developed RF systems employing one or more trained models that may be executed by one or more processors, allowing the processor(s) to input RF radiation and/or characteristic data indicating characteristics of received RF radiation to the trained model(s) and detect, using one or more output(s) of the model(s), the presence of one or more RF signals among the RF radiation, characteristics of the RF signal(s), the type of RF source that transmitted each RF signal, and/or location of each RF source. Described herein are examples of RF sensors, systems, and methods implementing such techniques that may be used alone or in combination. Further described herein are processing architectures that may be flexibly deployed at low cost and/or to facilitate using low power and/or highly portable RF sensors. Further described herein are interfaces that may be used to interact with and/or control system operation and/or reporting of detected RF activity involving RF signals having specified characteristics, in real time and/or following a completed RF sensor deployment.

I. SYSTEM AND SENSOR OVERVIEW

Figure 1:
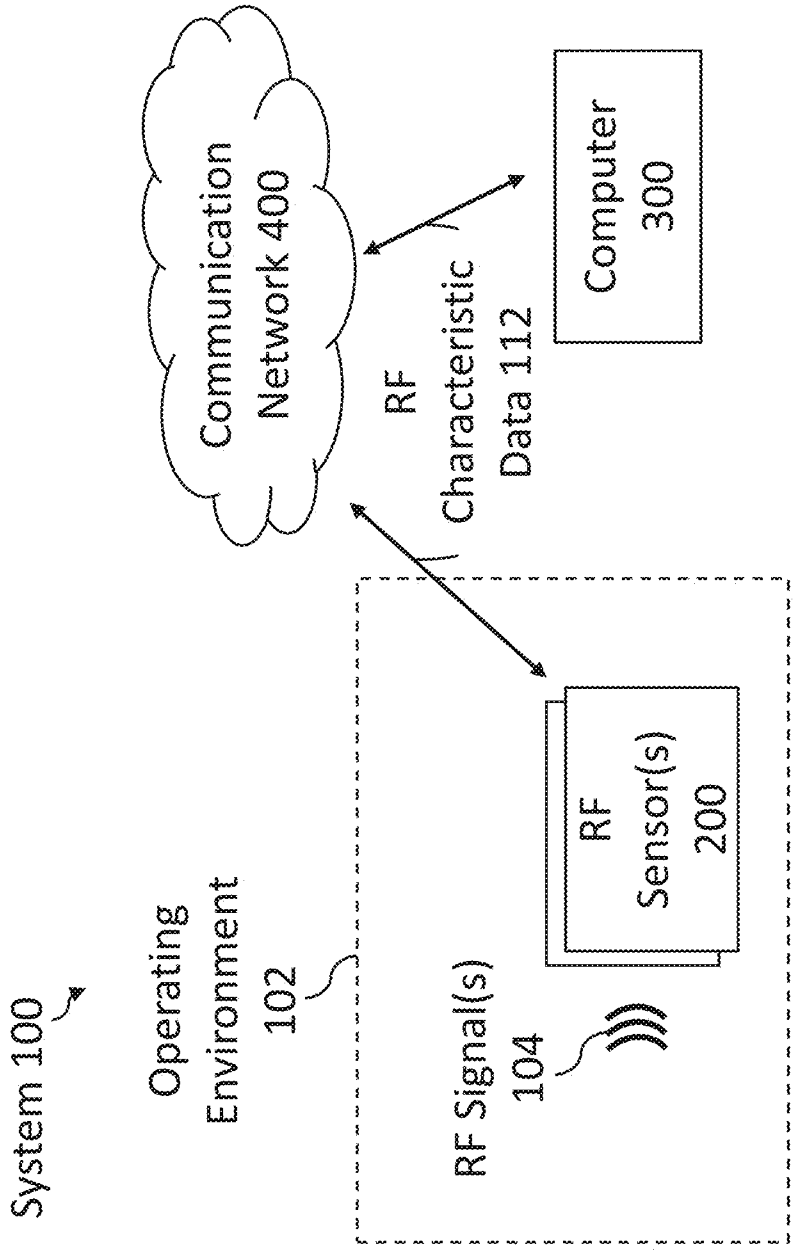
FIG. 1 is a block diagram of an example RF signal processing system, according to some embodiments.

FIG. 1 is a block diagram of an example radio frequency (RF) signal processing system 100, according to some embodiments. As shown in FIG. 1, system 100 may include one or more RF sensors 200 configured to receive RF signals 104 in an operating environment 102 of the system 100 and a computer 300 communicatively coupled to the RF sensor(s) 200 via a communication network 400. In some embodiments, RF sensor(s) 200 and/or computer 300 may be configured to detect the presence of received RF signals 104 among RF radiation received by RF sensor(s) 200. Alternatively or additionally, in some embodiments, RF sensor(s) 200 and/or computer 300 may be configured to classify and/or regress the type and/or location of the RF source of the RF signals 104, as described further herein. In some embodiments, computer 300 may be configured in a centralized configuration (e.g., as a central server and/or base station), whereas in other embodiments, computer 300 may be configured in a distributed configuration (e.g., as a distributed cloud server system).

According to various embodiments, the operating environment 102 may be indoor, outdoor, or partially indoor and partially outdoor. For instance, the operating environment 102 may be as small as a single room, or as large as a neighborhood and/or city. In one example, the operating environment 102 may be a compound spanning multiple buildings. As another example, the operating environment 102 may be a warehouse. In yet another example, the operating environment 102 may be a city and/or a neighborhood within a city, as embodiments described herein are not so limited. For example, in embodiments that may be deployed in combat areas, the operating environment 102 may include all or part of an active combat zone or battlefield. Depending on the application and/or operating environment 102, RF sensors 200 may be placed in various arrangements and at various densities. For example, in a dense environment with a high degree of signal attenuation (e.g., due to LOS obstruction and/or multipath reflections), a correspondingly dense arrangement of RF sensors 200 may be deployed.

In some embodiments, RF sensor(s) 200 may be configured to receive RF radiation in the operating environment 102 of system 100. For example, one RF sensor 200 may be positioned in the operating environment 102 and have one or more RF antennas configured to receive RF radiation. Alternatively, multiple RF sensors 200 may be positioned in the operating environment 102, such as in different respective locations. In some embodiments, the RF sensor(s) 200 may be configured to receive RF radiation having a frequency of at least 1 MHZ, such as 50 MHZ, 900 MHZ, 2.4 gigahertz (GHz), 30 GHz, and/or higher. In some embodiments, the RF sensor(s) 200 may also include RF front-end circuitry, such as one or more filters, amplifiers, tuners, and/or ADCs configured to receive, condition, demodulate, and/or digitally sample received RF radiation for processing. In some embodiments, some or all components of the RF front-end circuitry and/or RF antenna(s) may be contained in a dedicated system-on-chip (SoC) and/or a software-defined radio (SDR). For example, the SoC and/or SDR may be configured to selectively tune to one or more operating frequencies to scan for RF signal(s) 104. In some embodiments, the SDR may have an adjustable sampling rate to suit various possible processing speeds of the RF sensor 200 (e.g., a high sampling rate for use with fast processing speed, etc.).

In some embodiments, RF sensor(s) 200 may be configured to detect the presence of one or more RF signals 104 among the RF radiation received by RF sensor(s) 200. For example, each RF sensor 200 may include a processor operatively coupled to memory and configured to receive RF radiation from the RF antenna(s) of the RF sensor 200 (e.g., via RF front-end circuitry) and provide, as an input to a trained signal detection model, RF radiation data indicating characteristics of the RF radiation. For instance, the RF radiation data may include digital samples of the RF radiation and/or a time-frequency representation (e.g., spectrogram) derived from digital samples. In this example, the trained signal detection model may be configured to detect the presence of RF signals 104 by determining which portion (e.g., time period, frequency range, and/or power level) of the RF radiation data correspond to the RF signal(s) 104.

In some embodiments, RF sensor(s) 200 may be configured to provide RF radiation data to a trained model and obtain as an output from the trained model an encoding (e.g., vector representation) of an RF signal within the RF radiation data. For example, the encoding may be compressed with respect to the RF radiation data while still indicating distinguishing characteristics of the RF signal, which may facilitate processing the RF signal on less data than if the RF radiation data were processed in an uncompressed state. For instance, the encoding may be decoded by a downstream model for further processing, and/or the encoding may be a vector representation having content in dimensions of the vector representation that may be further processed directly such as to compare vector representations of RF signals and/or to determine whether a vector representation should be associated with a category of RF signals associated with a particular vector space. In some embodiments, RF signal detection may be implicit within a trained model configured to receive RF radiation data and output an encoding of an RF signal, whereas in other embodiments, a separate RF signal detection model may be included (e.g., to receive the RF radiation data and provide an input to another model that outputs the encoding).

In some embodiments, the processor may be configured to obtain the RF radiation data from received, filtered, demodulated, and/or digitally sampled RF radiation. For example, the processor may be configured to perform a Fourier Transform on digital samples of the RF radiation and generate a time-frequency representation and/or spectrogram of the RF radiation over a plurality of discretely sampled time periods, which may be provided as the input to the trained signal detection model. Alternatively or additionally, digital samples of RF radiation may be provided directly as an input to the trained signal detection model.

In some embodiments, the processor may be configured to determine, using the output of the trained signal detection model, at least some characteristics of the RF signal(s) 104. For example, the processor may be configured to determine the operating frequency of the RF signal(s) 104, such as the center frequency and/or operating frequency band, the power level of the RF signal(s) 104 at any such frequency or frequencies, bandwidth, pulse rate, signal metric (e.g., signal-to-noise ratio (SNR)), the extent to which a received RF signal 104 is analog and/or digital, the extent to which an RF signal 104 matches another RF signal (e.g., previously received and/or having predetermined characteristics) by comparison, and/or the extent to which an RF signal 104 has a particular characteristic (e.g., modulation type, analog and/or digital).

In some embodiments, the trained signal detection model may be configured to detect the presence of multiple RF signals 104 among the RF radiation, at least some of which may be received at the same time and/or within a predetermined time interval of one another. In some embodiments, the trained signal detection model may be trained using real RF signals received by RF sensor 200 in the operating environment 102. Alternatively or additionally, the trained signal detection model may be trained with RF radiation data generated using one or more real RF signals. For example, a large amount of RF radiation data may be generated to train the signal detection model to detect a wide variety of RF signals, thereby simulating training the model with a large dataset of real RF signals while using only a small number of real RF signals. Alternatively or additionally, the trained signal detection model may be trained with RF radiation data generated using one or more simulated RF signals. For example, a simulated RF signal may be generated to have characteristics in common with real RF signals, such as various types of modulation. In some embodiments, simulated RF signals may be generated by providing a real RF signal to a model that outputs simulated RF signals based on the real RF signal. In some embodiments, a real RF signal may be sampled at different sample rates to obtain a number of simulated RF signals, and/or spectrograms and/or power spectral density information may be obtained from the RF signal and/or different samplings of the RF signal to obtain more simulated RF signals.

In some embodiments, real signals may be used to generate simulated signals, such as by resampling the real signals at a different rate, varying the power level, and/or adding or modifying the noise level and/or type. The inventors recognized that real signals may be useful for accurately training models but may require manual signal labeling, whereas simulated signals may be less accurate in some cases but may be automatically labeled as part of generating the simulated signals. In some embodiments, a combination of real and simulated signals generated using real signals may be advantageously used to train models described herein efficiently while still achieving accurate signal detection and characterization.

In some embodiments, RF sensor(s) 200 may be configured to transmit (e.g., over a wired and/or wireless connection) RF characteristic data 112 to computer 300 indicating characteristics of received RF radiation. For example, RF sensor(s) 200 may include a network interface (e.g., coupled to and/or executed by the processor) configured to connect to communication network 400 such that RF sensor(s) 200 are configured to send RF characteristic data 112 indicating characteristics of the RF signal(s) 104 to computer 300 over communication network 400. For instance, the characteristics may include an operating frequency, power level, bandwidth, pulse rate, signal metric (e.g., signal-to-noise ratio (SNR), the extent to which the RF signal is analog and/or digital, and/or the extent to which the RF signal matches another RF signal (e.g., previously received and/or having predetermined characteristics) by comparison. In some embodiments, RF characteristic data 112 may alternatively or additionally include RF signal data indicating and/or including a portion of RF radiation data (e.g., digital samples) corresponding to a received RF signal 104. Alternatively or additionally, in some embodiments, RF sensor(s) 200 may be configured to store RF characteristic data 112 locally (e.g., in memory onboard the RF sensor(s) 200) until the data is transmitted and/or offloaded at a later point.

In some embodiments, RF sensor(s) 200 may be configured to transmit RF characteristic data 112 to computer 300 each time an RF signal 104 is detected at the RF sensor(s) 200. Alternatively, in some embodiments, RF sensor(s) 200 may be configured to transmit RF characteristic data 112 to computer 300 only when certain RF signals 104 are detected, such as having at least one of a set of predetermined characteristics, such as one or more operating frequencies, power levels, combinations thereof, characteristics derived from an RF signal using a trained model, and/or content in a vector representation of an RF signal. For example, computer 300 may be configured to execute and/or may be coupled to an interface operable by a user to determine signal characteristics for RF signals to be detected and reported to computer 300 and/or to the interface. Alternatively or additionally, in some embodiments, RF sensor(s) 200 may be configured to transmit RF characteristic data 112 to computer 300 only when a new RF signal 104 is detected, such as when the detected RF signal 104 is not associated with the operating environment 102, when first the RF signal 104 is detected by the system, or when the RF signal 104 is first detected after a predetermined time period has passed (e.g., one hour, one day, etc.).

Further alternatively or additionally, in some embodiments, RF sensor(s) 200 may be configured to store RF characteristic data 112 locally in memory and only transmit RF characteristic data 112 upon request by computer 300 (e.g., when queried for detection of any RF signals, and/or of an RF signal satisfying specified criteria). For instance, RF sensor(s) 200 may be configured to store RF characteristic data 112 only for a predetermined amount of time and/or until a predetermined amount of memory is used and then to overwrite the memory with newly generated RF characteristic data 112 for efficiency. Alternatively or additionally, RF sensor(s) 200 may be configured to only store RF characteristic data 112 locally in memory and/or only transmit RF characteristic data 112 for an RF signal that satisfies a constraint received from computer 300, such as including a filter on content in dimensions of a vector representation of the RF signal and/or a constraint of similarity (e.g., vector-based distance between) a vector representation of the RF signal and a reference vector representation of a reference RF signal that is provided by computer 300.

In some embodiments, computer 300 may be configured to associate an RF signal with other RF signals, such as from the same RF source, using the RF characteristic data 112 received from the RF sensor(s) 200. For example, RF signals may be associated using vector representations of the RF signals, based on content in dimensions of the vector representations having vector-based distances that indicate an association, and/or using a trained model to decode the vector representations and/or a trained model to classify and/or regress the type and/or location of the RF source that transmitted the RF signal(s) 104. For instance, computer 300 may include a processor operatively coupled to memory and configured to execute one or more trained models and provide the RF characteristic data (e.g., RF signal data within the RF characteristic data) to the trained model(s) as an input.

In some embodiments, computer 300 may be configured to classify the type of RF source that transmitted the RF signal(s) 104 using a trained source classification model and to classify and/or regress the location of the RF source using a trained localization model. For example, the trained source classification model may be trained using RF signal data indicating characteristics of RF signals transmitted by a variety of RF source types, such as cell phones and Bluetooth and/or Wi-Fi devices. In this example, the trained source localization model may be trained using RF signal data indicating characteristics of RF signals transmitted from a variety of locations within the operating environment 102 of system 100. Alternatively or additionally, in some embodiments, the source classification and/or localization models may be trained using a large dataset of RF signal data generated based on a small number of RF signals received in the operating environment 102, which may simulate training the models based on a large number of real RF signals. Alternatively or additionally, the trained source classification and/or localization models may be trained using RF signal data generated based on one or more simulated RF signals.

In some embodiments, computer 300 may be configured to distinguish between RF signals 104 associated with the operating environment 102 and other RF signals 104 that are not associated with the operating environment 102. For example, phase modulated (PM) communication traffic at 10 GHz may be associated with the operating environment 102, and an unauthorized person could enter the operating environment 102 with a non-associated mobile communication device that transmits PM signals at 900 MHz. In this example, the trained models executed by computer 300 may be trained to classify the PM communication traffic and the mobile communication device PM signals separately, allowing computer 300 and/or an operator thereof to detect the presence of the unauthorized person based on the trained model outputs described herein.

In some embodiments, computer 300 may be configured to determine when a new RF signal 104 (e.g., not associated with the operating environment 102) has been detected. For example, computer 300 may be configured to process (e.g., classify) RF signals in the environment, such as by receiving RF characteristic data 112 from one or more RF sensors, and use previously processed signals as a comparison for determining whether the new RF signal 104 has been previously detected. Alternatively or additionally, computer 300 may be configured to process the new RF signal 104 against a statistical model (e.g., a list of expected RF signals and associated probabilities) that may be pre-programmed into computer 300. Further alternatively or additionally, computer 300 may be configured to process the new RF signal 104 against an indication (e.g., pre-programmed into computer 300) of a type of operating environment (e.g., airport) in which the RF sensor 200 that received the new RF signal 104 has been deployed, which may be associated (e.g., in the memory of computer 300) with a list of expected RF signals and/or a statistical model.

In some embodiments, content in dimensions of vector representations of RF signals may be used to distinguish between RF signals 104 associated with the operating environment 102 and other RF signals 104 that are not associated with the operating environment 102. For example, vector representations of RF signals 104 associated with the operating environment 102 may occupy particular vector space(s), and a vector representation of an RF signal may occupy a vector space that is significantly distanced (in vector-based distance) from the vector space(s) occupied by those RF signals, indicating that the RF signal is not one of the RF signals 104 associated with the operating environment. Alternatively or additionally, a vector representation of an RF signal may have some very similar (e.g., close in vector-based distance) characteristics (e.g., in some dimensions) while having some very different (e.g., far in vector-based distance) characteristics (e.g., in other dimensions), which may indicate that the RF signal is a new version of an RF signal that is associated with the operating environment 102, such as an RF signal having the same modulation type and/or confidence metric of being analog and/or digital while having a different center frequency.

In some embodiments, computer 300 may be configured to, based on RF characteristic data 112, determine whether an RF source of RF signal 104 has deviated from a predetermined operating condition. For example, the RF source may be associated with the operating environment 102 but may have a deteriorated operating condition, such as lower power transmission than expected for normal operation. In some embodiments, computer 300 may be configured to determine a power level of the RF signal 104 using the RF characteristic data 112 and compare the power level to a predetermined power level stored in the memory that is indicative of the predetermined operating condition (e.g., expected power level of transmission). For example, computer 300 may be configured to determine the power level using RF signal data (e.g., digital samples) of RF characteristic data 112 and/or a time period, frequency range, and/or power level indicated in RF characteristic data 112. In some embodiments, computer 300 may be configured to classify and/or regress the operating condition of the RF source, such as by providing RF signal data within RF characteristic data 112 to a trained operation condition model trained on RF signal data indicating various operating conditions of the RF source. Alternatively or additionally, the trained operating condition model may be trained over a period of operation of the RF source such that the trained operating condition model output indicates deviation of the operating condition of the RF source with respect to the observed period of operation. In some embodiments, computer 300 may be alternatively or additionally configured to determine whether an RF sensor has deviated from a predetermined operating condition, such as due to lower-than-expected SNR and/or failing to receive RF radiation (and/or detect RF signals) confirmed to be present using other RF sensors.

In some embodiments, content in dimensions of vector representations of RF signals may be used to determine whether an RF source has deviated from a predetermined operating condition. For example, a vector representation of an RF signal may have some very similar (e.g., close in vector-based distance) characteristics (e.g., in some dimensions) to a version having the predetermined operating condition while having some very different (e.g., far in vector-based distance) characteristics (e.g., in other dimensions), which may indicate that the RF source has deviated from the predetermined operating condition, such as by having a lower power level.

In some embodiments, communication network 400 may be a wired and/or wireless local area network (LAN), a cell phone network, a Bluetooth network, the internet, or any other such network. For example, RF sensor(s) 200 and computer 300 may be positioned in remote locations relative to one another, such as with RF sensor(s) 200 deployed in the operating environment 102. In some embodiments, RF sensors 200 described herein may be used with various types of communication links within communication network 400, such as low bandwidth communication links. In one example, an RF sensor 200 described herein may be configured to transmit messages (e.g., including RF characteristic data 112) at a data rate less than or equal to 50 kilobits per second (kbps), such as 30 kbps, 20 kbps, or less. For instance, low bandwidth communication described herein may use a Low Power Wide Area Networking (LPWAN) communication protocol, such as the LoRaWAN protocol. In some embodiments, RF sensor 200 may be configured to transmit RF characteristic data 112 in messages having as few as 100 bytes, 50 bytes, or even 10 bytes. It should also be appreciated that multiple communication links of various bandwidths may be used herein, such as one RF sensor 200 connected to computer 300 over LoRaWAN and another RF sensor 200 connected to computer 300 over 802.11ac, as embodiments described herein are not so limited.

In some embodiments, as an alternative or in addition to RF sensor 200, computer 300 may be configured to detect the presence of an RF signal among RF radiation received by an RF sensor 200, such as by inputting RF radiation data (e.g., digital samples, a spectrogram, etc.) from the RF sensor 200 to a trained signal detection model executed by computer 300 and identifying the RF signal among the RF radiation data. For example, RF sensors 200 may have low onboard processing resources and may be configured to transmit a large quantity of RF radiation data (e.g., including digital samples) over a high-bandwidth link of communication network 400. Alternatively or additionally, an RF sensor may have enough onboard processing resources to detect an RF signal, classify the RF source, and/or determine the operating condition of the RF source, facilitating transmission of a small quantity of RF characteristic data over a low-bandwidth link of communication network 400, according to the needs of the particular deployment.

While computer 300 is described herein as classifying and/or regressing the type of RF source that transmitted the RF signal 104 and/or classifying and/or regressing the operating condition of the RF source, it should be appreciated that such processing may be alternatively or additionally performed by RF sensor 200. For example, RF characteristic data 112 transmitted to computer 300 may alternatively or additionally include an RF source classification result and/or an indication of the operating condition of the RF source, as embodiments described herein are not so limited. It should also be appreciated that, in some embodiments, computer 300 may be implemented onboard one or more RF sensors 200. For example, system 100 may be at least partially decentralized, such as having at least one of RF sensors 200 designated as a controlling device for at least a portion of system operation. As another example, computer 300 may be distributed using a distributed cloud computing system accessible to the RF sensor(s) 200 over the Internet.

In some embodiments, an at least partially decentralized implementation of system 100 may have an RF sensor 200 configured to selectively report (e.g., to a computer 300) RF signals satisfying a constraint (e.g., corresponding to a particular RF signal and/or based on certain features such as power level and/or operating frequency, and/or vector-based distance between vector representations), and the RF sensor 200 may be configured to hibernate in a low power mode (e.g., performing less frequent RF signal scanning) after a predetermined amount of time (e.g., 10 minutes) has passed since detecting an RF signal satisfying the constraint. For example, an RF sensor 200 may be configured to hibernate after a predetermined amount of time has passed without detecting an RF signal that is not associated with the operating environment. In this respect, for instance, an RF sensor 200 may be at least partially in control of the process flow within the system 100.

In some embodiments, RF sensor(s) 200 may be deployed in stationary locations (e.g., without moving during operation of system 100). Alternatively or additionally, in some embodiments, RF sensor(s) 200 may be positioned on (e.g., mounted on and/or carried by) one or more vehicles, such as wheeled, aerial, manned, and/or unmanned vehicles in and/or around the operating environment 102. In one example, a known location of the vehicle (e.g., determined using a GPS receiver co-located with the vehicle) and/or a known relative distance between multiple vehicles supporting respective RF sensors 200 may be used to determine the location of an RF source (e.g., by providing such information with RF characteristic data 112). For instance, RF sensors 200 onboard multiple vehicles traversing an operating environment 102 may be configured to collaboratively detect RF signals and/or classify and/or locate RF sources in the operating environment 102 so as to map the RF sources present as the vehicles traverse the operating environment 102. In another example, a known location of an RF source localized using system 100 may be used to determine the location of the vehicle (e.g., using a trained localization model). As yet another example, one or more RF sensors 200 may be worn and/or carried by persons, who may have known locations (e.g., determined using a GPS receiver co-located with the person).

In some embodiments, an RF sensor and/or device may be co-located with a vehicle and/or person when the RF sensor and/or device and the vehicle and/or person are affixed to one another, such as by wearing or mounting. It should be appreciated, however, that co-location may be possible without direct affixation or attachment. For example, an RF sensor may be considered co-located with a positioning device onboard a vehicle and/or worn by a person when a positional offset between the RF sensor and the positioning device is known and is shorter than positional offsets between objects in the area such as people, vehicles, or landmarks. In some cases, positional offsets between co-located devices may be insignificant enough to be ignored for processing purposes. For example, on a vehicle, positioning devices such as GPS and IMU units may be offset from one another by inches or feet, which may be programmed into memory and/or may be trained into layers of a model when fine-tuned with the vehicle. Similarly, devices carried by a person may be so close to one another that positional offsets between them may be ignored for purposes of RF source localization. It should be appreciated, however, that some implementations may require enough precision that co-location requires precise, known offsets.

Figure 2A:
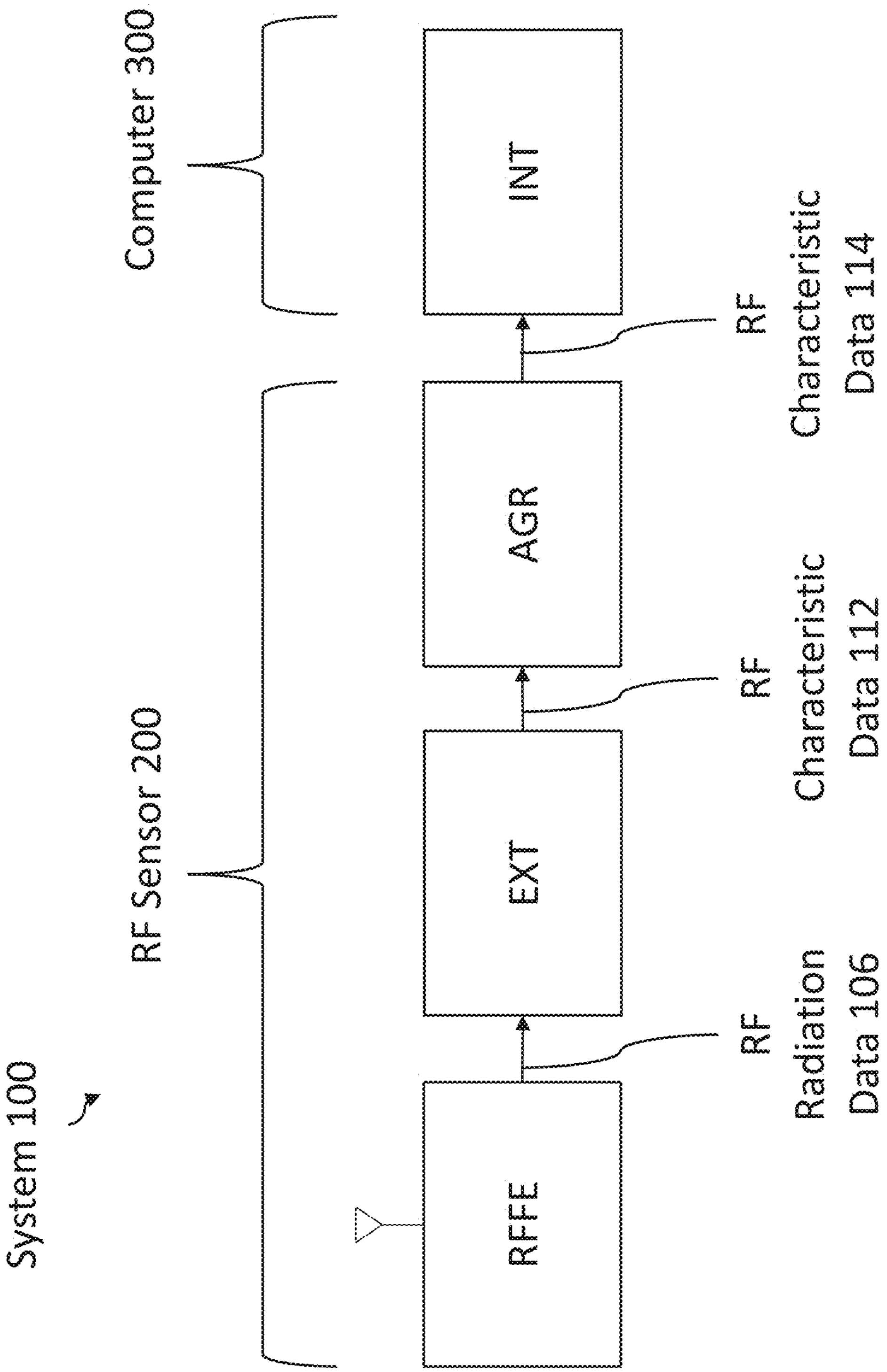
FIG. 2A is a block diagram of example components of the system of FIG. 1, according to some embodiments.
Figure 2B:
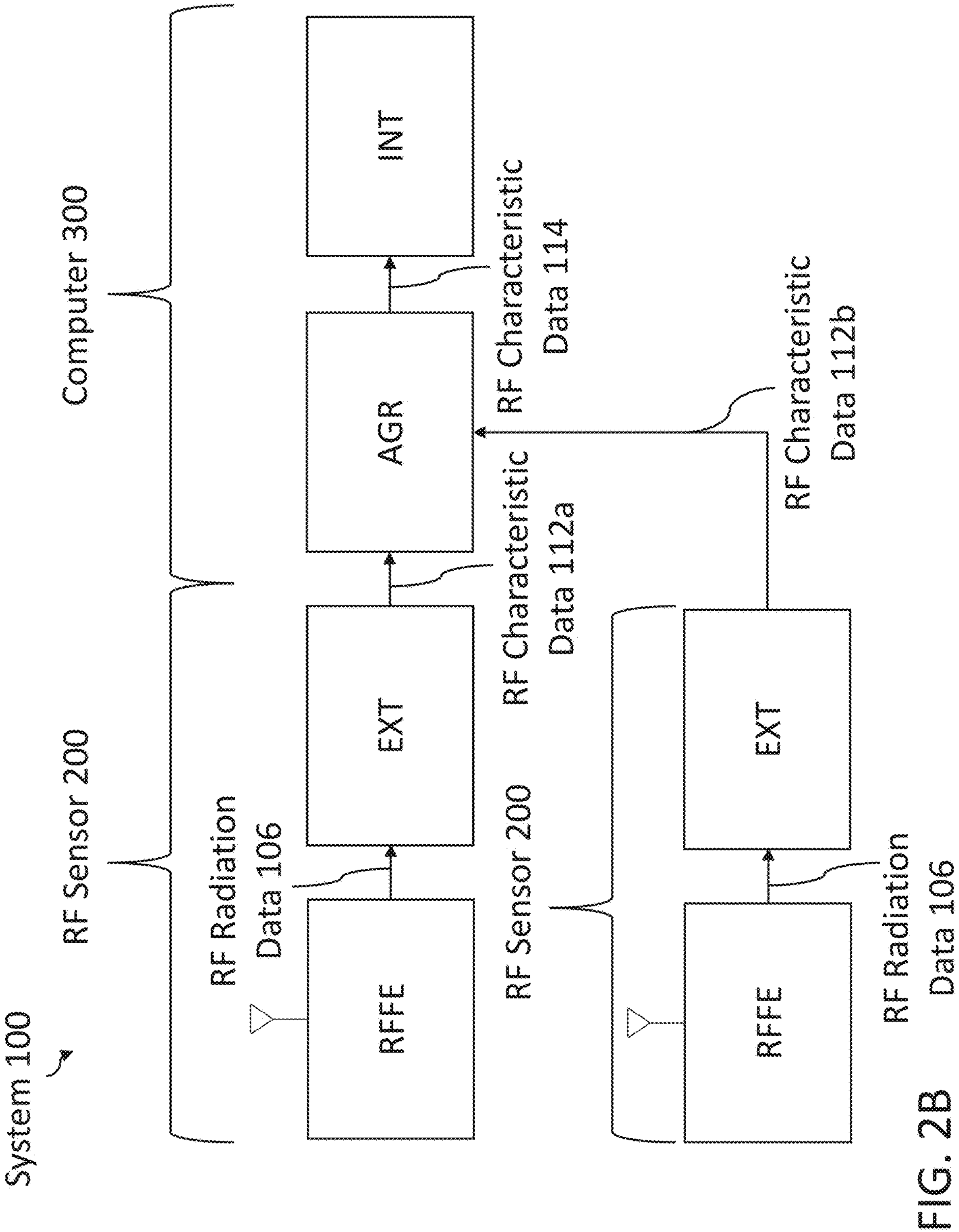
FIG. 2B is a block diagram of example components of the system of FIG. 1 in an alternative configuration, according to some embodiments.
Figure 2C:
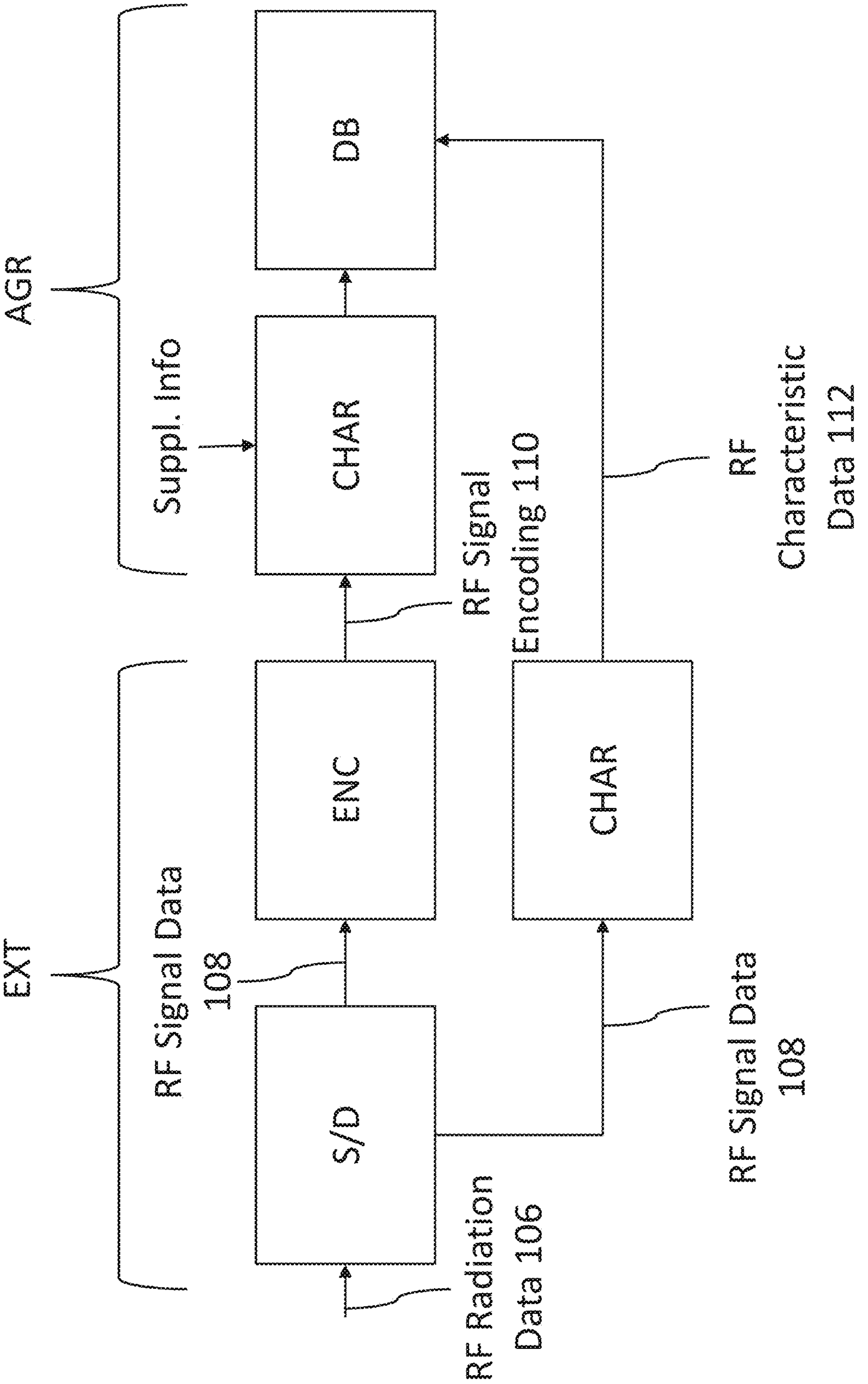
FIG. 2C is a block diagram of example components that may be included among the components shown in FIGS. 2A and 2B, according to some embodiments.

FIGS. 2A and 2B are block diagrams of example components of system 100, according to some embodiments. FIG. 2C is a block diagram of example components that may be among the components shown in FIGS. 2A and 2B, according to some embodiments. As shown in FIGS. 2A and 2B, system 100 may have an RF front-end (RFFE), an extractor (EXT), an aggregator (AGR), and an interface (INT). In some embodiments, some components of system 100 may be executed in hardware, such as the RF front-end, whereas other components may be executed by a processor, such as the signal detector, extractor, aggregator, and/or interface.

In some embodiments, an RF sensor 200 may be deployed in a standalone configuration, such as onboard a vehicle, for monitoring RF radiation having predetermined characteristics. For example, the RF sensor 200 may be configured to monitor a frequency range used by one or more electronic systems (e.g., an RF-based navigation system) onboard a vehicle for anomalies and/or disruption potentially affecting the electronic system(s). In some embodiments, indications of detected and/or classified RF signals and/or RF sources may be transmitted to the vehicle's onboard computing system and/or to the vehicle's controller (e.g., over a network link). In some embodiments, trained models onboard such RF sensors 200 may be trained to recognize RF signals transmitted from RF sources onboard and/or associated with the vehicle and to distinguish and/or classify other RF signals and/or RF sources (e.g., not associated with the vehicle).

In some embodiments, such as in the example of FIG. 2A, system 100 may have an RF sensor 200 that includes the RF front-end and a processor operatively coupled to memory and configured to execute the signal detector, extractor, and aggregator, and system 100 may further include a computer 300 having a processor operatively coupled to memory and configured to receive characteristic data 112 from the RF sensor 200 over the communication network 400 and execute the interface. In some embodiments, such a system 100 may omit computer 300 entirely, such as when the RF sensor 200 is deployed in standalone manner and the RF characteristic data 112, 114 may be offloaded following execution. For example, RF sensor 200 may be positioned on a vehicle, such as a drone, and may stream RF characteristic data 112, 114 during flight and/or may offload the RF characteristic data upon completion of the flight. In some embodiments, RF signal data within RF characteristic data 112 may be alternatively or additionally offloaded. In the same or another example, the interface may be at least partially executed onboard the RF sensor 200, such as where processing power and/or network bandwidth permit the electronics onboard the RF sensor 200 accommodate local interface execution.

In some embodiments, system 100 may be flexibly implemented to support distribution of the operations described herein among one or more RF sensors 200 and/or computer 300. In some embodiments, RF sensors 200 may be configured to select a subset of RF radiation received at the RF sensor 200 and transmit, over communication network 400 (e.g., to computer 300), RF signal data indicating the subset of the RF radiation. As one example, RF sensors 200 may be configured to select digital samples of RF radiation for transmission based on the time period of reception, frequency range, and/or power level of the digital samples. For instance, the RF sensor 200 may receive instructions (e.g., from computer 300) to select the digital samples, with the instructions indicating the time period of reception, frequency, and/or power level (e.g., corresponding to an RF signal recently received by another RF sensor 200 in the system 100). As another example, RF sensors 200 may be configured to select digital samples and/or provide an encoding (e.g., vector representation) of an RF signal determined to satisfy a constraint. Alternatively or additionally, the RF sensor 200 may be preconfigured to select digital samples based on the time period of reception, frequency range, and/or power level, and/or a constraint, such as under a pre-configuration in which multiple RF sensors 200 select different subsets of digital samples for transmission. In any or each of these examples, computer 300 may be configured to detect the presence of an RF signal among the received RF radiation and/or signal data, classify the RF source of the RF signal, determine an operating condition of the RF source, and/or locate the RF source in the operating environment 102.

In some embodiments, at least one RF sensor 200 may be configured to select a subset of digital samples for transmission to another computer system (e.g., a base station and/or another RF sensor 200) by inputting digital samples of the RF radiation (e.g., demodulated samples of RF radiation and/or a spectrogram) to a trained signal detection model and identifying the digital samples for transmission based on the output of the trained signal detection model. For example, the output of the trained signal detection model may indicate the time period of reception, frequency range, and/or power level of the digital samples corresponding to an RF signal. Alternatively or additionally, the output of the trained signal detection model may indicate (e.g., when fed to a source classification model) that the RF source of the RF signal is not associated with the operating environment 102. Further alternatively or additionally, the output of the trained model may indicate (e.g., when fed to an operating condition model) that the operating condition of the RF source has deviated from a predetermined operating condition. In some embodiments, a signal detection model may be configured to filter RF radiation data (e.g., samples and/or a time-frequency representation) input to the model and output a subset of the RF radiation data corresponding to a detected RF signal.

In some embodiments, such as in the example of FIG. 2B, system 100 may have an RF sensor 200 that includes the RF front-end and a processor operatively coupled to memory and configured to execute the extractor and to transmit RF characteristic data 112 (e.g., including RF signal data) to computer 300, and computer 300 may have a processor operatively coupled to memory and configured to receive the RF characteristic data 112, execute the aggregator to further process the RF characteristic data 112, output RF characteristic data 114, and execute the interface. For example, RF signal data within the RF characteristic data 112 may include one or more RF signal encodings 110, such as (e.g., compressed) vector representations, of one or more RF respective RF signals 104 generated by the extractor and configured to be input to the aggregator for decoding and/or further processing (e.g., of content in dimensions of a vector representation) to obtain the RF characteristic data 114. In some embodiments, at least some of the RF characteristic data 114 provided to the interface may include RF characteristic data 112 determined by the processor of the RF sensor 200 other than an RF signal encoding 110, such as indications of frequency, bandwidth, and/or modulation type (e.g., which may be determined using an output of the signal detector). In some embodiments, characteristics derived from an encoding (e.g., vector representation) may be provided to the interface, such as a confidence metric (e.g., indicating a probability) that the RF signal is amplitude modulated (AM), frequency modulated (FM), a chirp, frequency-shift keyed (FSK), amplitude-shift keyed (ASK), phase-shift keyed (PSK), chirp spread spectrum (CSS), and/or constellation modulated. It should be appreciated that at least some further processing of RF signal data and/or RF characteristic data 112 may be performed by the computer 300 as an alternative or in addition to processing performed by the aggregator onboard the RF sensor 200.

In some embodiments, such as in the example of FIG. 2B, system 100 may have multiple RF sensors 200 and a computer 300. Each RF sensor 200 may have an RF front-end and a processor operatively coupled to memory and configured to execute an extractor and to transmit RF characteristic data 112*a*, 112*b* to computer 300, and computer 300 may have a processor operatively coupled to memory and configured to receive the RF characteristic data 112*a*, 112*b* from each RF sensor 200, execute an aggregator to further process the RF characteristic data 112*a*, 112*b*, output RF characteristic data 114, and execute the interface. For example, the aggregator may be configured to process RF signal data (e.g., encodings of RF signals) from multiple RF sensors 200, such as to classify and/or regress a type of and/or localize an RF source of the RF signals and/or determine whether the same RF signal was received by multiple RF sensors 200. In some embodiments, aggregating RF signal encodings from multiple RF sensors may advantageously use supplemental (e.g., extrinsic) information and/or greater computing resources located at the computer (e.g., and potentially unavailable at least at some of the RF sensors 200) to aid in classifying, regressing, and/or localizing the source of the RF signal(s).

In some embodiments, heterogeneous arrangements and/or configurations of RF sensors 200 may be flexibly deployed in system 100. For example, a first RF sensor 200 may be configured to execute a trained model (e.g., signal detection and/or encoding) and identify a first subset of RF radiation received at the first RF sensor 200 for selecting and transmitting first RF characteristic data 112*a* to computer 300 (e.g., including and/or indicating characteristics of a detected RF signal). In this example, a second RF sensor may be configured to select and transmit RF radiation data 112*b* according to predetermined RF radiation criteria (e.g., a predetermined time period, frequency range, and/or power level, and/or preconfigured parameters of RF signal encodings generated by the extractor) stored in the memory of the second RF sensor. Alternatively or additionally, the second RF sensor 200 may be configured to select and transmit the second RF radiation data 112*b* in response to instructions received from computer 300. For instance, the first RF sensor 200 may have a first SDR configured to provide digital samples of received RF radiation faster than a second SDR of the second RF sensor 200, and/or the first RF sensor 200 may have greater onboard processing resources than the second RF sensor 200, facilitating execution of one or more trained models (e.g., source detection, source classification, and/or operating condition model(s)) onboard the first RF sensor 200. In some embodiments, computer 300 may be partly or entirely omitted, such as by having one of the RF sensors 200 execute the aggregator (e.g., as shown in FIG. 2A) and/or the interface. For example, one of the RF sensors 200 may be configured to perform any or all functions described herein for computer 300.

In some embodiments, the first RF sensor 200 may be configured to detect an RF signal, classify an RF source, and/or determine an operating condition of the RF source, in response to which computer 300 may be configured to instruct the second RF sensor 200 to select the second subset of RF radiation for RF radiation data transmission. In some cases, second RF sensor 200 may be instructed to select the second subset of RF radiation from among RF radiation data previously generated and stored in the memory of the second RF sensor 200, such as digital samples of previously received RF radiation (e.g., at or around the time the first RF sensor 200 received the RF signal). For example, RF sensors 200 may be configured to store and/or cache previously generated RF radiation data (e.g., digital samples) to be accessed upon instruction from computer 300. In some embodiments, computer 300 may be configured to classify the RF source, determine the operating condition of the RF source, and/or locate the RF source using RF radiation and/or signal data from the first and second RF sensors 200.

In some embodiments, the RF front-end may include an antenna configured to receive RF radiation and analog signal processing components configured to provide RF radiation data indicative of the RF radiation to the signal detector. For example, the RF front-end may include a software-defined radio (SDR) having a tunable receive frequency band, in-phase and quadrature (I/Q) demodulation circuitry, and an analog-to-digital converter (ADC) configured to output digital samples of the RF radiation for processing by the signal detector.

In some embodiments, the extractor may be configured to receive RF radiation data 106 (e.g., including an RF signal) and output RF characteristic data 112 indicating characteristics of an RF signal within the RF radiation data 106 (e.g., center frequency and/or operating frequency band, power level at any such frequency or frequencies, bandwidth, pulse rate, signal metric, extent the signal is analog and/or digital, and/or extent the signal matches another signal) by comparison, and/or RF signal data indicating the presence of an RF signal within the RF radiation data 106. For instance, RF signal data may include digital samples including the RF signal and/or an RF signal encoding (e.g., compressed vector representation) of the RF signal. For example, the extractor may include a signal detector configured to receive the RF radiation data 106 as an input and to output the RF signal data indicating the presence of an RF signal in the RF radiation data for downstream processing within the extractor. For instance, the RF signal data may include digital samples (e.g., I/Q samples) in which an RF signal was detected and/or a time-frequency representation of an RF signal (e.g., a portion of a spectrogram) that was detected, and the extractor may include a downstream model (e.g., trained model and/or characterization algorithm) configured to further process the RF signal data to obtain RF characteristic data 112.

In the same or another example, the extractor may include a trained encoding model configured to receive RF radiation data (e.g., digital samples) from the signal detector and/or from the RF front-end directly and generate therefrom an RF signal encoding for one or each RF signal contained in the RF radiation data. For instance, at least some layers of the extractor's encoding model may be trained to perform signal detection (e.g., in place of receiving an output from the signal detector) and further layers may be trained to produce an encoding of a detected RF signal. In some embodiments, the extractor's encoding model may be trained to output a compressed vector representation of an RF signal in an encoded format that the aggregator is trained to process. For example, the extractor's encoding model and one or more models of the aggregator may be trained together, with the extractor outputting a compressed representation of the RF signal to the aggregator, and the aggregator outputting a decompressed representation of the RF signal and/or outputting RF characteristic data 114 further characterizing the RF signal.

In some embodiments, the extractor may be trained to encode distinguishing aspects of an RF signal in a manner that emphasizes the distinguishing aspects in the output. For example, the extractor may be configured to generate a vector representation of an RF signal in which content in dimensions of the vector representation are indicative of characteristics of the RF signal. For instance, a trained encoding model may be trained to encode certain characteristics into a vector representation by ascribing certain content to dimensions of the vector representation, such that vector representations may be placed in different vector spaces depending on the represented characteristics (e.g., grouping PM RF signals more closely in vector space than with respect to AM signals). Alternatively or additionally, vector-based distances between vector representations, and/or between a vector representation and a particular vector space may indicate qualitative and/or quantitative differences and/or associations among RF signals represented in the vector space. In some embodiments, vector-based distances may be Euclidean distances between some or all content in dimensions of the vector representations, whereas in other embodiments, vector-based distances may be extrapolated from statistics of content of the vector dimensions of the vector representations, such as using mean and/or variance of such content (e.g., when a group of vector representations is used as a reference for association).

In some embodiments, the extractor may be trained similarly to an image compression model that provides a compressed output in encoded form and the aggregator may include a model trained similarly to a corresponding image processing and/or reconstruction model that provides a reconstruction of the compressed output in decoded form and/or performs further processing on characteristics of an RF signal indicated within an encoding. For instance, a spectrogram may be reproduced from an encoding in some embodiments. It should be appreciated that, in some embodiments, indications of RF signals decoded by the aggregator may not perfectly match the indications of RF signals input to the extractor due to the compressive nature of the encoding, which may be lossy in some embodiments. Alternatively or additionally, the aggregator may include a trained model configured to receive the compressed output in encoded form and perform characterization processing immediately thereon without a discrete decoding model within the pipeline, as decoding may be made implicit within at least some layers of the trained model.

In some embodiments, alternatively or in addition to further processing and/or decoding an RF signal encoding, RF signal encodings may be compared to one another to make determinations (e.g., whether a detected RF signal matches an RF signal previously received), with or without using a trained model downstream. For example, RF signal encodings may have vector dimensions that contain content about the encoded RF signal. For instance in the above example, a trained encoding model may be trained to encode content along the dimensions of an RF signal encoding that a trained decoding model (e.g., trained with the trained encoding model) may be configured to decode. Alternatively or additionally, however, encoding content along vector dimensions of an RF signal encoding may permit comparison (e.g., determination of a same signal) and/or similarity analysis of multiple RF signal encodings using the content encoded along the vector dimensions. For instance, comparison may be employed to determine whether a received RF signal is at least predicted to be the same as a previously received and/or target RF signal, and/or similarity analysis may be employed to determine (e.g., for user review and/or automatically) whether two or more RF signals (e.g., newly and/or previously received) should be associated (e.g., as from a same RF source), and/or whether a given RF signal should be placed in a category.

In some embodiments, similarity of content along the vector dimensions of two or more RF signal encodings may be determined using Euclidean distance calculations along some or all vector dimensions. For example, similarity (e.g., RF source association and/or categorization) may be determined as a percentage where 100% is zero or some other predetermined low threshold of Euclidean distance and 0% is a predetermined high threshold of Euclidean distance. For instance, where a vector representation is compressed with respect to a time-frequency representation (e.g., spectrogram) of and/or digital samples (e.g., I/Q samples) including an RF signal, comparison and/or similarity analysis may be performed using fewer computing resources than prior to compression, which may facilitate performing such computation on low cost, low power, and/or highly portable computing hardware (e.g., onboard an RF sensor), and/or may be performed remotely from where the RF signal was received and/or the vector representation generated (e.g., remote from an RF sensor and communicated over a network).

In some embodiments, the aggregator may be configured to receive and process RF signal encoding(s) of RF signal(s) 104 from the extractor, such as included within RF characteristic data 112. For example, the aggregator may be configured to receive a compressed vector representation of an RF signal 104 as an input and provide a characterization and/or decompressed representation of the RF signal 104 as an output. In some embodiments, the aggregator may be further configured to receive and/or provide supplemental (e.g., extrinsic) information as a supplemental input to the aggregator for obtaining a processed output of the RF signal encoding(s). For example, the supplemental information may include sensor data from onboard a vehicle on which the RF sensor 200 is positioned, and/or user input data received via an interface (e.g., of a mobile device and/or vehicle). In some embodiments, at least some of the supplemental information may be communicated in messages from RF sensor 200 to computer 300, and/or at least some of the supplemental information may be received via an interface (e.g., including and/or indicating user input).

In some embodiments, the aggregator may be configured to obtain a classification and/or regression of the type and/or location of the source of the RF signal(s) 104 using the RF signal encoding. For example, the aggregator may include a trained characterization model with layers trained to decompress one or more compressed vector representations of RF signals 104 and further layers trained to output a source classification and/or localization from within the same model. In other embodiments, the aggregator may include a trained decoding model configured to receive RF signal encodings and provide decoded RF signal representations to a trained characterization model to perform source classification and/or localization.

In some embodiments, the interface may be configured to provide RF characteristic information to a user and/or autonomous vehicle control system (e.g., directly and/or via another computer system) and/or receive instructions for controlling the system. For example, the interface may include and/or provide data to support a graphical user interface presenting contextual information about the RF sensors and any RF sources in the area, such as in a map view indicating known and/or detected locations of the RF sensors (e.g., using supplemental information such as GPS information), locations of the RF sources (e.g., predicted using a trained model), types of RF sources (e.g., predicted using a trained model), and/or indications of when an RF signal and/or RF source was detected (e.g., using RF characteristic data from an RF sensor that received the RF signal), and/or where a vehicle should navigate to (and/or a path the vehicle should take) to receive RF radiation from the RF source.

In some embodiments, the interface may be linked with a database (e.g., within the aggregator) storing a list of RF sources, received RF signals, and RF sensors with data points for each detected RF signal and localization performed. In some embodiments, the interface may further allow a user to input (e.g., directly and/or via another computer system) filter preferences, such as to limit reporting and/or on-screen display of RF sources and/or RF signals to particularly defined RF source types, modulation types, power limits, and/or detection timeframes. For example, the interface may allow a user to define categories as one or a combination of such filter preferences, and/or based on similarity to one or more selected RF signals and focus the presentation within the interface on user-defined categories (e.g., by filtering out RF signals outside of such categories).

In some embodiments, user-defined categories may be adapted to capture not only RF signals and/or RF sources meeting user-specified criteria, but also RF signals and/or RF sources determined by the system to be similar (e.g., have the same or close frequency content, bandwidth, modulation, power level, and/or encoded content) to RF signals that meet the user-specified criteria. For example, where similarity is determined by the aggregator, the aggregator may be configured to determine whether a detected RF signal is similar to other RF signals that would fall within a user-defined category, such as based on similarity in frequency, bandwidth, modulation, power level, and/or other characteristics described herein, which may be preset within the aggregator. Alternatively or additionally, similarity may be determined using a classifier trained to categorize RF signals accordingly. In some embodiments, the interface may allow a user to set a frequency and/or geographic sweep for RF signals and/or sources that controls the RF front-end(s) of the RF sensors 200 and/or filters RF signals and/or RF sources reported to the interface.

FIG. 2C illustrates examples of an extractor and an aggregator that may be included among the components shown in FIGS. 2A and 2B, according to some embodiments. As shown in FIG. 2C, the extractor may include a signal detector (S/D), an encoder (ENC), and a characterizer (CHAR), and the aggregator may include a characterizer and a database (DB). In some embodiments, the signal detector may be configured to identify an RF signal among RF radiation data 106 and output RF signal data 108 indicating the RF signal among the RF radiation data 106. For example, the signal detector my include a trained signal detection model configured to receive digital samples (e.g., I/Q samples) and/or a time-frequency representation (e.g., spectrogram) as an input and to output an indication of a subset of the digital samples and/or time-frequency representation that include the RF signal. In some embodiments, the input of the signal detector may be coupled to the RF front-end of the RF sensor 200 to receive digital samples of the RF radiation received by the RF front-end and input the digital samples to the trained model. In some embodiments, RF signal data 108 output from the signal detector may include digital samples that the signal detection model identified as including RF signal(s) 104 and and/or a time period of reception, frequency range, and/or power level of RF signal(s) 104 (e.g., within a spectrogram of the received RF radiation).

In some embodiments, the signal detector may alternatively or additionally include one or more non-machine learning based algorithms configured for signal detection. For example, one or more matched filters may be executed in parallel with the trained signal detection model and/or on outputs of the trained signal detection model, such as for comparison and/or to validate predictions made by the trained signal detection model. For instance, RF signal data 108 output by a signal detection model may be filtered out depending on whether it sufficiently matches and or is validated by the output of a non-machine learning based signal detection algorithm, such as a peak-finding algorithm. In some embodiments, comparison results and/or unvalidated signal detection predictions may be propagated downstream (e.g., to the aggregator) for further processing. For example, where an RF signal is received below the noise floor of the system, an aggregator may be configured to detect the RF signal by taking into account supplemental information (described further below) and/or by applying a matched filter.

In some embodiments, the encoder may include a trained encoding model configured to receive RF radiation data (e.g., digital samples) from the signal detector and generate therefrom an RF signal encoding 110 for one or each RF signal contained in the RF radiation data 106. For example, the encoding model may be trained to output a compressed vector representation of an RF signal in an encoded format that the aggregator is trained to process and/or that may be processed using content in dimensions of the vector representation (e.g., using vector-based distances). For example, the encoding model and one or more models of the aggregator may be trained together, with the extractor outputting a compressed encoding of the RF signal to the aggregator, and the aggregator outputting a decompressed representation of the RF signal and/or RF characteristic data 114 further characterizing the RF signal to be used to train the encoding model.

In some embodiments, an encoding model may be trained similarly to an image compression model that provides a compressed output in encoded form and the aggregator may include a model trained similarly to a corresponding image reconstruction model that provides and/or further processes a reconstruction of the compressed output, and in some embodiments the aggregator may perform further processing directly on an encoding (e.g., vector representation) without decoding and/or reconstructing underlying RF radiation data. For instance, an image of a spectrogram may be input to and encoded by an encoding model then processed by a downstream aggregator model to identify and/or analyze characteristics of an RF signal in the spectrogram. Alternatively or additionally, input layers of the encoding model may be configured to perform a Fourier transform on digital samples input to the model to achieve processing similar and/or equivalent to processing a spectrogram as the input. For example, a Fourier transform may be performed as an operation within the network and/or as a result of training layers of the encoding model.

In some embodiments, the characterizer of the extractor may be configured to obtain RF characteristic data 112 (e.g., a power level, signal-to-noise metric, RF front-end gain, center frequency, bandwidth, past signal recognition, order tracking, and/or modulation type) of an RF signal indicated in RF signal data 108. In some embodiments, the characterizer may include and/or solely use non-machine learning algorithms, such as a peak-finding algorithm for determining the center frequency of an RF signal. In some embodiments, such as shown in FIG. 2C, the extractor may be configured to provide at least some RF characteristic data 112 to the database. In some embodiments, the extractor may be configured to provide such data directly to an interface, such as bypassing the aggregator shown in FIG. 2C.

While the extractor is shown in FIG. 2C providing an RF signal encoding 110 and RF characteristic data 112 to the aggregator separately, it should be appreciated that the extractor may be configured to compile RF characteristic data, such as including an RF signal encoding 110 and indications of characteristics other than the encoding 110 (e.g., center frequency, bandwidth), into a single message for providing to an aggregator.

In some embodiments, the characterizer of the aggregator may be configured to receive and process an RF signal encoding 110 from the extractor together with supplemental (e.g., extrinsic) information to produce RF characteristic data 114. For example, supplemental information for processing with RF characteristic data 112 may be provided to the aggregator, including one or more of inertial measurement unit (IMU) data of an IMU co-located with the RF sensor, global navigational satellite system (GNSS) (e.g., global positioning system (GPS)) data of a GNSS unit co-located with the RF sensor, temperature data of a temperature monitoring unit co-located with the RF sensor, vehicle heading and/or bearing data of a vehicle co-located with the RF sensor, and/or antenna directivity data of an antenna of the RF sensor. For instance, such information may be provided directly from a respective device (e.g., onboard the vehicle) and/or through a computer system (e.g., vehicle computer system).

In some embodiments, supplemental information may include user input data received from a user (e.g., via a user interface presented to the user). For example, the user input data may include a particular vector representation, a category, and/or constraints (e.g., filters) on one or more characteristics, any or each of which may be used as a constraint on received RF signals. For instance, a vector representation of a first RF signal may be aggregated together with RF characteristic data 112 indicating (e.g., a vector representation of) a second (e.g., reference) RF signal for further processing, such as to determine whether the first and second RF signals are the same and/or have at least some similar characteristics. In some cases, where the first and second RF signals are the same and/or have at least some similar characteristics, the RF signals may be associated together (e.g., with a common RF source and/or using a same category). Alternatively or additionally, a constraint (e.g., on characteristics of RF signals such as modulation type, pulse rate, etc.) may be provided and used to filter out RF signals that do not satisfy the constraint. Alternatively or additionally, a user input category may be aggregated together with RF characteristic data 112 to determine whether an RF signal indicated in RF characteristic data 112 should be associated with the category. In some cases, where the RF characteristic data 112 is determined not to be associated with the category (e.g., indicating a type of RF signal the user is interested in seeing reported), the RF signal indicated therein may be filtered out from reporting and/or displaying (e.g., in the user interface from which the user input data was received).

In some embodiments, geographic information of the operating environment may be provided to the aggregator, such as a map of elevation and/or buildings with associated heights and/or gradients. For example, localization determinations by the aggregator may be informed, at least in part, by the presence or absence of an RF signal arriving from a predicted location at a particular time and/or location of the RF sensor due, for instance, to the RF signal being blocked by a hill, mounting, and/or building, as may be inferred using the geographic information. For instance, such predictions for presence or absence of RF signals from predicted locations at a given time and/or location of RF sensor may be used to aid (e.g., guide) navigation of a vehicle along a path along which the RF signal is predicted to be present and/or stronger rather than a path along which the RF signal is predicted to be absent and/or weaker.

The inventors recognized that using supplemental information may improve the accuracy and/or precision of localization and/or other techniques while making the model training process more flexible and less computationally intensive, facilitating the use of low-cost, lower power, and portable RF sensors and system processing components (e.g., in distributed sensor arrangements where an aggregator is executed on an RF sensor). In some embodiments, any or all types of supplemental information described herein may be provided as an input to a trained model and used (e.g., together with other inputs) to classify and/or localize an RF source or make similar determinations.

In some embodiments, the characterizer may be configured to output a detection of an RF signal received multiple times by the RF sensor, detection of an RF signal received by multiple RF sensors (including the RF sensor that received this RF signal), an identification of a type of RF source of an RF signal represented in an RF signal encoding 110, and/or a location of an RF source of an RF signal represented in the RF signal encoding 110. For example, the characterizer may include one or more trained models configured to recognize and/or identify RF signals and/or classify and/or localize RF sources of received RF signals among an RF signal encoding 110. In some embodiments, some characteristics may be determined by a characterizer of the extractor and/or the aggregator, depending on the application and the available processing resources, whereas other characteristics (e.g., location of an RF source, detection of the same RF signal at multiple RF sensors) may need to be performed by a characterizer of the aggregator (e.g., due to availability of supplemental information and/or previously received RF signals and/or user-defined RF source categories in the aggregator database for comparison).

In some embodiments, characterizer models may be trained using RF signal encodings 110 from the extractor, such as in an end-to-end supervised training technique in which labels are attached to RF radiation data and/or RF signal data input to the encoding model and feedback is assessed using outputs from the characterizer. In some cases, training may be fine-tuned using real supplemental (e.g., extrinsic) information obtained from a respective device (e.g., GNSS receiver onboard a vehicle and/or worn by a person with which or whom an RF sensor is co-located). Although not shown in FIG. 2C, in some embodiments, a trained decoder may be interposed between the encoding model and the characterizer model, such as where a reconstruction of RF signal data provided to the encoder is desired for aggregator processing and/or storage in the database.

In some embodiments, the database may be at least partially exposed to the interface. For example, data stored in the database indicating characteristics of detected RF signals and RF sources may be read by the interface. In the same or another example, system operational preferences (e.g., reporting filters and/or predetermined RF characteristics and/or signals) may be input to the database via the interface for controlling system operation.

Figure 3:
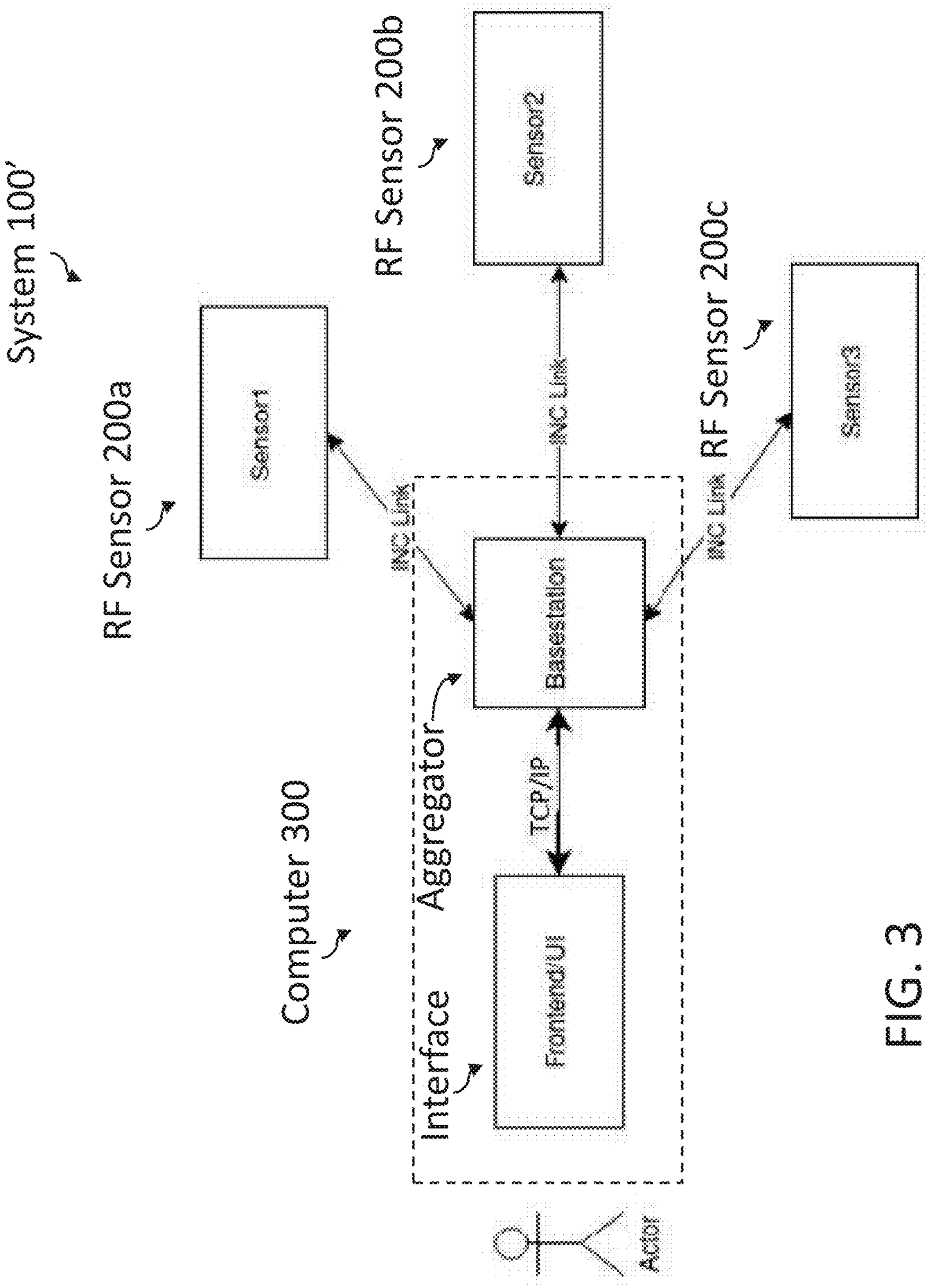
FIG. 3 is a block diagram of an example RF signal processing system having multiple RF sensors, according to some embodiments.

FIG. 3 is a block diagram of an example system 100' including multiple RF sensors 200*a*, 200*b*, and 200*c*, and a computer 300, according to some embodiments. As shown in FIG. 3, three RF sensors 200*a*, 200*b*, and 200*c* may be deployed in an operating environment (e.g., 102) and in communication with computer 300. In some embodiments, such as described herein for FIG. 2B, each RF sensor 200*a*, 200*b*, and 200*c* may be configured to execute a signal detection model and encoding model, and computer 300 may be configured to execute a decoding model and interface. As one example, each RF sensor 200*a*, 200*b*, and 200*c* may be deployed at a different static location (e.g., in a field). As another example, each RF sensor 200*a*, 200*b*, and 200*c* may be deployed onboard a different moving vehicle (e.g., a drone). In some embodiments, computer 300 may be configured to provide the interface to a user for control of system operation and/or to view information obtained and/or processed by computer 300. For example, the interface may include a list of detected RF sources and/or a map of detected, known, and/or predicted RF sensors and/or RF source locations. In some embodiments, the interface may be integrated into a dashboard with supplemental information, such as a map and/or a camera feed from a vehicle (e.g., having an RF sensor onboard).

In the illustrated example, the RF sensors 200*a*, 200*b*, and 200*c* are configured to communicate with the computer 300 over inter-node communication (INC) links, whereas the computer 300 includes a communication link using Transmission Control Protocol/Internet Protocol (TCP/IP). In other embodiments, other link types such as ZeroMQ (ZMQ), Message Queueing Telemetry Transport (MQTT), and/or Hypertext Transfer Protocol (HTTP) may be used.

Figure 4:
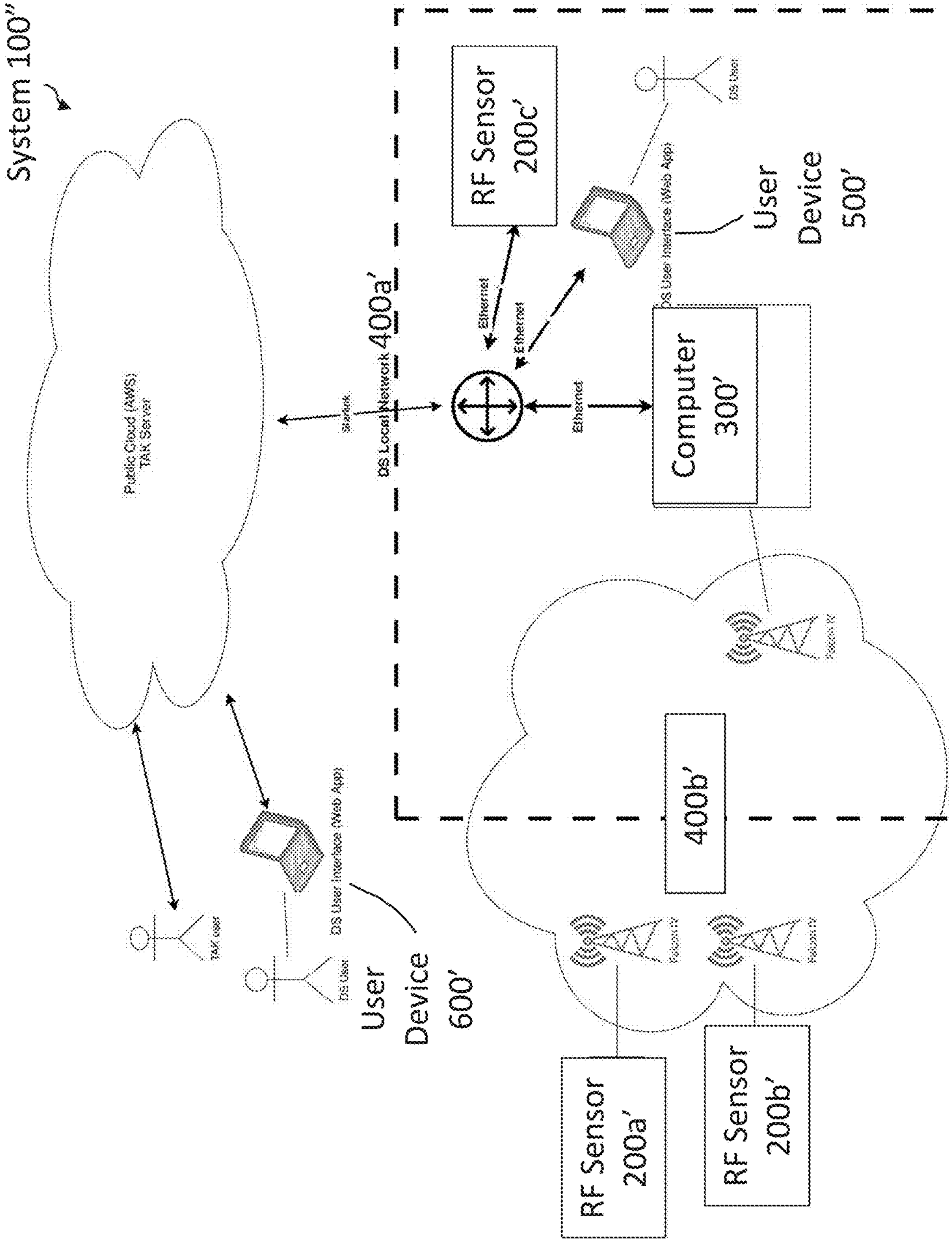
FIG. 4 is a block diagram of an alternative example RF signal processing system having multiple RF sensors, according to some embodiments.
Figure 5:
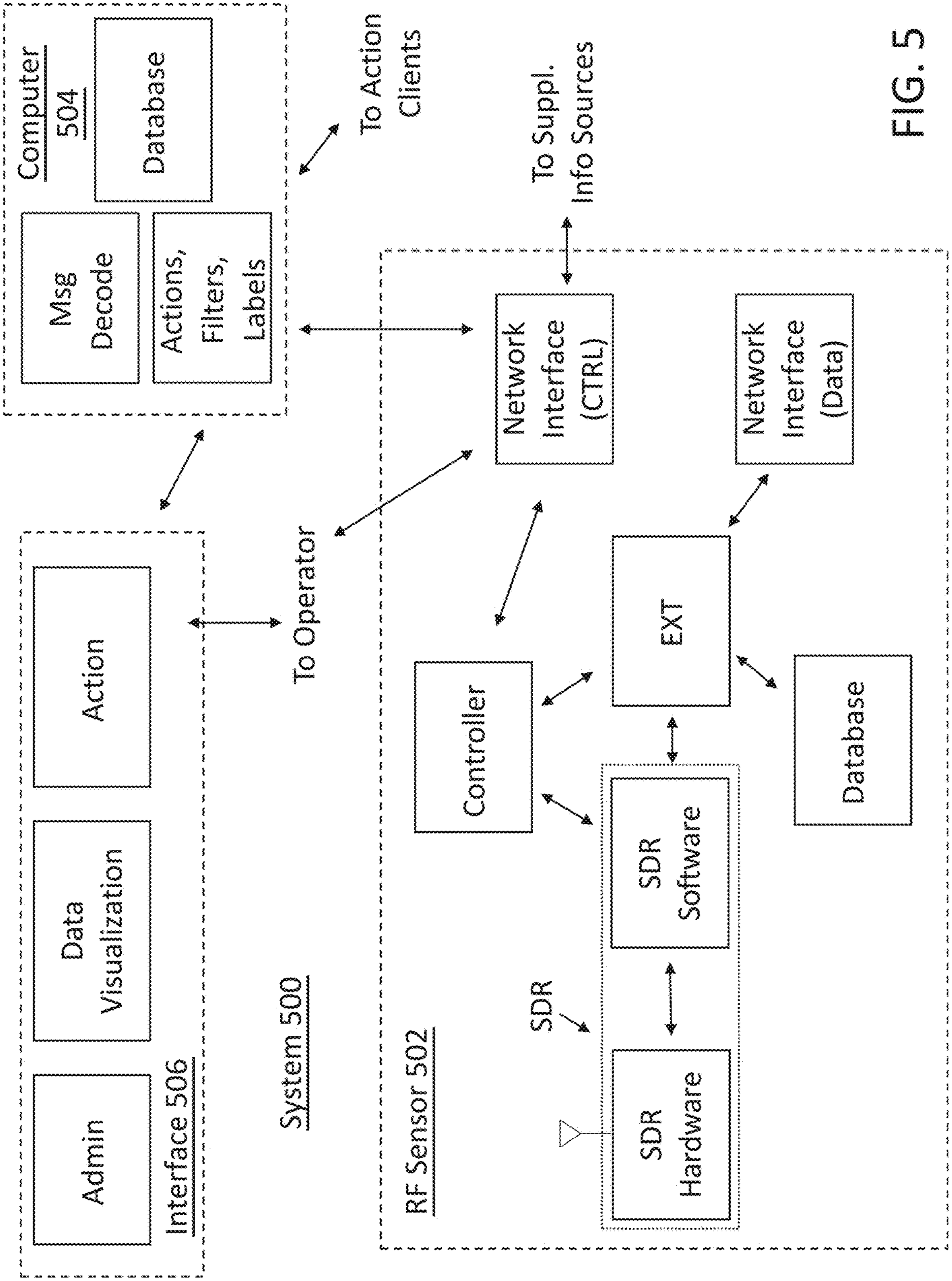
FIG. 5 is a block diagram of a further alternative example RF signal processing system, according to some embodiments.

FIG. 4 is a block diagram of an alternative example RF signal processing system 100" having multiple RF sensors, according to some embodiments. As shown in FIG. 5, the system 100" includes an interconnection of multiple networks 400*a'* and 400*b'*. For example, network 400*a'* may be a network link (e.g., LoRaWAN) through which two RF sensors 200*a'* and 200*b'* communicate with a computer 300', and network 400*b'* may be a LAN through which another RF sensor 200*c'* and user devices 500' and 600' communicate with the computer 300' (e.g., via an interface). In the illustrated example, the computer 300' may be configured to execute an aggregator and manage a database of RF signals detected by the RF sensors 200*a'* and 200*c'* and/or associated characteristics and the computer 300' may be further configured to execute an interface permitting the user devices 500' and 600' to interact with (e.g., access and/or set) information (e.g., reports of detected RF signals, categories associated with the RF signals, actions, etc.).

As shown in FIG. 4, user devices 500' and 600' may be configured to interact with the data reported and/or stored by computer 300' directly, such as in the case of the user device 500' connected via ethernet to the same network 400*a'* as the computer 300, or indirectly, such as in the case of the user device 600' connected via a server and satellite (e.g., starlink) connection to the network 400*a'*.

FIG. 5 is a block diagram of a further alternative example RF signal processing system 500, according to some embodiments. As shown in FIG. 5, system 500 may include an RF sensor 502, a computer 504, and an interface 506. In some embodiments, RF sensor 502 may be configured as described herein for RF sensor 200, computer 504 may be configured as described herein for computer 300, and interface 506 may be configured as described herein for interfaces that may be executed on RF sensor 200, computer 300, and/or a separate computing system, according to various embodiments.

In some embodiments, such as shown in FIG. 5, RF sensor 502 may include an SDR with hardware (e.g., an RF front-end) and software (e.g., configured for at least partial demodulation and/or identifier extraction), and may be further configured for extraction processing and for storing at least some RF signal and/or characteristic data in a database thereon. In some embodiments, RF sensor 502 may be further configured to control the SDR, and/or transmission (e.g., via the network data interface) and/or storage of RF signal and/or characteristic data (e.g., in the database). For example, in FIG. 5, RF sensor 502 includes a controller coupled to the SDR, the extraction processing, and a network control interface. For instance, the controller may be configured to receive commands for controlling components of RF sensor 502 over a communication network (e.g., from computer 504 and/or interface 506), and/or the controller may be configured to issue commands for controlling other components (e.g., computer 504 and/or interface 506) over a communication network. In some embodiments, one or more processors of RF sensor 502 may be configured to execute the controller, extraction processing, and/or network interfaces. In some embodiments, software components may be executed on RF sensor 502 using low computing resources (e.g., speed, power, and/or memory), facilitating the use of low cost and/or low weight RF sensors 502.

In some embodiments, such as shown in FIG. 5, computer 504 may include a message decoder, a repository of actions, filters, and categories, and a database. For example, the message decoder, repository, and/or database may be at least a part of an aggregator executed onboard computer 504, such as for processing RF signal and/or characteristic data from multiple RF sensors, and/or for multiple RF signals received by RF sensor 502. In some embodiments, computer 504 may be configured to update actions, filters, and/or categories based on communications with interface 506 (e.g., in response to user inputs at the interface 506), and/or interface 506 may be configured to update actions, filters, and/or categories based on communication with computer 504 and/or RF sensor 502. In some embodiments, the message decoder and/or repository may be executed by one or more processors of the computer 504.

In some embodiments, such as shown in FIG. 5, interface 506 may include an administrator processing component, a data visualization component, and an action component. In some embodiments, the administrator, data visualization, and action components may be executed by a processor dedicated to the interface 506. In some embodiments, the administrator component may be configured to manage users of the interface 506, such as permissions and/or user-defined parameters. In some embodiments, the data visualization component may be configured to manage GUI settings and/or preferences for each user and/or for different RF sources, RF sensors, and/or categories. In some embodiments, the action component may be configured to manage actions associated with categories, RF sources, and/or RF sensors, as may be set by a user via the interface 506.

In some embodiments, RF sensor 502, computer 504, and/or interface 506 may be configured to communicate with an operator of a vehicle and/or wearer of an RF sensor and/or known RF source. For example, the RF sensor 502, computer 504, and/or interface 506 may be configured to communicate detection of an RF signal, identification of a type of RF source, and/or location of an RF source to the operator and/or wearer. For instance, the operator and/or wearer may be a person who can view the communication on a display screen (and/or hear the information via audio), and/or the operator may be an autonomous and/or semi-autonomous vehicle control system that may process the communication as data input to the system. According to various embodiments, user interface components (e.g., display components) of interface 506 may be implemented using a portable computer (e.g., laptop, tablet, wearable device, and/or mobile device), such as executing an awareness application (e.g., Android Team Awareness Kit (ATAK)).

In some embodiments, RF sensor 502 may be configured to communicate with sources of supplemental information via the network interfaces, such as sensors (e.g., GNSS, IMU, temperature, etc.) onboard a vehicle and/or worn by a person. For example, such information may be transmitted within RF characteristic data to the computer 504 for further processing. Alternatively or additionally, such information may be further processed together with RF characteristic data onboard the RF sensor 502 (e.g., when at least some aggregation processing is performed onboard the RF sensor 502).

In some embodiments, computer 504 may be configured to communicate with action clients, such as when a user-defined action is triggered (e.g., based on detection of an RF signal, identification of a type of RF source, and/or location of an RF source). For example, an action client may include a mobile device where the action is a text message (e.g., SMS) and/or an ATAK notification. In other embodiments, the RF sensor 502 and/or interface 506 may be configured to communicate with action clients, such as where RF sensor 502 performs at least some functions described herein in connection with computer 504, and/or where interface 506 communicates with action clients as an alternative or in addition to computer 504 (e.g., where communications are made via an API).

It should be appreciated that, in some embodiments, the interface 506 may be at least partially executed onboard the RF sensor 502 and/or the computer 504. It should be further appreciated that processing described in connection with computer 504 may be alternatively or additionally performed onboard the RF sensor 502.

Figure 6:
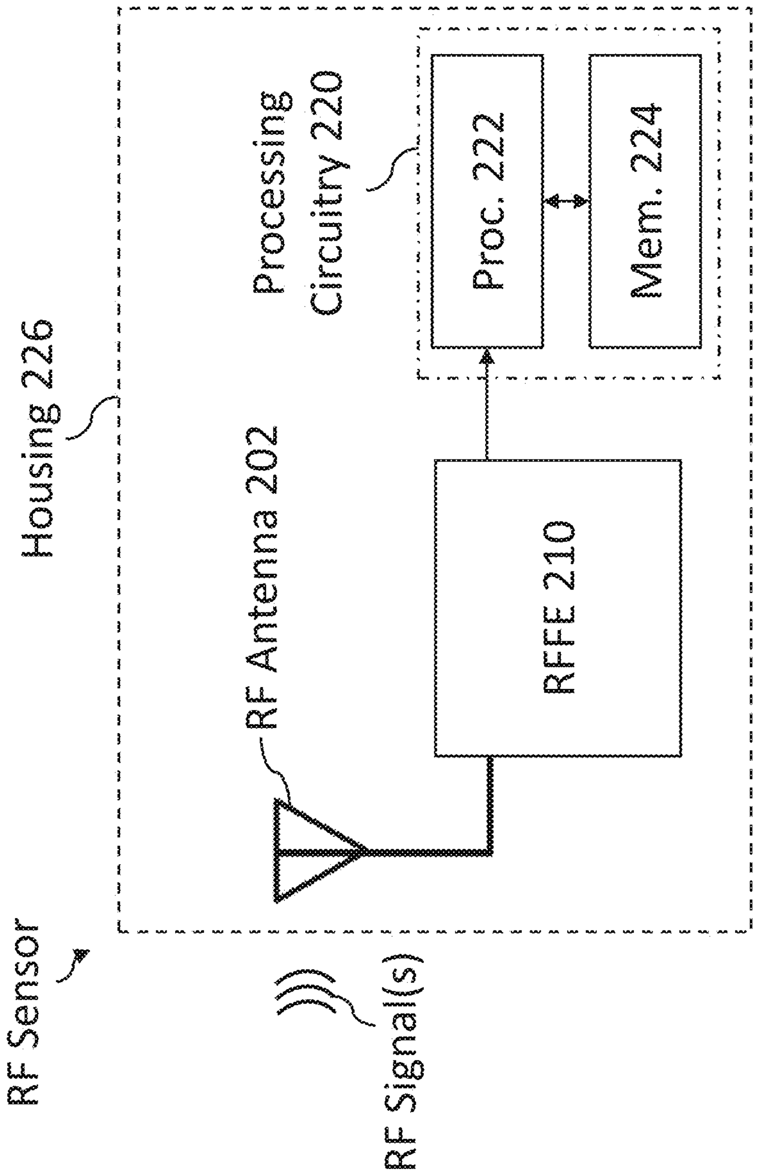
FIG. 6 is a block diagram of an example RF sensor that may be included in the system of FIG. 1, according to some embodiments.

FIG. 6 is a block diagram of RF sensor 200 of system 100, according to some embodiments. As shown in FIG. 6, RF sensor 200 may include an RF antenna 202, RF front-end circuitry 210 coupled to RF antenna 202, and RF processing circuitry 220. In some embodiments, RF antenna 202 may be configured to receive and provide RF radiation to RF front-end circuitry 210, and RF-front-end circuitry 210 may be configured to condition, demodulate, and/or digitally sample the RF radiation to provide to RF processing circuitry 220. In some embodiments, RF antenna 202, RF front-end circuitry 210, and RF processing circuitry 220 may be integrated together, such as on the same printed circuit board and/or within a common housing 226, such as shown In FIG. 6. It should be appreciated that, in some embodiments, RF sensor 200 may include more than one RF antenna that share RF front-end circuitry 210 or each have their own associated RF front-end circuitry.

In some embodiments, RF sensor 200 may further include a power supply, such as a universal serial bus (USB) power receiver and/or wireless power receiver and/or a battery. For example, the USB power receiver may be compatible with commercially available USB power chargers (e.g., AC to DC and/or DC to DC, such as for charging from an onboard vehicle battery). In some embodiments, low-power processing onboard RF sensor 200 may allow RF sensor 200 to consume an average of less than 20 watts (W) of power, making RF sensor 200 operable using an onboard battery.

In some embodiments, RF antenna(s) 202 of RF sensor(s) 200 may be oriented and/or positioned differently from one another (e.g., facing in different and/or orthogonal directions and/or at different heights) so as to obtain a diverse range of RF radiation over a large area and/or over multiple polarizations.

In some embodiments, RF processing circuitry 220 may be configured to detect the presence of RF signal(s) 104 among received RF radiation. For example, as shown in FIG. 6, RF signal detection circuitry 220 may include a processor 222 operatively coupled to memory 224. In some embodiments, processor 222 may be configured to execute a trained signal detection model and provide, as an input to the trained signal detection model, RF radiation data indicating characteristics of the received RF radiation. For example, processor 222 may be configured to detect the presence of the RF signal(s) 104 using an output of the trained signal detection model. For example, the output of the trained signal detection model may indicate portions of the RF radiation data (e.g., digital samples) that correspond to the RF signal(s) 104. For instance, the signal detection model may be configured to output a filtered stream of I/Q samples including only samples that include one or more RF signals and/or multiple filtered streams corresponding to respective RF signals. In some embodiments, memory 224 may be non-volatile memory configured to store instructions that, when executed, cause processor 222 to execute the trained signal detection model. According to various embodiments, processor 222 may include a general-purpose processor (e.g., a central processing unit), a graphics processing unit (GPU), a reduced instruction set computer (RISC) processor, an application specific processor (e.g., an application specific integrated circuit (ASIC)), and/or a reprogrammable processor (e.g., a field programmable gate array (FPGA)). In some embodiments, processor 222 may include random access memory (RAM) configured to load instructions from memory 224 for executing a trained signal detection model.

In some embodiments, processor 222 may be configured to receive, from RF front-end circuitry 210, digital samples, such as filtered samples, in-phase and/or quadrature (I/Q) samples, and/or demodulated samples, of received RF radiation and provide RF radiation data to the trained model based on and/or including the digital samples. For example, processor 222 may be configured to provide digital time domain and/or frequency domain samples to the trained model as RF radiation data. Alternatively or additionally, processor 222 may be configured to obtain a time-frequency representation of the digital samples, such as a spectrogram, to provide to the trained model as RF radiation data. For example, processor 222 may be configured to perform a Discrete Fourier Transform (DFT), such as a Fast Fourier Transform (FFT), of the RF radiation and obtain a time-frequency representation of the digital samples for one or more discrete time intervals. In some embodiments, processor 222 may be further configured to filter out time and/or frequency components of the RF radiation having below a predetermined power threshold. For example, such components of the RF radiation may have a low likelihood of including RF signals.

In some embodiments, RF signal data output from the trained signal detection model may indicate the presence of one or more RF signals 104 in the RF radiation data provided to the trained signal detection model. For example, the output of the trained signal detection model may indicate which portion(s) of the RF radiation data (e.g., which digital samples and/or time, frequency, and/or power components of a spectrogram) correspond to the RF signal(s) 104. In some embodiments, the output of the trained signal detection model may include a classification of the RF signal(s)

104 as having one of several discrete operating frequencies (e.g., center frequencies, operating frequency ranges), and/or a regression of the operating frequency of the RF signal(s) 104. In some embodiments, processor 222 may be further configured to store inputs and/or outputs of the trained signal detection model in memory 224. In some embodiments, stored inputs and/or outputs may be retrieved from memory 224 upon a command received from computer 300 over communication network 400 (e.g., for transmitting as RF characteristic data).

In some embodiments, processor 222 may be configured to generate an encoding of a received RF signal 104. For example, processor 222 may be configured to execute a trained encoding model and provide, as an input to the trained encoding model, an indication of a received RF signal 104. For instance, processor 222 may be configured to input RF signal data output from a trained signal detection model to the trained encoding model, such as a subset of digital samples of received RF radiation and/or a portion of a time-frequency representation such as a spectrogram. Alternatively or additionally, processor 222 may be configured to input RF radiation data that includes an RF signal 104 to the trained encoding model. In some embodiments, the trained encoding model may be configured similarly to an image compression model that outputs an encoded version of an input image, where the model is trained on time-frequency representations of RF signals (e.g., spectrograms) rather than or in addition to images. However, in other embodiments, an encoding model may be configured with alternative or additional layers trained to receive RF signal data and/or RF radiation data (e.g., digital samples) and that apply similar compression processing without requiring the inputs to be formatted as or similar to an image.

In some embodiments, the extractor's trained encoding model may be trained in tandem with the aggregator such that the aggregator decompresses and/or processes outputs from the trained encoding model. For example, the aggregator may be executed by computer 300 and/or onboard another RF sensor 200, with RF signal encodings output by the encoding model communicated from the RF sensor 200 executing the extractor to the computer 300 and/or RF sensor 200 executing the aggregator. In other examples, processor 222 may be further configured to execute the aggregator, at least in part. For instance, the inventors recognized it may be efficient to package the extractor and aggregator components to be indifferent to whether they are executed locally or on remote systems for flexibility of implementation (e.g., for consistent operation over a variety of possible configurations). For example, depending on the implementation (e.g., distribution of computing resources in system 100), some or all characteristics may be determined onboard an RF sensor 200, and/or some or all characteristics may be determined onboard computer 300.

It should be appreciated that, while a single processor 222 is shown in RF signal detection circuitry 220, some embodiments may include multiple processors 222. For example, a first processor 222 (e.g., an FPGA, GPU, and/or ASIC) may be configured to receive digital samples from RF front-end 210 and execute the trained signal detection model, and a second processor 222 (e.g., a general-purpose processor) may be configured to execute the extractor and/or generate and/or transmit RF signal data 108 and/or RF characteristic data 112 over the communication network 400.

Figure 7:
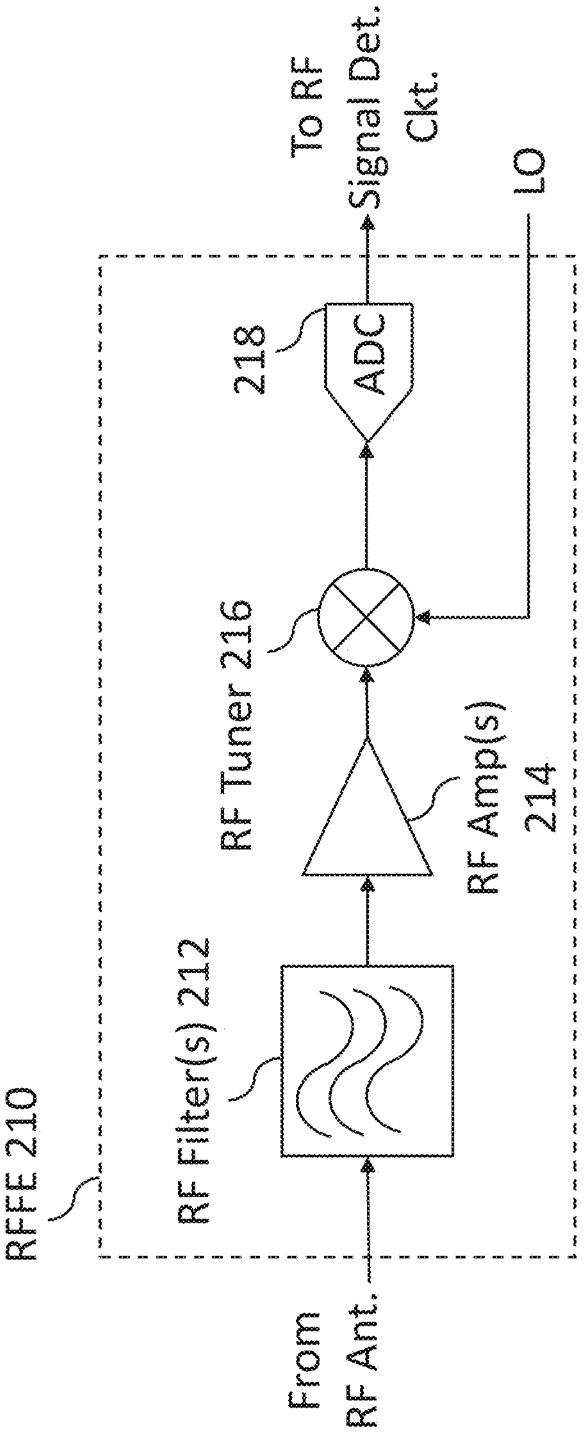
FIG. 7 is a circuit diagram of an example RF front-end that may be included in the RF sensor of FIG. 6, according to some embodiments.

FIG. 7 is a circuit diagram of example RF front-end circuitry 210 that may be included in RF sensor 200, according to some embodiments. As shown in FIG. 7, RF front-end circuitry 210 may include one or more filters 212, amplifiers 214, RF tuners 216, and/or ADC(s) 218. In some embodiments, filter(s) 212 may include one or more low pass, high pass, band-pass, and/or band-stop filters configured to isolate certain portions of RF radiation received via RF antenna 202. In some embodiments, amplifier(s) 214 may be configured to provide low-noise amplification to increase the power level of the received and filtered RF radiation for providing to RF tuner(s) 216. In some embodiments, RF tuner(s) 216 may be configured to demodulate and/or down-convert and provide received RF radiation to ADC(s) 218. In some embodiments, ADC(s) 218 may be configured to digitally sample RF radiation to provide digital samples to RF signal detection circuitry 220.

In some embodiments, RF front-end circuitry 210 may include one filter 212, amplifier 214, tuner 216, and/or ADC 218 for conditioning RF radiation received in a single frequency band, and/or for each frequency band at which RF sensor 200 is configured to receive RF radiation. In some embodiments, the ADC(s) 218 may be coupled earlier in the RF front-end circuitry 210. For example, amplification and/or RF tuning may be performed using a processor coupled to the ADC(s) 218.

In some embodiments, RF front-end circuitry 210 may include an SDR that includes a processor. For example, the SDR may be configured to receive and digitally sample and/or demodulate RF radiation in the frequency range from 20 MHz to 1.7 GHZ, with a channel bandwidth of up to 2.5 MHz. In the same or another example, the SDR may be configured to output 8-bit digital samples of received RF radiation. One SDR that may be suitable is the RTL-SDR dongle available from www.rtl-sdr.com). Another SDR that may be suitable is the bladeRF Micro 2.0 available from Nuand. In some embodiments, such SDRs may be advantageously programmed to provide samples of RF radiation and circuitry for performing digital Fourier transform operations so as to further output time-frequency representation information from the SDR to another processor. In some cases, such SDRs may be further configured to extract identifiers (e.g., described below) from received RF signals. Other SDRs may be used, such as high-grade SDRs capable of digitally sampling large frequency ranges, such as between 1 MHZ and 6 GHZ, and/or using high digital sampling rates, such as up to 100 million 16-bit complex samples per second (Msps) (e.g., 16 real bits and 16 imaginary bits for 32 total bits per sample). In some embodiments, the SDR may have an adjustable RF tuner and/or digital sampling rate controllable using processing circuitry 220. For example, processing circuitry 220 may be configured to adjust the frequency range and/or digital sampling rate of the SDR in response to instructions from computer 300. In embodiments in which an SDR is used, at least some analog circuitry (e.g., filters, tuners, etc.) may be alternatively or additionally implemented by the SDR and/or by a processor of the RF sensor 200 in communication with the SDR.

In some embodiments, RF front-end circuitry 210 may include components configured to accommodate frequency ranges beyond those for which the SDR is configured, thereby extending the usable frequency range of the RF sensor 200. For example, an auxiliary down-converter and/or amplifier (e.g., low-noise amplifier) may be coupled between the antennas and the SDR. For instance, some RF signals (e.g., satellite signals) may be operating at a frequency (e.g., 20 GHZ) that is beyond the digital sampling frequency range of the SDR, and the down-converter may be configured to translate those RF signals into a frequency range that is within the digital sampling frequency range of the SDR. In some cases, an indication of whether the down-converter was applied (e.g., using a hardware switch) may be provided to the processor(s) of the RF sensor 200 to distinguish RF signals down-converted to the digital sampling frequency range of the SDR from RF signals that, without down-conversion, arrived within the digital sampling frequency range of the SDR. In some cases, an indication of the local oscillator used for down-conversion may be provided to the processor(s) of the RF sensor 200, which may allow for digital reconstruction of the received RF signal (e.g., processing the RF signal as though it were received in its actual frequency range) for appropriate downstream processing (e.g., categorizing as from a satellite RF source).

In some embodiments, RF tuner(s) 216 may be configured to adjustably down-convert received RF radiation from various receive frequency bands to baseband (e.g., a lower frequency more suitable for signal processing using a general-purpose processor than for wireless transmission). For example, RF tuner(s) 216 may be adjustable among multiple receive frequencies, such as by adjusting the frequency of a local oscillator (LO) coupled to a mixer of the RF tuner(s) 216. Alternatively or additionally, in some embodiments, RF tuner(s) 216 may be configured to scan among multiple channels within a receive frequency band. For example, RF tuner(s) 216 may be adjustable among multiple channel frequencies, such as for several 22 MHZ channels near a center frequency of 2.4 GHz, by providing down- and/or up-conversion by a discrete number of channel bands. In the same or another example, tuner(s) 216 may be configured to scan within the frequency range from 20 MHz to 6 GHZ.

In some embodiments, RF tuner(s) 216 may be configured to generate and provide I/Q samples and/or demodulated digital samples of RF radiation, such as using multiple frequency mixers tuned to the same local oscillator frequency and out of phase from one another by 90 degrees. In some embodiments, RF tuner(s) 216 may include baseband and/or channel filters configured to remove image frequencies generated via up- and/or down-conversion. In some embodiments, ADC(s) 218 may be configured to generate digital samples of RF radiation received and/or demodulated via RF tuner(s) 216. In some embodiments, processor 222 may be configured to digitally reconstruct from I/Q samples to their originally received digital representation for transmission as RF characteristic data. For example, MAC addresses (e.g., of Bluetooth devices) may be discerned among digital samples of RF radiation once digitally reconstructed. Alternatively or additionally, auxiliary down-conversion and/or demodulation circuitry may be included (e.g., in parallel with RF tuner(s) 216, within the SDR, and/or onboard the processor 222) to partially or fully demodulate an RF signal to obtain an identifier therein, such as a Service Set Identifier (SSID) from within a received 802.11 (e.g., WiFi) signal.

In some embodiments, RF front-end circuitry 210 may include low-cost electronics (e.g., onboard and/or coupled to an SDR) such as RF tuner(s) 216 that do not rely on ultra-precise clock synchronization. For example, RF front-end circuitry 210 may be configured to sample received RF radiation using clock references that are allowed to drift by 50 ns, 100 ns, or more (e.g., as high as 1, 100, or even 500 milliseconds), with respect to clock references of other RF sensors 200 deployed in the operating environment 102, without impacting signal detection, RF source type determination, RF source operating condition determination, and/or RF source location determination. Alternatively or additionally, RF front-end circuitry 210 may be configured to sample received RF radiation using clock references that are allowed to drift in frequency with respect to clock references of other RF sensors deployed in the operating environment 102. In some embodiments, ADC(s) 218 may be configured to use a digital sampling rate of 100 Msps, 50 Msps, 20 Msps, or lower, without impacting such RF determinations. It should be appreciated that any suitable digital sampling rate may be used, depending on the application.

In some embodiments, processor(s) 222 may be configured to synchronize the timing of digital samples of RF radiation using RF signals among the RF radiation having a known time base and/or location. For example, an RF signal among the RF radiation having a known source (e.g., an FM radio signal from a public broadcasting station) may be used to synchronize the time of reception of RF radiation containing the same RF signal. In some embodiments, computer 300 may be configured to synchronize timing similarly, such as when RF signals are indicated in RF characteristic data from multiple RF sensors, and each contains the same known RF signal for reference. In some embodiments, a known RF signal may be alternatively or additionally used to aid in localizing an RF source, such as by comparing a determined (e.g., regressed) location of the RF source of the known RF signal to a known location of the RF source (e.g., stored as a reference in memory). Alternatively or additionally, in some embodiments, processor 222 and/or computer 300 may be configured to synchronize the timing of digital samples of RF radiation using one or more Internet-based timing protocols.

In some embodiments, computer 300 of system 100 may be alternatively or additionally configured to detect the presence of RF signals 104 among RF radiation received by an RF sensor 200. For example, the RF sensor 200 may be configured to transmit RF radiation data indicating and/or including digital samples of received RF radiation to computer 300, and a processor of computer 300 may be configured to execute a trained signal detection model (e.g., model 270). In this example, the trained signal detection model may be configured to detect the presence of the RF signal(s) and/or classify and/or regress the operating frequency of the received RF signal(s) as described herein for the trained signal detection model executed by RF sensor 200.

Figure 8:
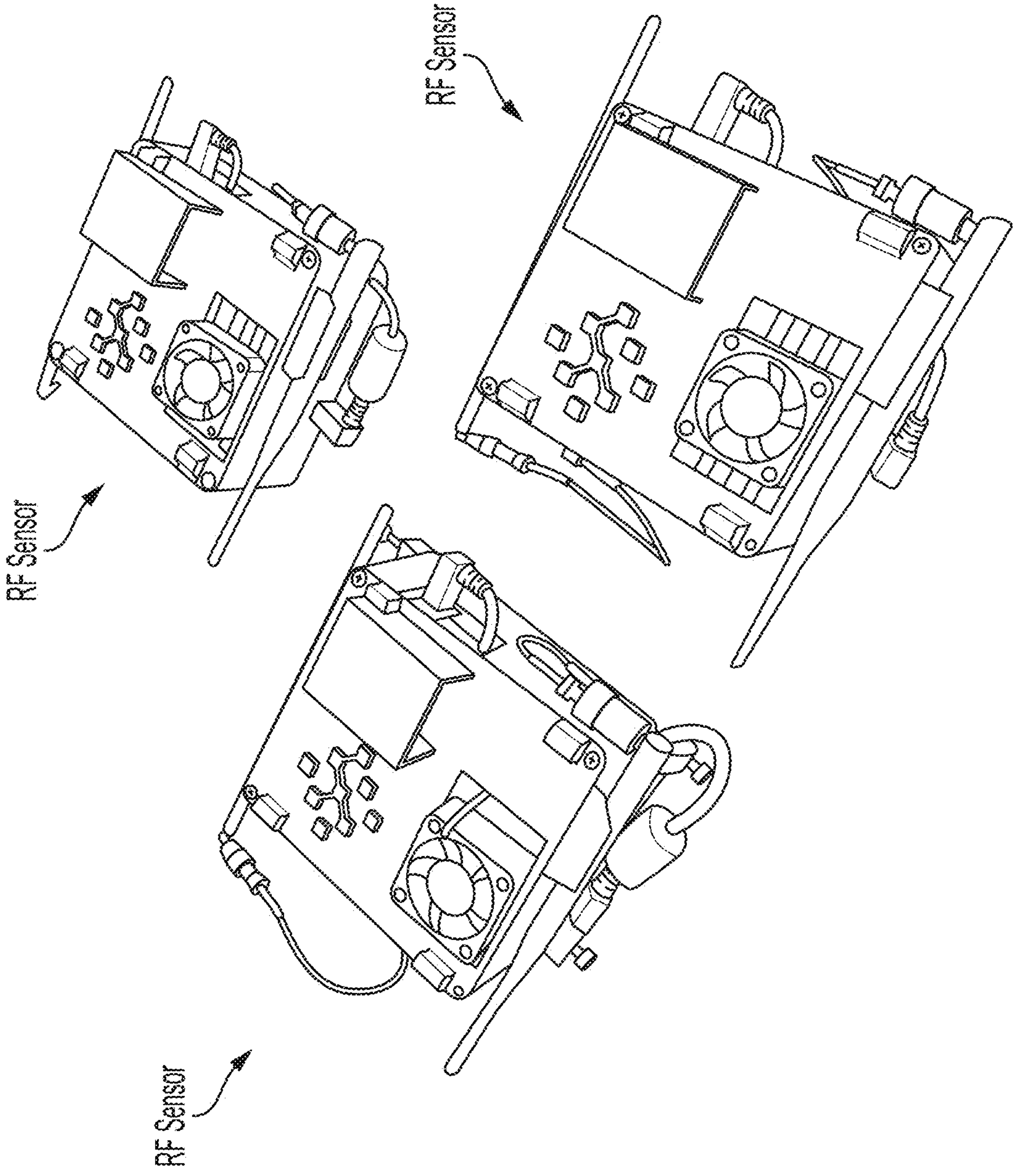
FIG. 8 is a perspective view of a plurality of RF sensors that may be included in the system of FIG. 1, according to some embodiments.
Figure 9:
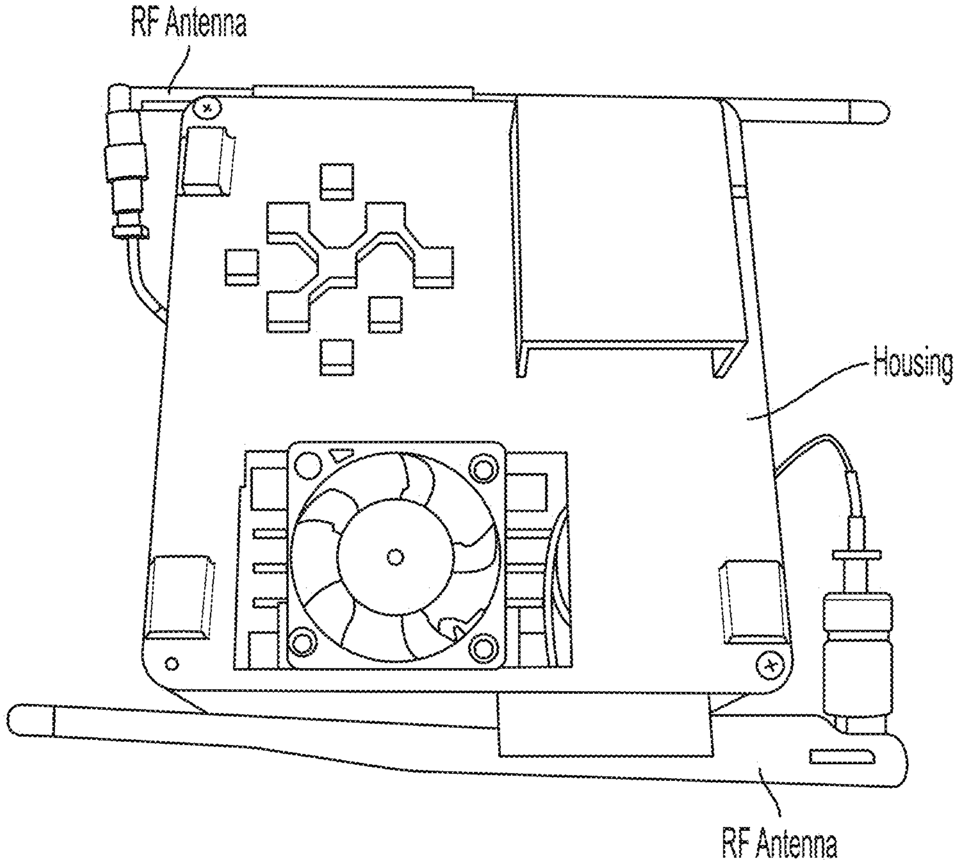
FIG. 9 is a top view of an RF sensor of FIG. 8, according to some embodiments.
Figure 10:
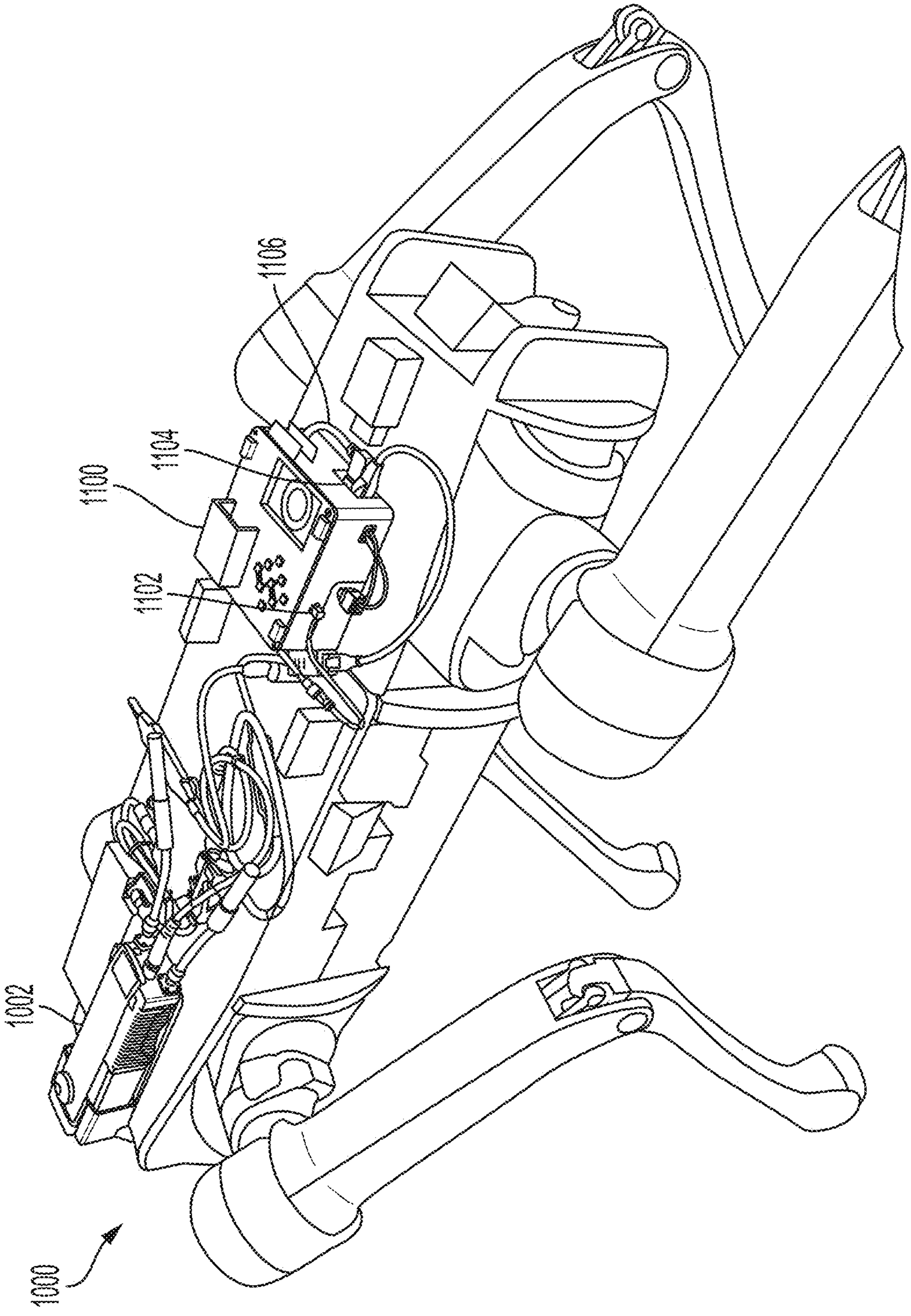
FIG. 10 is a perspective view of an RF sensor of FIG. 8 mounted on a vehicle, according to some embodiments.
Figure 11:
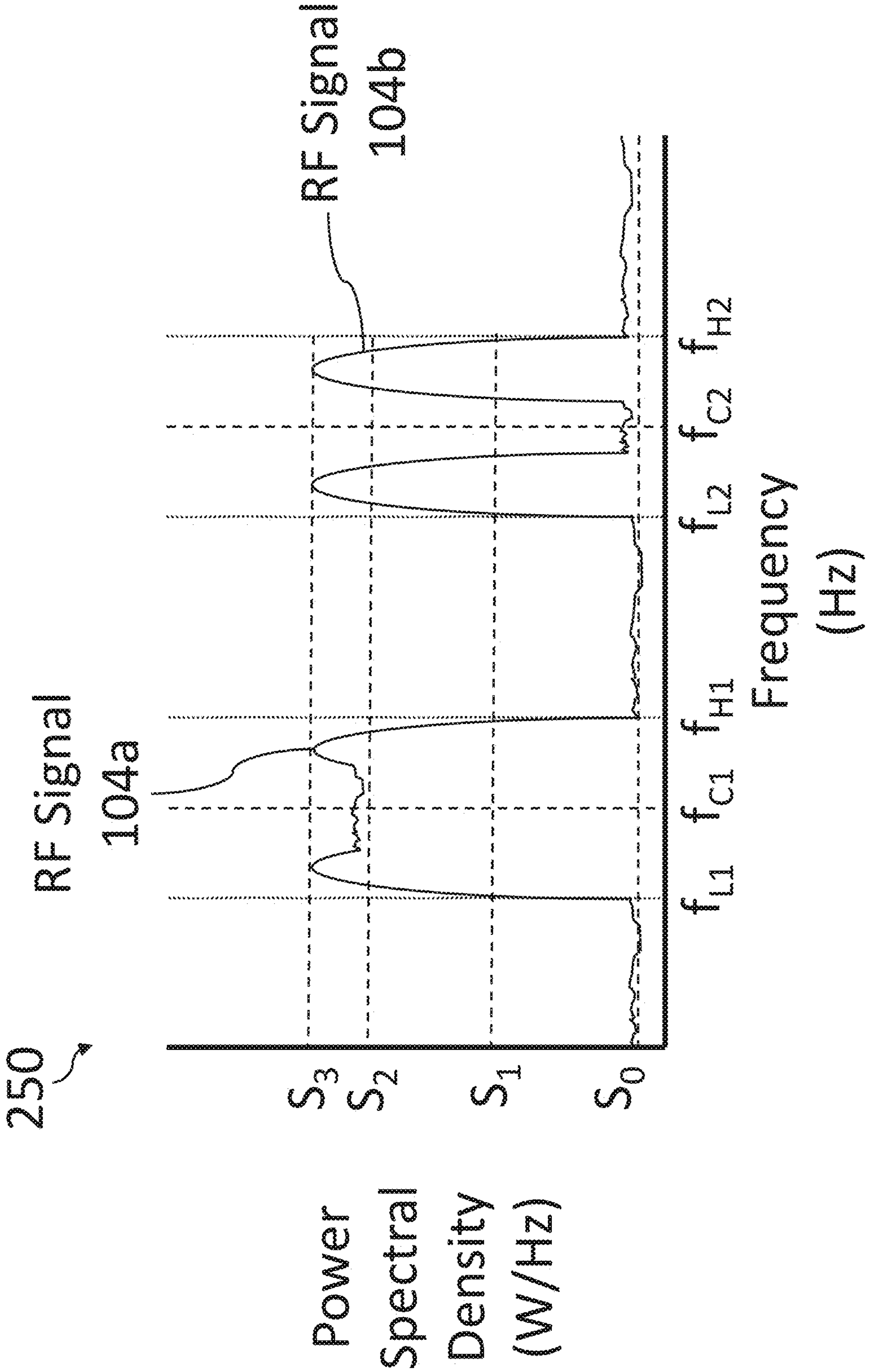
FIG. 11 is a graph of power spectral density of RF radiation that may be received by an RF sensor vs. frequency, according to some embodiments.

FIG. 8 is a perspective view of a plurality of RF sensors that may be included in the system of FIG. 1, according to some embodiments. FIG. 9 is a top view of an RF sensor of FIG. 8, according to some embodiments. FIG. 10 is a perspective view of an RF sensor of FIG. 8 mounted on a vehicle, according to some embodiments. FIG. 11 is a side view of the RF sensor and vehicle of FIG. 10, according to some embodiments.

In some embodiments, an RF sensor (e.g., 200) may include a housing having RF front-end and/or computing components within a housing, such as shown in FIG. 9. For example, one or more RF antennas of the RF front-end may be external to the housing and connected to other components of the RF front-end via cabled connection (e.g., coaxial cables). In some embodiments, multiple RF antennas may be positioned at different locations on the housing and/or may be movable to different orientations to achieve multiple diverse polarizations. In some embodiments, the orientation(s) of the RF antennas may be incorporated into aggregator inputs for determining the location of an RF source.

In some embodiments, an RF sensor (e.g., 200) may be positioned onboard a vehicle, such as shown in FIG. 10. For example, as shown in FIG. 10, an RF sensor is mounted onto the top of a robot. For instance, mounting may be achieved using fasteners such as bolts, screws, and/or other hardware sufficient to hold the RF sensor and the robot together. In some embodiments, RF signal processing techniques described herein facilitate the construction of lightweight and/or battery powered RF sensors suitable for mounting on vehicles such as robots without significantly impacting the robot's power and/or weight constraints and without compromising on the ability of the RF sensors to detect, classify, and/or locate RF sources from onboard the robot. It should be appreciated that other vehicles, such as drones, cars, planes, tanks, trains, helicopters, and/or clothing worn by people may be equipped with RF sensors described herein, as the disclosure is not limited to drones. In some embodiments, the processing power onboard and/or available to the RF sensor may depend on the payload allotment of (e.g., weight and/or space supported and/or power provided by) the vehicle. For example, where appropriate weight, space, and/or power is available, an RF sensor may be configured to perform complex processing such as estimating the direction from which an RF signal arrived, which may be used (e.g., in the aggregator) to facilitate more accurate RF source localization.

In some embodiments, an RF sensor co-located with a vehicle, such as shown in FIG. 10, may be configured to receive power from the vehicle. For example, in FIG. 10, the RF sensor 1100 is shown with a power interface 1104 connected to a power source of the vehicle 1000. In the illustrated example, the power interface includes power over ethernet (POE), though other power connections may be used. Alternatively or additionally, in some embodiments, an RF sensor may include its own power source, such as an onboard battery (e.g., within the housing).

In some embodiments, an RF sensor co-located with a vehicle, such as shown in FIG. 10, may be configured to communicate via a communication device of the vehicle. For example, in FIG. 10, the vehicle 1000 has a radio 1002 via which the RF sensor 1100 may be configured to communicate, such as via a wired connection (not shown). Alternatively or additionally, in some embodiments, an RF sensor may be configured to communicate via an onboard communication device. In some embodiments, an RF sensor may be configured to use an antenna of the vehicle to receive RF radiation, such as by connecting the antenna to an antenna interface 1102 of the RF sensor. Alternatively or additionally, such as shown in FIG. 10, the RF sensor 1100 may have its own antenna connected to the antenna interface 1102. In some embodiments, an RF sensor may be configured to use an RF front-end and/or processing hardware of the vehicle to process RF radiation, such as by connecting the processing hardware to a data interface 1106 of the RF sensor. Alternatively or additionally, such as shown in FIG. 10, the RF sensor 1100 may have onboard processing hardware and/or RF front-end (e.g., an SDR), which may be connected to the data interface 1106.

II. SIGNAL DETECTION

In some embodiments, system 100 may be configured to execute (e.g., onboard an RF sensor 200) an RF signal detection model, examples of which are described herein. It should be appreciated that a trained RF signal detection model may be used alone and/or in combination with non-machine learning techniques, such as a signal detection algorithm and/or a matched filter (e.g., which may be more sensitive to one or more matching signals than a trained model and/or other algorithm). For instance, a combination of signal detection techniques may be useful for validating signal detection predictions and/or consensus voting to determine whether a signal was detected (e.g., within a predicted portion of a spectrogram). While an RF signal detection model is shown in isolation in this section, it should be appreciated that an RF signal detection model may be used together with a trained encoding model (e.g., of an extractor) to provide identified characteristics (e.g., center frequency, bandwidth) of a detected RF signal and/or RF signal detection aspects described herein may be implemented within a trained encoding model (e.g., to implicitly perform signal detection and encode RF signals into output encodings).

Figure 12:
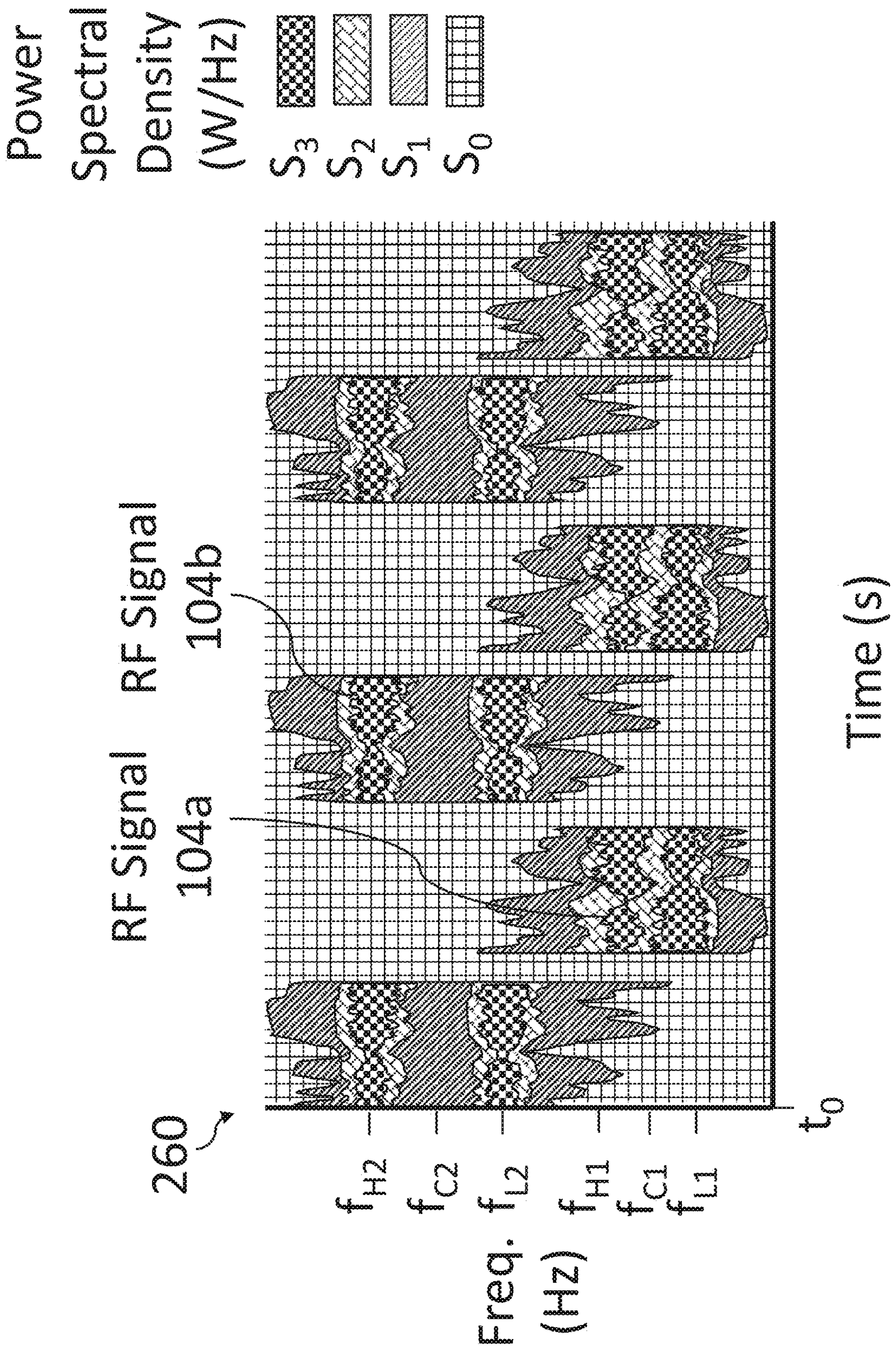
FIG. 12 is a spectrogram of the RF radiation illustrated in FIG. 11, according to some embodiments.

FIG. 11 is a graph 250 of power spectral density of RF radiation that may be received by RF sensor 200 vs. frequency, according to some embodiments. FIG. 12 is a spectrogram of the RF radiation illustrated in FIG. 11, according to some embodiments. In some embodiments, RF radiation received by RF sensor 200 may include one or more RF signals, such as RF signals 104*a* and 104*b* shown in FIGS. 11 and 12. In some embodiments, the power spectral density shown in graph 250 may be obtained by processor 222 of RF signal detection circuitry 220 by performing a DFT on digital samples of RF radiation received by antenna 202, such as directly or after the RF radiation has been digitally sampled, spectrally filtered, I/Q sampled, and/or demodulated by RF front-end circuitry 210 and provided to RF signal detection circuitry 220 as RF radiation data. In some embodiments, the power spectral density of RF radiation received at processor 222 may be at least partially filtered compared to the RF radiation received at antenna 202. Alternatively or additionally, processor 222 may be configured to filter out at least a portion of the RF radiation prior to providing RF radiation data to the trained model.

As shown in graph 250, each RF signal 104*a* and 104*b* may have a center frequency fC and an operating frequency band defined from its uppermost frequency fH and lowermost frequency fL. For example, in graph 250, RF signal 104*a* is shown as a dual sideband reduced carrier (DSB-RC) signal, with peak power spectral density S3 in the sidebands of the operating frequency band between center frequency fC1 and uppermost frequency fH1 and between center frequency fC1 and lowermost frequency fL1, and with at least power spectral density S2 at the center frequency fC1. Also shown in graph 250, RF signal 104*b* is shown as a dual sideband suppressed carrier (DSB-SC) signal, with peak power spectral density S3 in the sidebands of the operating frequency band between center frequency fC2 and uppermost frequency fH2 and between center frequency fC2 and lowermost frequency fL2. In this example, the minimum power spectral density S0 of RF signal 104*b* may be approximately 0 W/Hz at center frequency fC2, though the minimum power spectral density S0 will usually be nonzero due to the presence of noise in the operating environment 102 in which RF sensor 200 is positioned.

In some embodiments, a trained signal detection model executed by processor 222 of RF sensor 200 may be configured to detect the presence of RF signals 104*a* and 104*b* among RF radiation data provided to the trained signal detection model that includes the power spectral density data of graph 250, the spectrogram 260, and/or corresponding digital samples. For example, the trained signal detection model may be configured to output an indication of which portion(s) of the graph 250 and/or spectrogram 260 correspond to RF signals 104*a* and 104*b*. In this example, the output of the trained signal detection model may indicate the center frequency, lowermost frequency, and/or uppermost frequency of each RF signal 104*a* and 104*b*. Alternatively or additionally, the trained model may be configured to indicate the power spectral density of RF signal 104*a* and/or 104*b* at one or each such determined frequency.

In some embodiments, the trained signal detection model may be trained to detect the presence of RF signals among received RF radiation, and/or determine the operating frequency of received RF signals by providing RF signals to the trained signal detection model having various frequencies, modulation types, and/or power spectral density levels. In some embodiments, the trained model may be trained using RF signals transmitted and/or received in the operating environment 102 such that the trained model accounts for unique characteristics of the operating environment 102. For example, the operating environment 102 may include features (e.g., buildings, trees, etc.) that may impact the RF radiation, as well as the frequency, phase, and/or power spectral density levels of received RF signals. In this example, training the model using RF signals transmitted and/or received from the operating environment 102 may allow the model to detect received RF signals and/or determine the operating frequency of received RF signals even when such features are present. In some embodiments, the trained signal detection model may be trained using an input dataset generated based on real RF signals transmitted in the operating environment 102. For example, the input dataset may be generated using a system configured to receive one or more real RF signals and generate a large quantity of RF radiation data that may be used to train the model. Alternatively or additionally, the system may be configured to receive one or more simulated RF signals and generate RF radiation data using the simulated RF signal(s).

It should be appreciated that the representation of RF signals 104*a* and 104*b* as DSB-RC and DSB-SC, amplitude modulated (AM) signal is one example, and that RF signal(s) 104 could have any type of modulation, such as double sideband full carrier (DSB-FC), and/or with single sideband (SSB) rather than double sideband modulation. Alternatively or additionally, RF signal(s) 104 could be quadrature amplitude modulated (QAM), PM, and/or frequency modulated (FM).

Figure 13:
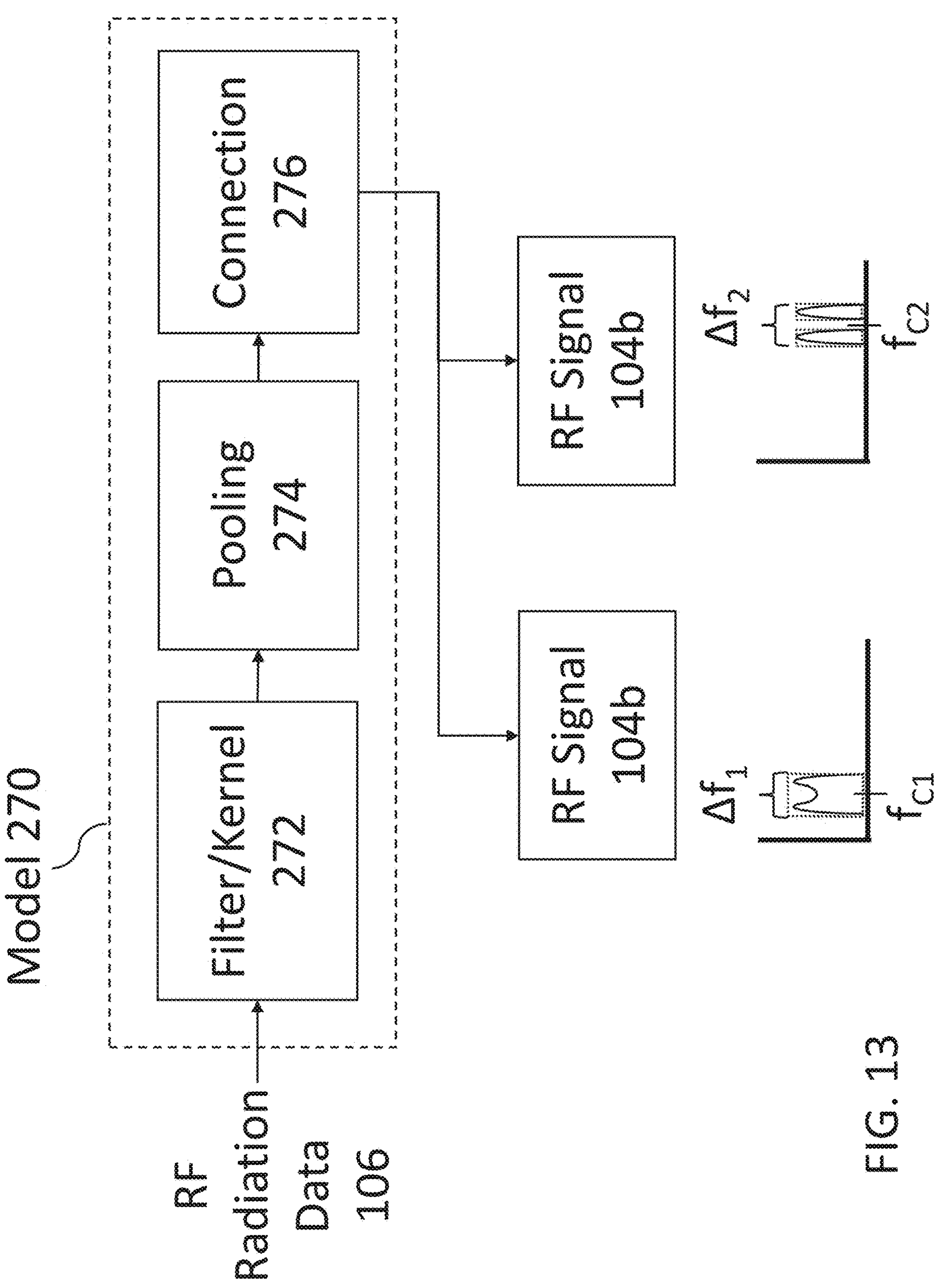
FIG. 13 is a block diagram of an example RF signal detection model that may be executed by one or more processors of an RF sensor, according to some embodiments.

FIG. 13 is a block diagram of an example RF signal detection model 270 that may be executed by one or more processors 222 of RF sensor 200, according to some embodiments. In some embodiments, model 270 may be configured to receive RF radiation data 106 indicating characteristics of RF radiation received by RF sensor 200 and provide an output indicating the presence of one or more RF signal(s) 104 among the RF radiation data 106. For example, the RF radiation data 106 may indicate power levels for different time and/or frequency components of the RF radiation. As shown in FIG. 13, model 270 may include filter and/or kernel layers 272, pooling layers 274, and connection layers 276. According to various embodiments, RF radiation data 106 may include digital samples of received RF radiation, power spectral density data of the RF radiation, and/or a time-frequency representation of the RF radiation such as a spectrogram. In some embodiments, RF signal detection model 270 may be configured using a base model trained for image recognition that is fine-tuned to recognize a portion of an input spectrogram image as indicating a signal, although in some embodiments additional layers may be provided at the input to accommodate inputting digital samples of RF radiation directly to the model.

In some embodiments, filter and/or kernel layers 272 may include one or more weighted vectors for applying to (e.g., convolving with) RF radiation data 106. For example, the filter and/or kernel layers 272 may be configured with weights set when training model 270 such that, when applied to RF radiation data 106, the outputs of filter and/or kernel layers 272 indicate which portions of RF radiation data 106 correspond to one or more RF signals. Alternatively or additionally, the outputs of filter and/or kernel layers 272 may indicate operating frequency characteristics of the RF signal(s) such as the center, uppermost, and/or lowermost frequencies of RF signal(s). In some embodiments, the filter and/or kernel layers 272 may be applied to (e.g., convolved with) time domain samples of RF radiation data 106, each indicating the power level of the RF radiation at the sampled moment in time. In some embodiments, outputs from multiple filter and/or kernel layers 272 may be pooled using pooling layers 274 to highlight portions of RF radiation data 106 that are most indicative of the presence of one or more RF signals and/or the operating frequency of the RF signal(s).

In some embodiments, connection layers 276 may be configured to detect the presence of one or more RF signals in RF radiation data 106 based on outputs from pooling layers 274. For example, the connection layers 276 may be configured to apply a loss function, used to train the model 270, to the outputs from pooling layers 274 to predict the RF signal(s) are present in RF radiation data 106, and/or the operating frequency (e.g., center, uppermost, and/or lowermost frequencies) of the RF signal(s). In some embodiments, connection layers 276 may be configured to output a confidence score for each detected RF signal and/or regressed operating frequency output. For example, during training, model 270 may be more highly rewarded for outputting accurate results with high confidence scores and/or more severely penalized for outputting inaccurate results with high confidence scores. Alternatively or additionally, in some embodiments, the connection layers 276 may be configured to classify the presence and/or operating frequency of RF signal(s) from among a plurality of portions of the RF radiation data 106 and/or operating frequencies.

In some embodiments, connection layers 276 may be configured to apply an intersection-over-union (IOU) loss function to outputs from pooling layers 274 to detect the presence of the RF signal(s). For example, connection layers 276 may be configured to select a portion of the RF radiation data 106 indicated as corresponding to an RF signal and apply the IOU loss function to the selected portion, with the output of the loss function indicating whether and/or to what extent (e.g., how likely and/or how much of) the selected portion of the RF radiation data 106 corresponds to an RF signal. In this example, the IOU loss function may result from training the model 270 to minimize the difference between selected portions of RF radiation data 106 and labeled portions of RF radiation data 106 corresponding to RF signals. In some embodiments, the IOU loss function may further result from weighted penalties that increase for larger differences between selected and labeled portions of RF radiation data. Alternatively or additionally, in some embodiments, model 270 may be configured to apply a SoftMax activation function and/or the connection layers 276 may be configured to apply a cross-entropy loss function over a plurality of selected portions of RF radiation data 106. In some embodiments, the cross-entropy loss function may have coefficients resulting from IOU loss penalties during training.

As shown in FIG. 13, the output from the trained model 270 may indicate the presence of RF signals 104*a* and 104*b* in the RF radiation data 106 (e.g., shown in the power spectral density graph of FIG. 11 and the spectrogram of FIG. 12) as well as the operating frequency band Δf1 and center frequency fC1 of RF signal 104*a* and the operating frequency band Δf2 and center frequency fC2 of RF signal 104*b*. It should be appreciated that, while the RF signals 104*a* and 104*b* are shown indicated in power spectral density graphs, the RF signals 104*a* and 104*b* may be alternatively or additionally indicated in digital samples, a spectrogram, and/or other time, frequency, and/or power level representation.

In some embodiments, model 270 may be trained using various RF signals having different frequencies, power levels, and/or modulation characteristics. For example, different frequencies and/or modulation characteristics may be learned using different types of RF sources to transmit the RF signals, and different power levels may be learned by moving the RF source to different locations within the operating environment 102 to introduce reflections and/or attenuation due to the nature of the particular operating environment 102, which will acclimate the model 270 to the operating environment 102. In some embodiments, model 270 may be trained using labeled RF radiation data generated based on real RF signals received in the operating environment 102, thereby simulating training model 270 on a large dataset of RF signals while using only a small number of real RF signals. Alternatively or additionally, model 270 may be trained using labeled RF radiation data generated based on simulated RF signals.

III. DISTRIBUTED AND/OR MODULAR SIGNAL PROCESSING PIPELINE

The inventors have recognized that separating of RF signal detection, RF signal characterization, detection of multiple RF signals received at different times and/or different RF sensors, RF source regression, and/or RF source classification into different process flow components (e.g., separate software and/or hardware packaging) provides a flexible processing architecture for performing RF signal processing using lightweight and low power components according to the available processing power of those components. This separation may be implemented through the logical separation of extraction and aggregation processing within the overall RF signal processing pipeline, which may be split between execution among multiple computing components (e.g., an RF sensor and a base station and/or a first RF sensor and a second RF sensor). It should be appreciated that extraction and aggregation processing may be performed by the same processor, as the flexibility provided by the separation facilitates using of the same architecture in different configurations and/or operating modes, including at least partially standalone RF sensor configurations and/or operating modes.

Figure 14:
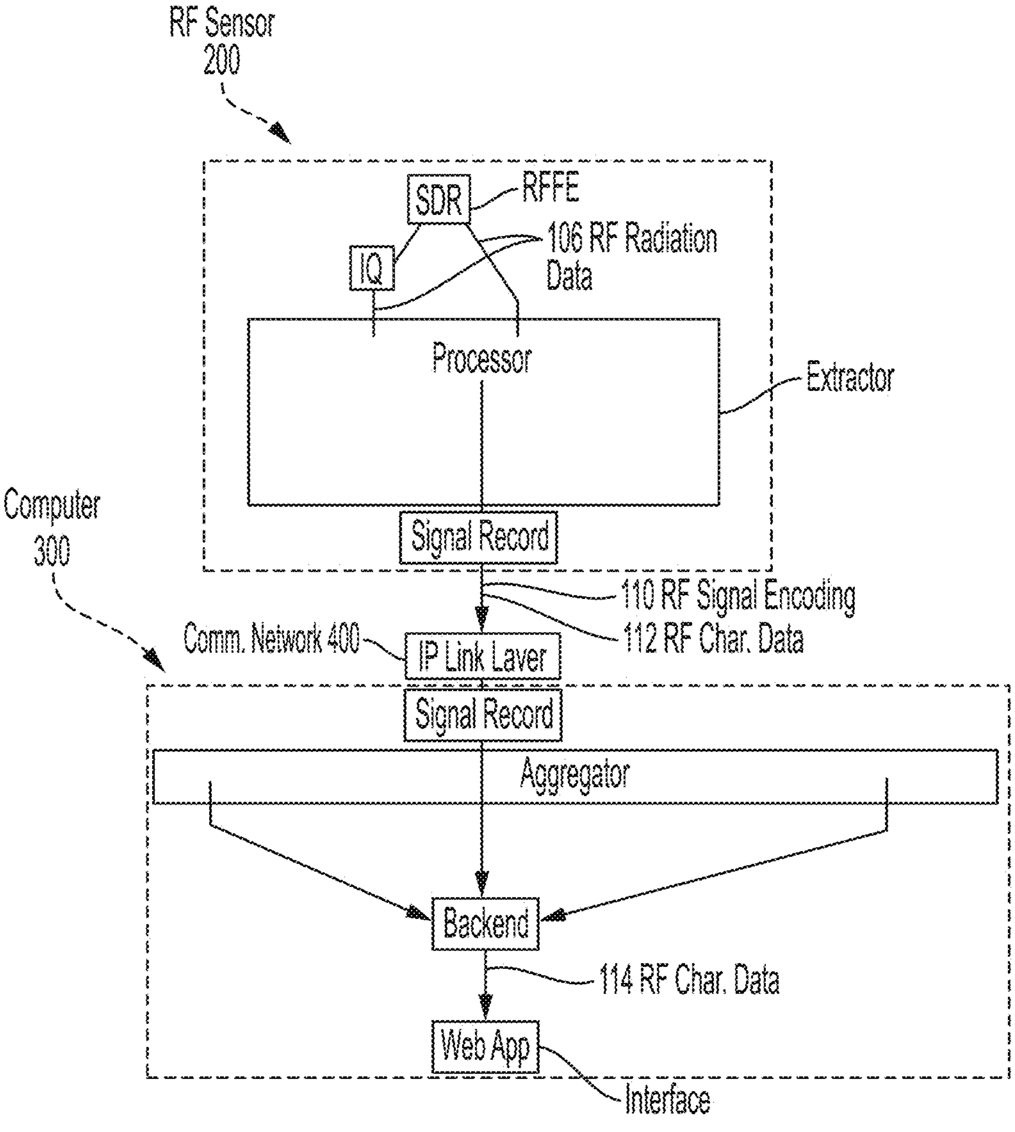
FIG. 14 is an extraction and aggregation flow diagram that may be executed by the system of FIG. 1, according to some embodiments.

FIG. 14 is an extraction and aggregation flow diagram that may be executed by the system of FIG. 1, according to some embodiments. As shown in FIG. 14, an extractor may be executed by a processor of an RF sensor 200 to obtain an indication of an RF signal received by the RF front-end of the RF sensor 200 and generate RF characteristic data 112 including an RF signal encoding 110 of the RF signal, and an aggregator may be executed by a processor of computer 300 to obtain, and further process the RF signal encoding 110 provided by the extractor. In this illustrated example, the RF sensor 200 may be configured to communicate RF characteristic data 112 over a communication network 400, which may be implemented as including an IP link layer. While FIG. 14 shows the extractor executed by RF sensor 200 and the aggregator executed by computer 300 in communication with the RF sensor 200 over a communication network 400, it should be appreciated that the process flow may be similar when the extractor and aggregator are executed by only one of RF sensor 200 and computer 300.

Figure 15:
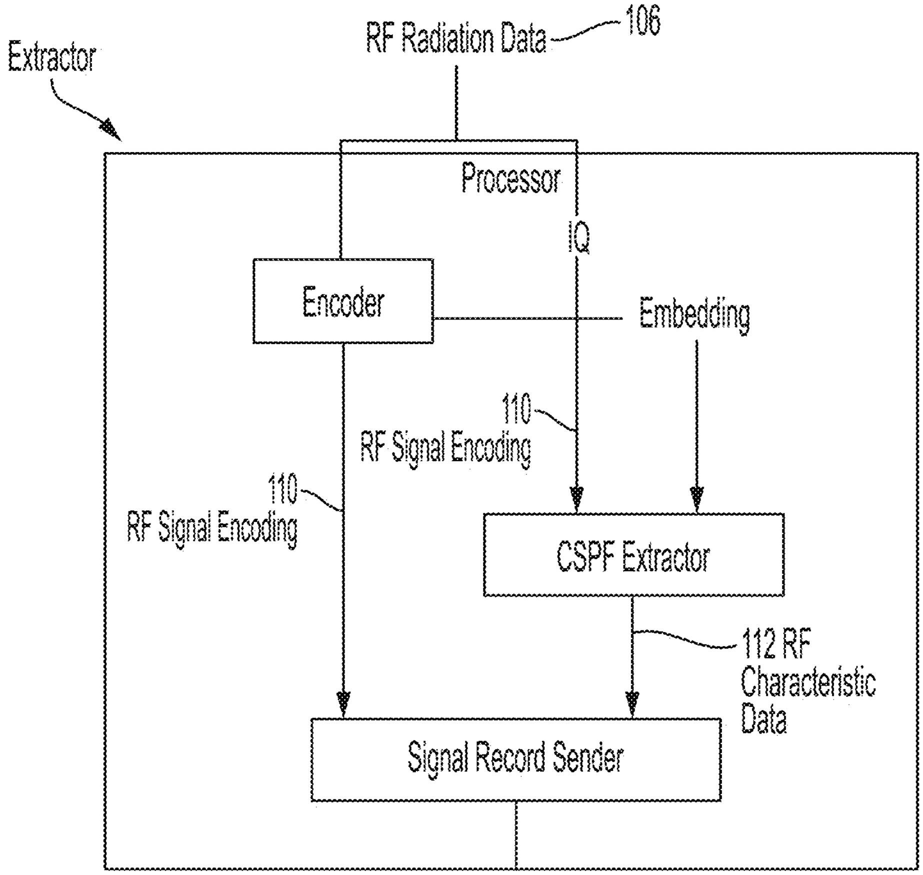
FIG. 15 is a flow diagram of the extractor of FIG. 14, according to some embodiments.

FIG. 15 is a flow diagram of the extractor FIG. 14, according to some embodiments. As shown in FIG. 15, the extractor may include an encoder (e.g., including an encoding model), a feature extractor (e.g., a classical signal processing feature (CSPF) extractor), and a record generator.

In some embodiments, the encoder may include an encoding model configured to generate an RF signal encoding 110 of an RF signal within RF radiation data received by the RF sensor 200, such as described herein including in connection with FIG. 2C. For example, as shown in FIG. 15, the encoder may be configured to receive RF radiation data 106 (e.g., including digital samples of RF radiation) including an RF signal and output an RF signal encoding 110 (e.g., compressed vector representation) of the RF signal. For instance, a single RF signal may be present in the RF radiation data 106 and/or multiple RF signals may be present. In some cases, a U-net model architecture may be trained to perform semantic segmentation on input RF radiation data 106 (e.g., a spectrogram) to classify whether a given point (e.g., pixel of an image to be compressed and reconstructed) is part of an RF signal. In other embodiments, a trained encoding model may be alternatively or additionally used with a trained signal detection model such as described herein including in connection with FIG. 2C. For example, the encoding model may be configured to receive at least partially processed RF radiation data (e.g., a subset of digital samples of an RF signal) output by a signal detection model (e.g., model 270) and output a compressed vector representation of the RF signal. In some cases, the encoding model may include Fast Fourier Transform (FFT) layers (e.g., butterfly matrices) trained to convert digital sample inputs into a time-frequency representation for RF signal detection and/or encoding.

In some embodiments, the encoding model may be trained to produce a compressed vector representation of an RF signal that is readable by a trained decoding and/or characterization model executed within the aggregator to which the compressed vector representation is transmitted via the record generator. For example, the encoding model may be trained similarly to an image compression model with inputs adjusted to accommodate digital samples of RF radiation. For instance, the encoding model may be trained to compress 1 megabyte (MB) of digital (e.g., I/Q) samples down to a 1 kilobyte (kB) RF signal encoding. In some implementations, the encoding model may use a combination of convolutional and attention layers to extract information from multiple RF signal domains, such as to enable recall and specification of certain signal characteristics. For instance, it may be beneficial to allocate some encoding layers to focus on characteristics obtainable directly from the RF signal encoding (e.g., using feature extraction within the extractor itself) while allocating other layers to focus on characteristics that are best obtained downstream (e.g., using feature extraction within the aggregator and/or via a reconstruction from a decoding model). In some cases, multiple separable 1-dimensional convolutional layers (e.g., as opposed to 2-dimensional layers) may be used for enhanced efficiency and because they may match a spectrogram more precisely.

In some embodiments, a trained encoding model may be configured to output a vector representation of an RF signal having content in dimensions of the vector representation that indicate characteristics of the RF signal. For example, the encoding model may be trained to emphasize characteristics in content in the dimensions of the vector representation, such as may cause RF signals with differing characteristics to map to relatively distance vector spaces and those with similar characteristics to map to relatively close vector spaces. As a result, in some cases, vector representations may be viewed and/or analyzed in vector space to discern characteristics and/or similarity among the underlying RF signals using less data than operating on RF radiation data (e.g., digital samples) of the RF signals directly.

In some embodiments, training the encoding model of the extractor and a downstream model of the aggregator (and/or of the extractor) in tandem may cause RF signal encodings to prioritize aspects of digital samples that contribute significantly to downstream processing by the aggregator over aspects that contribute less or not at all to such processing. For example, in this respect, the extractor and aggregator may be fine-tuned depending on the downstream processing to be performed in the particular application. In some cases, such fine-tuning may include contrastive loss implemented to train the models on signal aspects that are most useful in downstream processing, which may be alternative or in addition to reconstructive aspects trained into a decoding model. One example of contrastive loss is soft triple loss, which may be used, for instance, to train an encoding model to produce RF signal encodings usable for downstream modulation type classification by retaining in the RF signal encoding aspects of the RF signal that contribute to properly classifying the decoded RF signal according to its original modulation type. As another example, cross-representation loss functions may be used to train the encoding model to retain multiple signal aspects at once. As yet another example, further fine-tuning may be performed on a low resource device with pruning and quantization to obtain usable encodings on low cost, lightweight, and low power hardware.

In some embodiments, reconstructive aspects of the kind that may be used to train a decoding model may be alternatively or additionally used to train an encoding model, such as even where a downstream decoding model doesn't leverage those aspects, or a decoding model isn't used to reconstruct the input RF radiation data at all. For instance, reconstructive aspects may be helpful in training an encoding model to retain, in a compressed encoding, distinguishing characteristics of an RF signal (e.g., while removing characteristics that are less helpful downstream).

In some embodiments, the feature extractor of the extractor may be configured to obtain RF characteristic data 112 of the RF signal (e.g., a power level, signal-to-noise metric, RF front-end gain, center frequency, bandwidth, past signal recognition, order tracking, and/or modulation type). For example, the feature extractor may be configured to determine RF characteristic data 112 from the RF radiation data 106, such as in embodiments where the feature extractor includes a signal detection model (e.g., model 270). As another example, the feature extractor may be configured to determine RF characteristic data from RF signal data 108 output by a signal detection model, and/or using at least part of an RF signal encoding 110 output by the encoding model. In some embodiments, the feature extractor may include and/or solely use non-machine learning algorithms, such as a peak-finding algorithm for determining the center frequency of an RF signal.

It should be appreciated that features described herein may include subsets of RF characteristics that may be considered classical signal processing features (CSPFs) and/or high-level features (HLF). A CSPF and an HLF may be distinguished from one another, in some cases, by whether the feature may be obtained directly from RF signal data (e.g., from a single RF signal and/or using processing resources available onboard the RF sensor) or whether the feature requires aggregation (e.g., using multiple RF signals and/or processing resources available from a computer 300). In other cases, a CSPF and an HLF may be distinguished from one another in that a CSPF may be extracted directly from digital samples and/or a time-frequency representation of an RF signal, whereas an HLF may be obtained using aggregation and/or analysis of content in an encoding of an RF signal. For instance, an HLF may be obtained by processing content in dimensions of a vector representation of an RF signal to determine whether to associate the RF signal with another RF signal, whether to categorize an RF signal with a particular category, and/or whether the RF signal has a confidence metric of having a characteristic (e.g., modulation type) based on training encoding of such characteristics. It should be appreciated that these distinctions may not be applicable in all cases, as some features may be obtained at any point in the processing pipeline and/or by any processor in the architecture, depending on available computing resources, as the architecture may vary in this respect by implementation.

In some embodiments, the record generator may be configured to create a message including the RF signal encoding among the RF characteristic data 112 for transmission. For example, the record generator may be configured to compile (e.g., concatenate) outputs of the encoding model and the feature extractor for transmission via a communication network (e.g., an IP link layer), such as using an appropriate messaging protocol. For instance, messages transmitted via the record generator may be divisible between an RF signal encoding generated by the encoding model and other RF characteristic data 112 output by the feature extractor. In some embodiments, the extractor may further include a signal confidence filter. For example, the signal confidence filter may only permit records of RF signals having a sufficiently high confidence metric (e.g., SNR and/or probability of having a characteristic) to be transmitted to the aggregator. Alternatively or additionally, records of RF signals matching a preset filter preference (e.g., modulation type, frequency, time of reception) and/or the same RF signal received repetitively may be transmitted to the aggregator. In some embodiments, the record generator may be configured to append a time of generation and/or a frequency value (e.g., center frequency and/or bandwidth) to an RF signal encoding 110. Alternatively or additionally, a time of generation (e.g., time stamp) and/or frequency value (e.g., center frequency and/or bandwidth) may be indicated within the RF signal encoding 110 (e.g., as generated by a trained encoding model).

Figure 16:
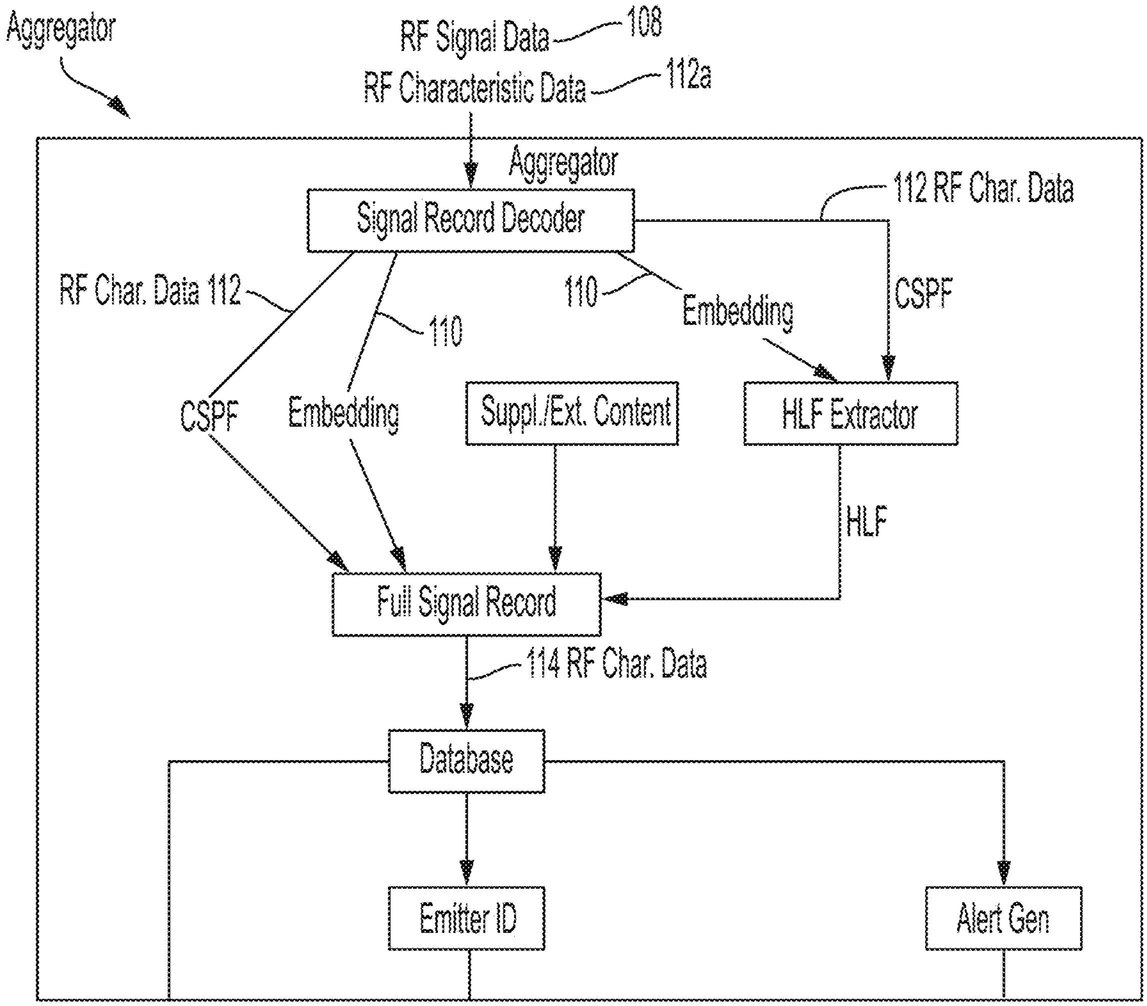
FIG. 16 is a flow diagram of the aggregator of FIG. 14, according to some embodiments.

FIG. 16 is a flow diagram of the aggregator of FIG. 14, according to some embodiments. As shown in FIG. 16, the aggregator may include a record decoder, a feature extractor (e.g., a high-level feature (HLF) extractor), a supplemental information port, a record generator, and a database.

In some embodiments, the record decoder may be configured to separate RF signal encodings 110 from other RF characteristic data 112 received from the extractor, such as using partitioning according to concatenation performed by the extractor's record generator. In some embodiments, the received and separated RF characteristic data 112 may be stored in the database and also provided to the feature extractor for further downstream processing.

In some embodiments, the aggregator may include a decoding model (not shown in FIG. 16) configured to decompress the RF signal encoding 110 from the extractor to obtain an RF signal decoding, such as a decompressed representation of RF signal data of an RF signal received by RF sensor 200. For example, the decompressed representation of the RF signal data may be an approximation of a time-frequency representation of the RF signal and/or an approximation of digital samples of RF radiation including the RF signal. For instance, a classifier such as XGBoost may be used to extrapolate features of an RF signal from an RF signal encoding that make the full RF signal unnecessary for many practical signal processing tasks. In some embodiments, the RF signal encoding received by the decoding model may be somewhat lossy, resulting in an imperfect reconstruction of the RF signal, while still being substantially accurate for subsequent RF processing. The inventors recognized that permitting some loss permits low-bandwidth transmission of RF signal data from RF sensor 200 for subsequent processing by computer 300, which may have greater computing resources, and/or may reduce the computational complexity of downstream processing as compared to analyzing a full RF radiation data stream. And, by training the extractor to emphasize characteristics that are useful for downstream processor and to discard other content (e.g., in tandem with the aggregator and/or characterizing components of the extractor), aspects of RF signals lost during encoding (with or without decoding) may have only minimal impact on accuracy of subsequent processing.

In some embodiments, the feature extractor may be configured to obtain RF characteristic data 114 from the decompressed RF signal data output by a decoding model. For example, a discrete decoding model may be useful where it is desirable to store a reconstruction in the database, or where multiple downstream models may be executed in parallel. For instance, a discrete decoding model may make each parallel downstream model more efficient by consolidating the decoding task. In other embodiments, such as shown in FIG. 16, the feature extractor may be configured to process RF signal encodings 110 directly, such as with input layers trained to implicitly decode the encodings prior to and/or in parallel with performing further processing. For example, techniques used in a discrete decoding model may be incorporated into layers of a downstream processing model, such as the feature extractor shown in FIG. 16, as may be efficient in applications with only one trained downstream processing pipeline. It should be appreciated, however, that decoding within the aggregator may be implemented flexibly.

In some embodiments, the feature extractor may be configured to obtain RF characteristic data 114 from RF signal encodings 110 (e.g., with or without first decoding an encoding). For example, RF characteristic data 114 obtained by the feature extractor may include a classification and/or regression of a type of RF source that transmitted the RF signal and/or a location of the RF source that transmitted the RF signal. In the same or another example, RF characteristic data 114 may include an indication that the same RF signal was received by multiple RF sensors 200 and/or by the same RF sensor 200 at multiple different times. Example features that may be obtained by the feature extractor include the center frequency, bandwidth, number of channels, modulation type, pulse type, modulation order, and/or baud rate of the RF signal, and/or the extent to which the RF signal can be considered analog or digital. For instance, an RF signal encoding 110 (e.g., vector representation) may be indicative of such features, such as by having such features encoded therein by a trained encoding model, such that a trained model trained together with the trained encoding model may determine such features in further processing. In some embodiments, features may be extracted using a trained model, whereas features may be alternatively or additionally extracted using non-machine learning algorithms using extrapolated signal features decoded from the RF signal encoding, such as based on content in dimensions of a vector representation of an RF signal.

In some embodiments, the supplemental information port may be configured to obtain additional information (e.g., from a vehicle onboard which the RF sensor 200 is disposed) for classifying a type of and/or localizing the RF source and/or for localizing the RF sensor 200 (e.g., as a frame of reference for localizing the RF source and/or for providing to a user over the interface). For example, supplemental information that is obtained at the supplemental information port may include IMU data of an IMU co-located with an RF sensor 200 that received the RF signal, GNSS data of a GNSS unit co-located with the RF sensor, temperature data of a temperature monitoring unit co-located with the RF sensor, vehicle heading and/or bearing data of a vehicle co-located with the RF sensor, and/or antenna directivity data of an antenna of the RF sensor. For instance, such information may be provided by the RF sensor over the communication network 400, and/or may be provided from the vehicle over a separate channel, and/or may be stored in memory onboard the vehicle and/or RF sensor and offloaded later. In some embodiments, supplemental information may include terrain data, such as elevation data of the geography of the operating environment, such as may be included in an input to a trained model to account for multi-path effects (e.g., RF signal reflections off of geographic features such as sharp cliffs and/or mountains).

In some embodiments, information received at the supplemental information port may be further converted to an appropriate format for use as at least part of an input of a trained model such that the output may indicate a predicted location of an RF source. For example, the conversion may take into account the input formatting of the trained model and the training data used when training the model. In some embodiments, the trained model may be trained (e.g., at least fine-tuned) using live data obtained from a particular vehicle with which an RF sensor is co-located, which may result in more accurate localization predictions (e.g., by taking into account IMU, GNSS, vehicle heading, and/or temperature biases unique to the particular vehicle). For example, the trained model may be calibrated during one or more test flights using an RF source with a known location. For instance, some RF signals detected during calibration (e.g., emitted by one or more devices co-located with the RF sensor) may be associated with the operating environment (e.g., for purposes of identifying new RF signals) and/or may be filtered out (e.g., from reporting detected RF signals) during subsequent operation following calibration. Other information used as at least part of an input of a trained model, such as antenna directivity data, may be stored in the database and loaded rather than and/or in addition to being received via the supplemental information port.

In some embodiments, the record generator of the aggregator may be configured to compile outputs of the record decoder, feature extractor, and supplemental information port for storing in the database and/or providing to the interface. For example, signal records stored in the database may be used for RF source classification and/or localization. For instance, the signal records stored in the database may track a list of RF signals received over time and sorted by the RF source that transmitted the RF signals and/or the RF sensors that received the RF signals, as well as times at which the RF signals were received and locations of the RF sensors at the times of signal reception. Alternatively or additionally, the signal records stored in the database may be used to determine whether, when, and/or from where an RF signal from a new (e.g., unknown) RF source has been detected. For example, an action may be taken, such as generating and sending an alert to the interface and/or storing associated RF signal data to disk, when a new or user-categorized RF source has been detected. In some embodiments, each RF source may be given a unique identifier for tracking and/or action purposes. For example, when a new RF source is detected and/or specified by a user via the interface (e.g., using a category), a new unique identifier may be created and added to the database.

According to various embodiments, database fields used by the aggregator may include the most recent detection time of an RF source, time-frequency of an RF signal, power level and/or SNR of an RF signal, bandwidth of an RF signal, modulation type of an RF signal, confidence as to the modulation type, location of an RF source as a point and/or within a specified geographic radius, confidence of the location, user-defined categories, unique RF source identifier, RF sensor location uncertainty, and/or terrain-related uncertainty (e.g., expected multi-path impact due to geographical elevation). In some embodiments, confidence metrics may be provided from trained models, and may indicate the expected deviation of a regression and/or classification provided by the model. In some embodiments, RF sensor location uncertainty may be provided by the modality (e.g., GNSS) that provided the RF sensor location (e.g., the location of the vehicle on which the RF sensor is positioned). In some embodiments, RF sensors may be further tracked by executing (e.g., on computer 300) a particle filter that receives updates from the aggregator regarding detected RF signals, RF sensor locations, and/or RF source types and/or locations.

FIG. 17 is an example code flow of the extractor and aggregator of FIG. 17, according to some embodiments. As shown in FIG. 17, the RF front-end (e.g., SDR) may provide RF radiation data (e.g., I/Q samples) for encoding and feature extraction by the extractor resulting in a signal record for transmission via the IP link layer. Also shown in FIG. 17, the aggregator may split the signal record from the extractor and combine the RF signal encoding (e.g., embedding) contained therein with supplemental information to obtain additional feature extraction using downstream processing. Also shown in FIG. 17, the aggregator may update the database and, depending on the RF signal reported, perform an associated action (e.g., create a new RF source identifier and/or generate an alert) for the interface (e.g., accessible via a web-app).

In some embodiments, RF signals indicating detection and/or the location of an RF source may be used to update and/or refine a list of RF sources stored in the database. For example, multiple detected RF signals by multiple RF sensors classified and/or regressed as coming from the same RF source may be used to increase a confidence metric that the RF source is present in the operating environment, and/or may provide additional data points for fixing the location of the RF source. In the same or another example, an RF source may be determined to be moving when localized at different points and/or within different radii at different times with sufficient confidence. For instance, different times of reception of RF signals at RF sensors having directional antennas oriented in different directions at the times of reception (e.g., based on known orientations of the directional antennas obtained from vehicle bearing and/or heading data) may strongly indicate that the RF source that transmitted the RF signals is moving.

Figure 18A:
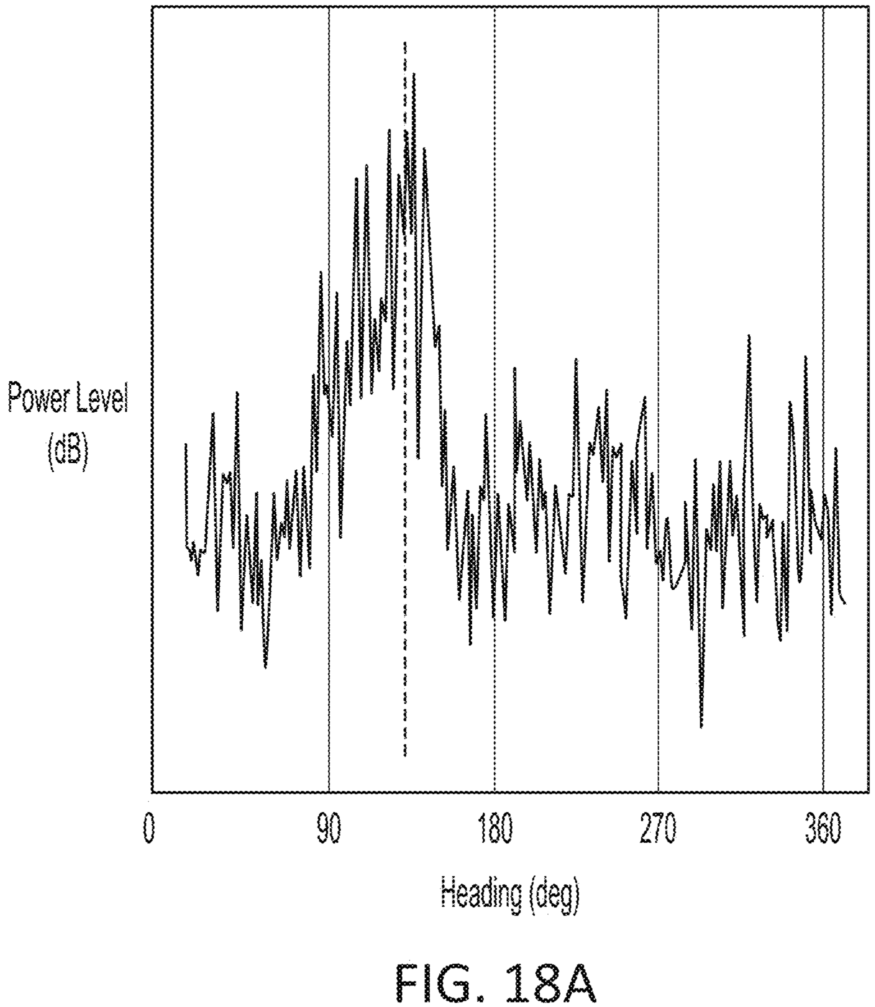
FIG. 18A is a graph of received RF radiation power vs. vehicle heading for an RF sensor co-located with a vehicle, according to some embodiments.
Figure 18B:
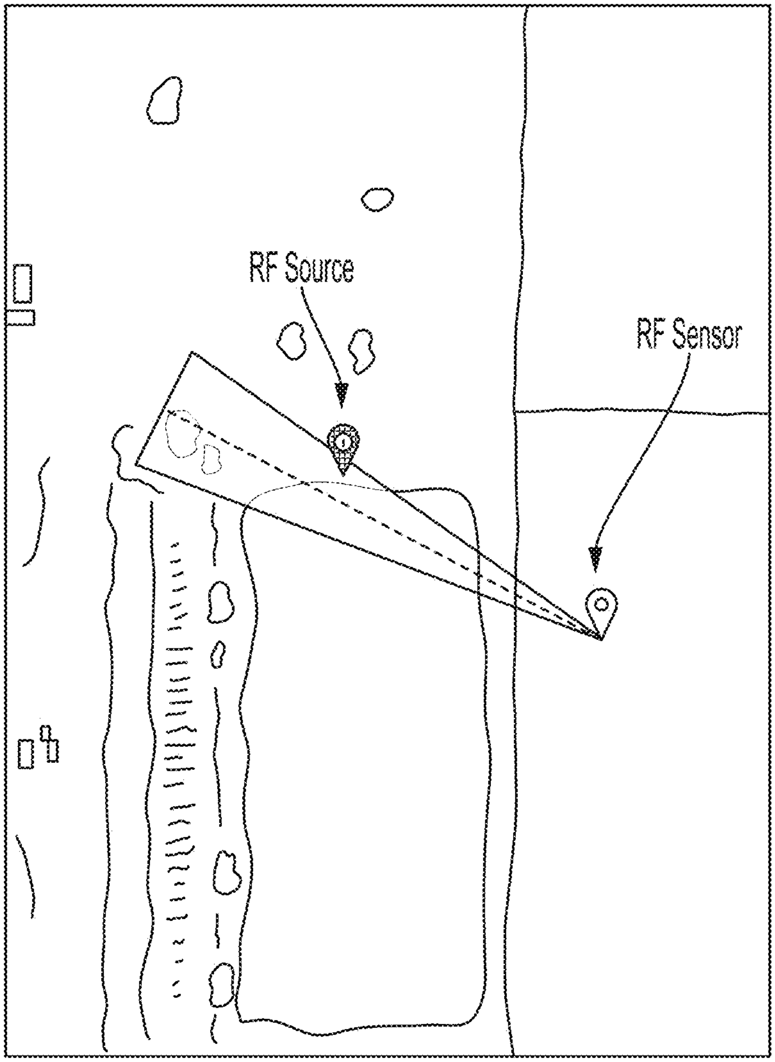
FIG. 18B is a map illustrating the position of the vehicle and the directivity pattern of an RF antenna of the RF antenna co-located with the vehicle, according to some embodiments.

FIG. 18A is a graph of received RF radiation power vs. vehicle bearing for an RF sensor co-located with a vehicle, according to some embodiments. FIG. 18B is a map illustrating the position of the vehicle and the directivity pattern of an RF antenna of the RF sensor based on the vehicle bearing data, according to some embodiments.

As described herein, an aggregator may be configured to receive supplemental information, such as antenna directivity data of an RF sensor, vehicle bearing information of a vehicle co-located with the RF sensor, and/or geographic (e.g., elevation) data characterizing the operating environment, which may be useful for localizing an RF source of an RF signal received by the RF sensor. As shown in FIG. 18A, vehicle bearing data may be used to determine the bearing of the vehicle when an RF signal was received by finding the vehicle bearing at which the highest radiation power was received at the RF sensor. And, as shown in FIG. 18B, antenna directivity data of an RF antenna of the RF sensor may be used together with a location of the vehicle (e.g., from a GNSS unit onboard the vehicle) and the vehicle bearing to provide an estimated location of the RF source of the RF signal. In some embodiments, a trained model may be able to output the expected location of the RF source more precisely than the directivity cone illustrated in FIG. 18B, resulting in a more precise point and/or radius within which the RF source is located. Alternatively or additionally, multiple RF signals classified as being received from the same RF source may provide multiple overlapping directivity cones that may be used to more precisely fix the point and/or radius within which the RF source is located.

Figure 40:
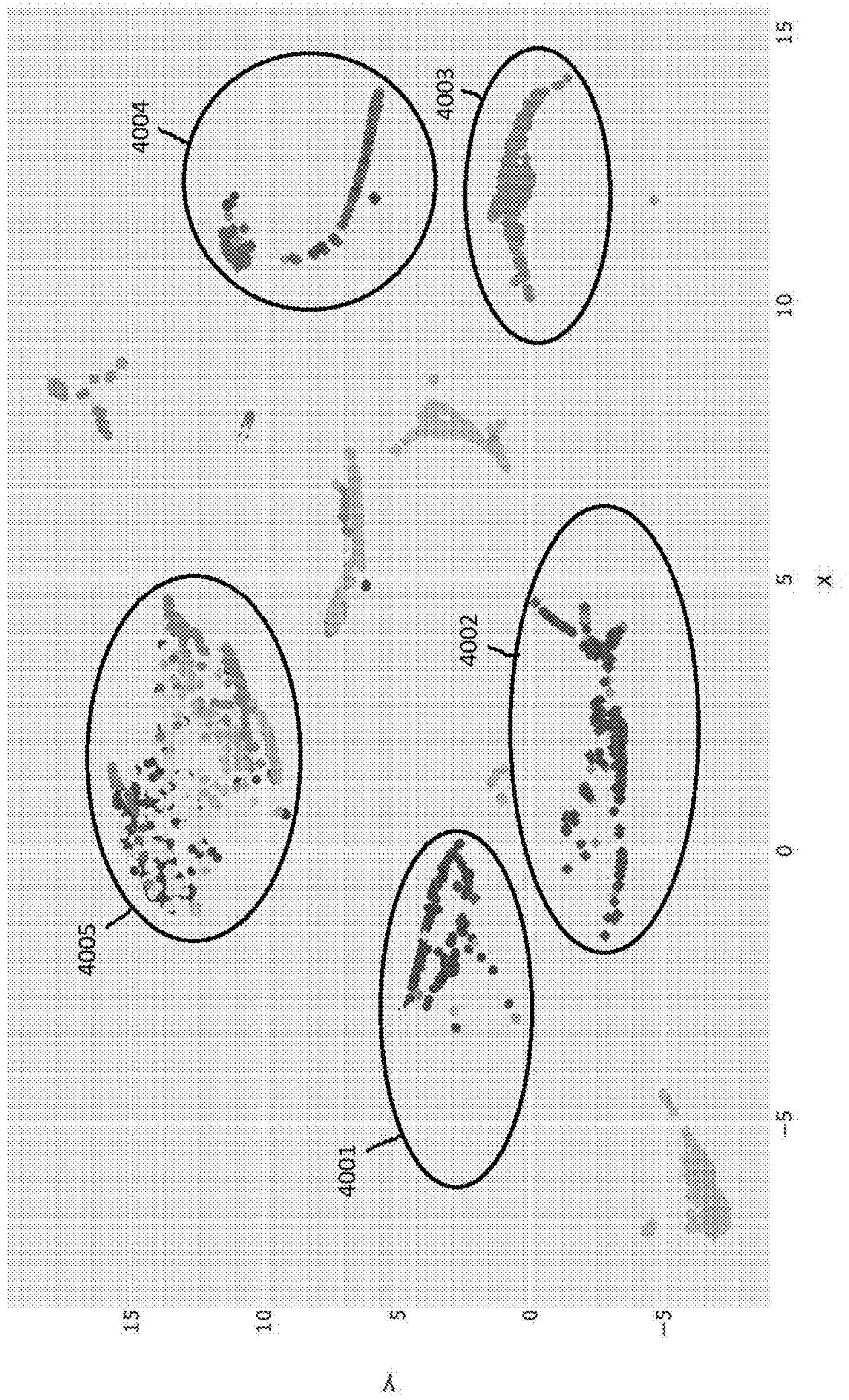
FIG. 40 is a graph of RF signal content within dimensions of a plurality of example vector representations plotted against a compressed dimension space, according to some embodiments.

FIG. 40 illustrates a graph of RF signal content within dimensions of a plurality of example vector representations plotted against a compressed dimension space, according to some embodiments.

In some embodiments, the example vector representations in FIG. 40 may be generated using one or more trained models, such as model 4100. For example, the vector representations may be output by a trained model executed onboard an RF sensor having received the RF signals represented in the vector representations. Alternatively or additionally, the vector representations may be output by a plurality of trained models onboard a plurality of respective RF sensors having received the RF signals represented by the vector representations. For instance, where multiple trained models are used, the multiple trained models may be trained, at least in part, using a same set of labeled training data so as to produce vector representations having similar content in response to receiving similar RF radiation data as inputs.

In some embodiments, the compressed dimension space shown in FIG. 40 may provide a statistical representation of content in multiple dimensions of the illustrated vector representations. For example, the values shown in FIG. 40 may not correspond to actual values of any particular dimensions of the vector representations, but rather may correspond to a statistical aggregation of content over multiple dimensions. For instance, vector representations may be analyzed (e.g., using statistical operations) on content in dimensions of the vector representations in the aggregate rather than or in addition to using content in any particular dimension or set of dimensions, though in some cases it may be useful to limit the dimensions on which analysis is to be performed, whether for increased computational efficiency and/or where some dimensions may be trained and/or known not to express certain characteristics.

In some embodiments, the compressed dimension space shown in FIG. 40 may be obtained by applying a dimension reduction technique such as a statistical algorithm that identifies and preserves content from dimensions contributing most significantly to the aggregate content of a vector representation while excising content from dimensions contributing less significantly, such as not at all. In some embodiments, the number of vector dimensions used in vector representations described herein may be based at least in part on a number and/or dimensionality of layers of the encoding model, which in turn may be based on the desired accuracy and/or usability of the resulting vector representations at the expense of model complexity, size in memory occupied by vector representations at the expense of memory and/or communication network bandwidth, and/or computing resources needed to process the vector representations downstream.

In some embodiments, vector representations may be organized into groupings within a shared vector space. For example, groupings may indicate certain similarities in characteristics of the underlying RF signals, such as similar modulation types, pulse rates, probabilities of being analog and/or digital, and/or other characteristics whether well-defined or not. For instance, groupings of vector representations may result from training a trained model to separate content in dimensions of vector representations of RF signals having different characteristics, and/or training a trained model to separate and/or associate vector representations of RF signals desired to be separated and/or associated based on any quantitative and/or qualitative known, expected, and/or intended relationship among the underlying RF signals.

In the illustrated example, five groups of vector representations are circled within FIG. 40 corresponding to give groupings of vector representations that may result from training the model(s) that generated the vector representations. For instance, grouping 4001 may correspond to vector representations of Wi-Fi signals, grouping 4002 may correspond to vector representations of analog, FM signals, grouping 4003 may correspond to Bluetooth signals, and grouping 4004 may correspond to cellular signals. In some embodiments, an encoding model may be trained on such signals to produce content in dimensions of the resulting vector representations that separates the vector representations as shown in FIG. 40, which may result in newly detected RF signals (e.g., not those on which the model was trained) being populated in similar vector space to that of the RF signals on which the model was trained.

In some embodiments, vector representations of RF signals may be in a vector space associated with noise, such as due to training an encoding model to associate certain RF radiation data with noise rather than with a particular type of RF signal. For instance, in FIG. 40, grouping 4005 may correspond to noise. It is notable that in FIG. 40, the content of vector representations within grouping 4005 vary significantly, even with respect to vector representations that are closely proximate one another in the vector space, as compared to other groups. For example, a trained model may distinguish aspects of random noise in content in dimensions of vector representations that cause a wide variety of noise radiation (e.g., having very different apparent frequency, modulation, pulse rate, etc.) to occupy similar vector space, such as based on perceived similarity in statistical distribution (e.g., Gaussian distribution) over one or more of such characteristics (e.g., frequency).

It should be appreciated that not all groupings of vector representations are labeled in FIG. 40 and that some vector representations could be grouped differently. For instance, some vector representations may be grouped differently depending on the dimensions of the vector space being analyzed and/or where some of the vector representations are filtered out by a constraint (e.g., on characteristics of the vector representations such as frequency), which may impact which characteristics are the basis for grouping vector representations and/or which characteristics are emphasized in statistically reduced dimensions of the vector representations.

In some embodiments, vector representations of RF signals may be compared and/or associated with one another using content in dimensions of the vector representations, such as the content shown in FIG. 40. For example, an association and/or disassociation among multiple vector representations may be based on vector-based distance between the vector representations in vector space, whether taking into account all or only some of the dimensions of the vector space, and/or when using a compressed dimension space such as shown in FIG. 40. For instance, a Euclidean distance may be used on some or all dimensions of the vector space, and/or in a compressed dimension space, and/or a distance between statistical representations (e.g., using mean and variance of vector representations in some or all dimensions) of the vector space may be used.

In some embodiments, vector representations may be associated with in vector space in response to user input. For example, user input may designate a category for RF signals within a predetermined vector-based distance of a reference RF signal. For instance, categorization around a reference RF signal may be performed in response to the user engaging an option in a user interface to categorize around an RF signal presented in the user interface, which may be set as the reference RF signal. Alternatively or additionally, the user may engage an option in a user interface to categorize on characteristics of RF signals, which may be determined using content in dimensions of the vector representations. For instance, the user may set thresholds on certain characteristics (e.g., confidence metric of an AM signal and/or bandwidth) that may be used to filter vector representations, such as when the characteristics are determined using content in dimensions of the vector representations.

IV. TRAINED ENCODING MODELS

In some embodiments, an extractor of system 100 may be configured to execute one or more trained encoding models on RF radiation data (e.g., digital samples of RF radiation) received via an RF antenna (e.g., onboard an RF sensor). Examples of trained encoding models are described herein.

Figure 41A:
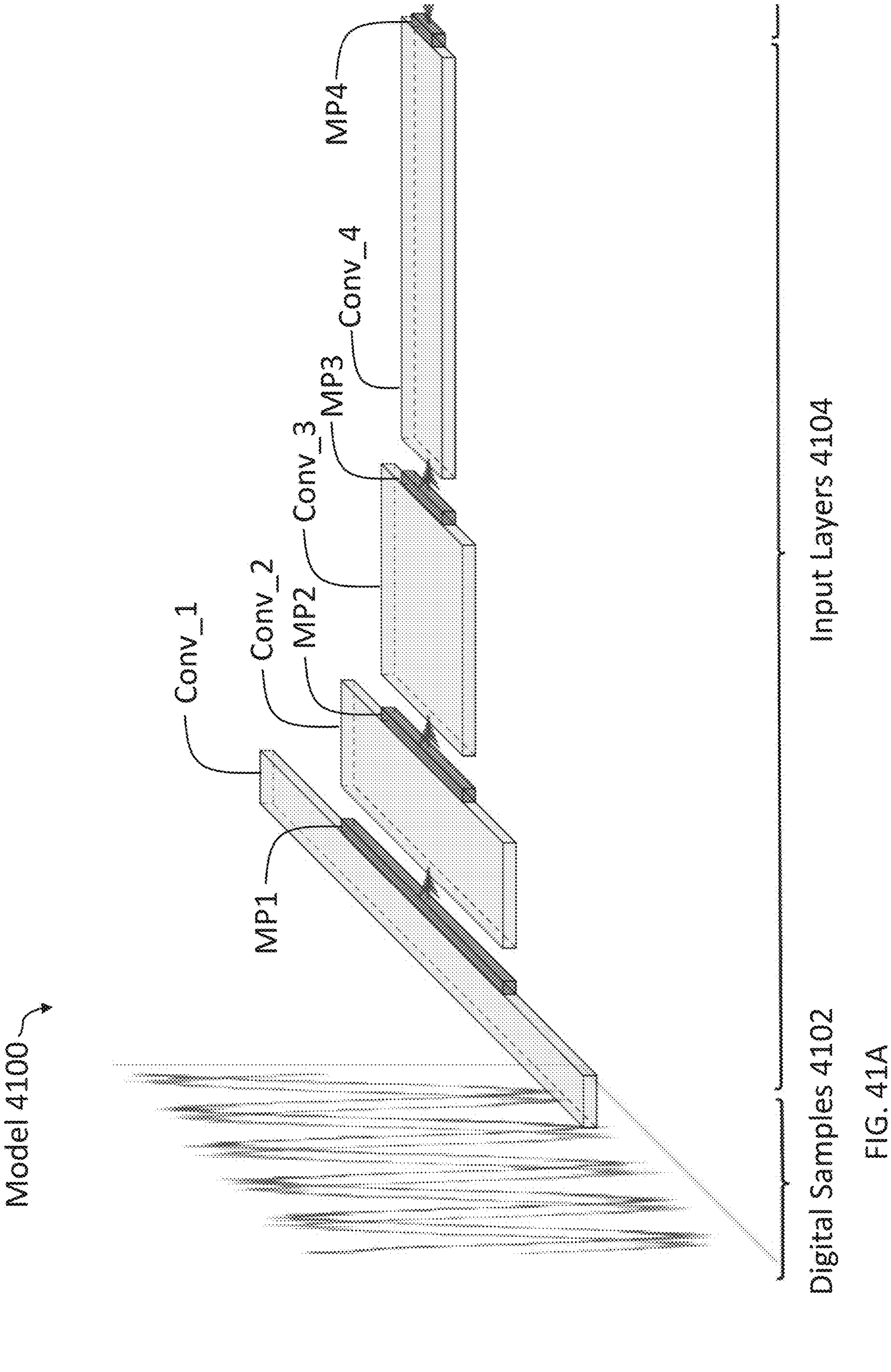
FIG. 41A is a block diagram of a first portion of an example trained encoding model that may be executed within an extractor, according to some embodiments.
Figure 41B:
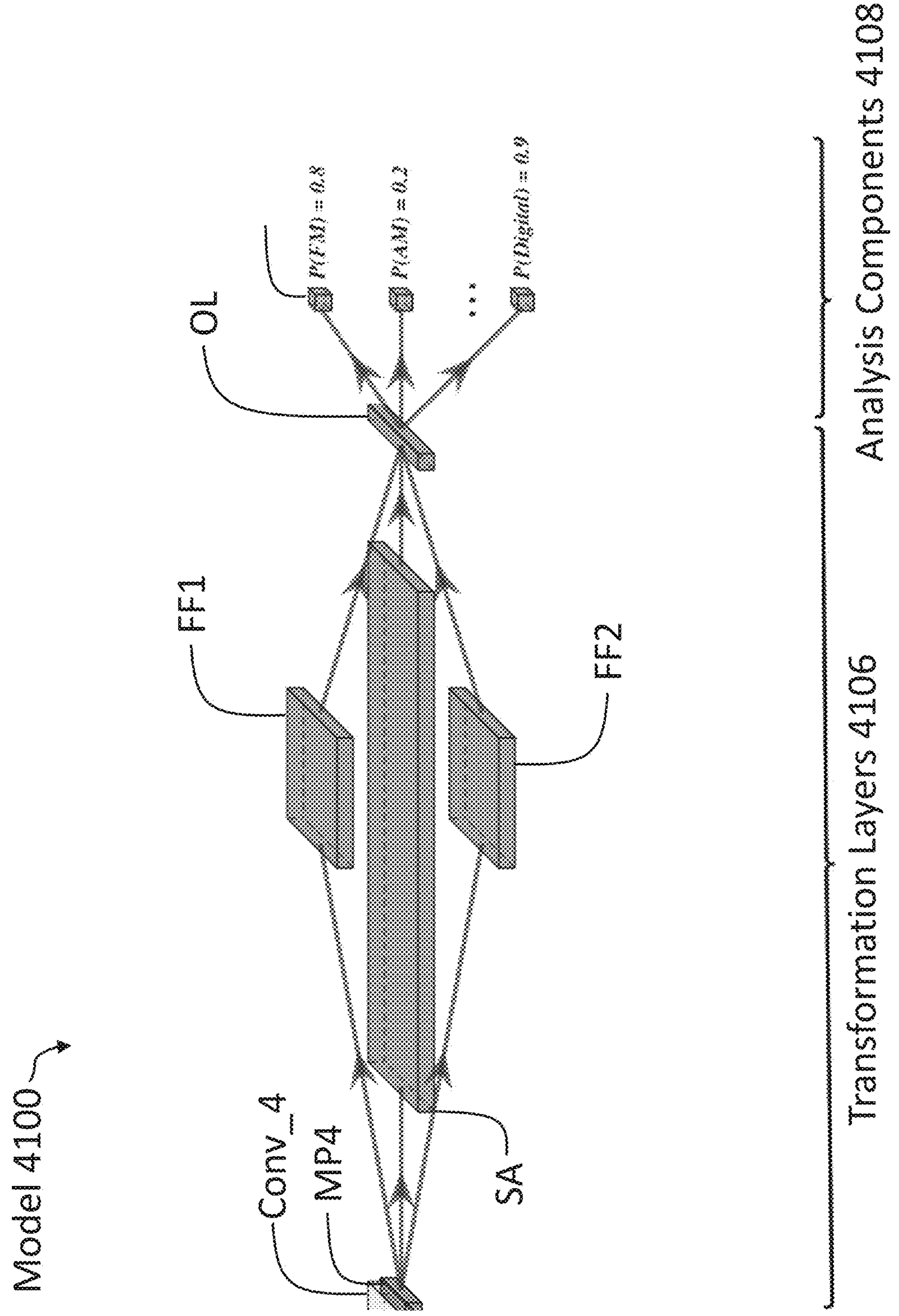
FIG. 41B is a block diagram of a second portion of the trained encoding model of FIG. 41A, according to some embodiments.

FIG. 41A is a block diagram of a first portion of an example trained encoding model 4100 that may be executed within an extractor, according to some embodiments. FIG. 41B is a block diagram of a second portion of trained encoding model 4100, according to some embodiments.

In some embodiments, model 4100 may be configured to output an indication of characteristics of an RF signal within RF radiation data input to model 4100. For example, model 4100 may be configured to output RF characteristics of the RF signal derived from the RF radiation data, and/or model 4100 may be configured to output a vector representation of an RF signal detected within the RF radiation data, such as a compressed vector representation. For instance, content in dimensions of the vector representation may indicate characteristics of the RF signal, such as when analyzed with content in dimensions of vector representations of other RF signals, and/or when input to a trained model trained together with model 4100 to determine characteristics indicated in the content.

In some embodiments, model 4100 may include input layers 4104 (FIG. 41A) and transformation layers 4106 (FIG. 41B). For example, input layers 4104 may be configured to receive and process RF radiation data input to model 4100 and emphasize characteristics of an RF signal within the RF radiation data and transformation layers 1406 may be configured to encode emphasized characteristics of an RF signal within the RF radiation data into content of a vector representation output from model 4100. Alternatively or additionally, input layers of a trained model may be configured to receive a portion of RF radiation data including an RF signal as indicated by a trained signal detection model, such as a filtered digital sample stream and/or a portion of a spectrogram, depending on the implementation.

In some embodiments, input layers 4104 may be configured to receive and process RF radiation data, such as digital samples 4102 of RF radiation. For example, digital samples 4102 may be received via RF antenna of an RF sensor. For instance, model 4100 may be executed onboard an RF sensor using digital samples of RF radiation received by an RF antenna of the RF sensor and digitized using an SDR, though it should be appreciated that model 4100 need not be implemented onboard an RF sensor.

In some embodiments, input layers 4104 may be trained to emphasize characteristics of an RF signal present in input RF radiation data. For example, such characteristics may include a center frequency, operating frequency band, power level, bandwidth, modulation type, pulse rate, and/or SNR of the RF signal, an extent to which the RF signal matches another RF signal, an extent to which the RF signal is analog and/or digital, and/or a type and/or location of an RF source that transmitted the RF signal. For instance, input layers 4104 may be trained using closed-loop training with another (e.g., downstream) model, at the output of which characteristics of input RF radiation data are labeled. As one example, input layers 4104 may be inverted and attached at the output of model 4100 so as to reconstruct the input RF radiation data for labeled training against the RF radiation data as it was received, which may be effective to train input layers 4104 to preserve distinguishing characteristics of the RF radiation data even if the resulting reconstructed RF radiation data is not itself useful for downstream processing. As shown in FIG. 41A, input layers 4104 include four convolutional layers Conv_1, Conv_2, Conv_3, Conv_4, each followed by a respective max pooling (MP) layer MP1, MP2, MP3, and MP4. Alternative or additional layers may be included, depending on the implementation, such as the dimensionality of the input data and/or the desired level of model accuracy weighed against model complexity (e.g., and associated need for computing resources).

In some embodiments, transformation layers 4106 may be configured to encode characteristics of an RF signal emphasized by input layers 1404 into content of a vector representation. As shown in FIG. 41B, transformation layers 4106 include feed forward (FF) layers FF1 and FF2 and a self-attention (SA) layer. In some embodiments, transformation layers 1406 may be trained to weight portions of input RF radiation data based on the extent to which they contribute to emphasized characteristics of an RF signal therein (e.g., less weight for portions that contribute less). For example, the illustrated SA layer may be trained to filter out such content using closed-loop training with another (e.g., downstream) model at the output of which characteristics of input RF radiation data are labeled and compared.

In some embodiments, model 4100 may further include analysis components 4108 (FIG. 41B). For example, analysis components 4108 may be configured to provide statistical analysis of outputs from output layer (OL) of model 4100. For instance, in FIG. 41B, analysis components 4108 include components configured to output a confidence metric (e.g., indicating a probability) that an RF signal within digital samples 4102 is analog and FM, analog and AM, and digital. In some embodiments, analysis components 4108 may be configured to determine a confidence metric of a characteristic using content in dimensions of a vector representation output from OL of model 4100. For example, input layers 4104 and/or transformation layers 4106 of model 4100 may be trained to emphasize characteristics corresponding to probabilities determined using analysis components 4108, such as by comparing labeled probability data against outputs of analysis components 4108. For instance, analysis components 4108 may compare some or all dimensions of a vector representation to respective thresholds to determine probabilities for various characteristics, whether individually or using a same operation. Alternatively or additionally, analysis components 4108 may be configured to perform logistic regression and/or classification on a vector representation output from model 4100.

Alternative or additional examples of analysis components 4108 may be configured to output a confidence metric that an RF signal within digital samples 4102 is a chirp, frequency-shift keyed (FSK), amplitude shift keyed (ASK), phase shift keyed (PSK), chirp spread spectrum (CSS), and/or part of a particular constellation. In some embodiments, analysis components 4108 may be replaceable (e.g., in whole or in part) with alternative analysis components configured to output other probabilities without changing layers of mode 4100. For example, model 4100 may be trained with some or all analysis components 4108 such that, analysis components 4108 with which model 4100 was trained may be added or removed without impacting functionality of other parts of model 4100. In some embodiments, analysis components 4108 may be added with which model 4100 was not trained, such as a component that compares an output vector representation with another vector representation (e.g., by performing a vector-based distance determination). For instance, some analysis components 4108 may benefit from training of model 4100 on labels other than the output to be obtained from those components.

V. SOURCE CLASSIFICATION AND LOCALIZATION MODELS

In some embodiments, an aggregator of system 100 may be configured to execute one or more trained source type classification and/or regression and/or RF source localization models on RF signal encodings received from an extractor. Examples of trained RF source type classification and/or regression and RF source localization models are described herein.

Figure 19:
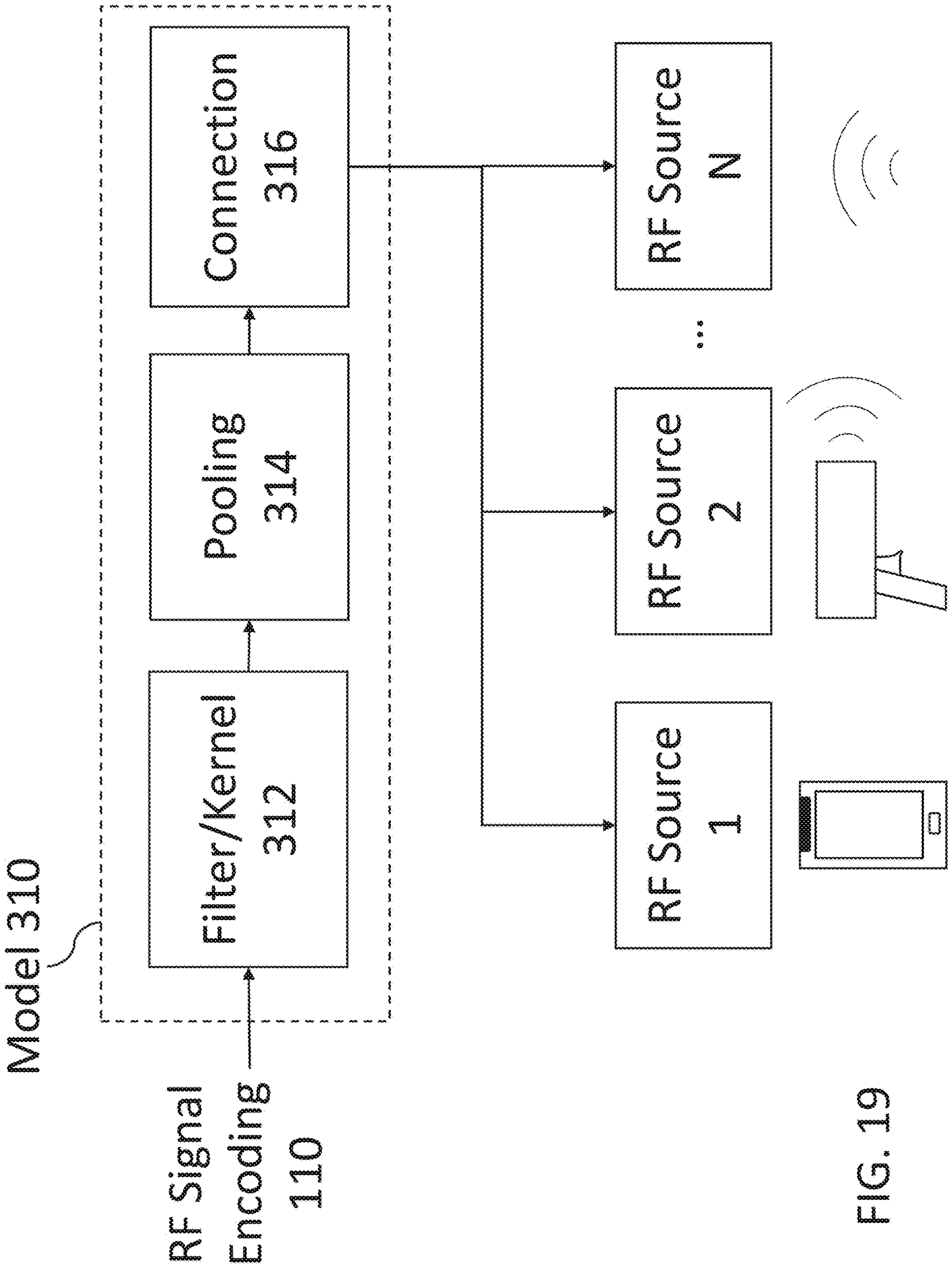
FIG. 19 is a block diagram of an example RF source classification model that may be executed within an aggregator, according to some embodiments.

FIG. 19 is a block diagram of an example RF source classification model 310 that may be executed by one or more processors of computer 300, according to some embodiments. In some embodiments, model 310 may be configured to classify the type of RF source that transmitted an RF signal 104 using an RF signal encoding 110 of the RF signal 104. For example, as shown in FIG. 19, model 310 may include filter and/or kernel layers 312, pooling layers 314, and connection layers 316. It should be appreciated that models described herein may be alternatively or additionally configured to use a decoded version of an RF signal encoding.

In some embodiments, filter and/or kernel layers 312 may include one or more weighted vectors for applying to (e.g., convolving with) RF signal encoding 110. For example, the filter and/or kernel layers 312 may be configured with weights set when training model 310 such that, when applied to RF signal encoding 110, the outputs of filter and/or kernel layers 312 indicate characteristics of the RF source that transmitted the RF signal(s) 104, such as using the frequency, phase, power level, and/or modulation characteristics indicated in the RF signal encoding 110. In some embodiments, the filter and/or kernel layers 312 may be applied to (e.g., convolved with) embeddings representing time domain samples of RF radiation that include the RF signal(s) 104, each indicating the power level of the RF radiation at the sampled moment in time. Alternatively or additionally, the filter and/or kernel layers 312 may be applied to other portions of the RF signal encoding 110. In some embodiments, outputs from multiple filter and/or kernel layers 312 may be pooled using pooling layers 314 to highlight portions of the RF signal encoding 110 that are most indicative of the type of RF source that transmitted RF signal(s) 104.

For example, the connection layers 316 may be configured to classify the type of RF source that transmitted RF signal(s) 104 from among a plurality of types of RF sources, such as from among the types of RF sources the model 310 was trained to classify. In the example shown in FIG. 19, the plurality of types of RF sources may include RF sources 1-N. As shown, RF source 1 may be to a mobile communication device that transmits RF signals in the frequency range(s) around 900 MHz and/or 2.4 GHz, RF source 2 may be a vehicle speed radar device that transmits RF signals in the frequency range around 24 GHZ, and RF source N may be a Wi-Fi router (e.g., 802.11a, b, g, n, and/or ac) that transmits RF signals in the frequency range(s) around 2.4 GHz and/or 5 GHz. Referring to the example of FIGS. 2A-3, model 310 may be configured to classify RF signal 104*a* as transmitted by RF source 1 and RF signal 104*b* as transmitted by RF source 2 based on RF signal encodings 110 indicating characteristics of the RF radiation that includes RF signals 104*a* and 104*b*. It should be appreciated that the RF source types illustrated herein are intended as examples and, according to various embodiments, model 310 may be configured to classify any suitable type of RF source. In some cases, a model may be further configured to further classify within a class of RF sources, such as in the case of a type of RF source operable in a number of channels (e.g., in time, frequency, code-domain, etc.), where the model may be further configured to classify the channel in which the RF source is detected to operate. In some embodiments, model 270 may be configured to apply a SoftMax activation function, and the connection layers 316 may be configured to apply a cross-entropy loss function to outputs from pooling layers 314 to classify portions of the RF signal encodings 110 as being transmitted by RF sources. In some embodiments, connection layers 316 may be further configured to provide a confidence score. For example, during training, model 270 may be more highly rewarded for outputting accurate results with high confidence scores and/or more severely penalized for outputting inaccurate results with high confidence scores.

In some embodiments, model 310 may be trained using various RF signals from different types of RF sources having different frequencies, power levels, and/or modulation characteristics. Alternatively or additionally, during training, the RF source may be moved to different locations within the operating environment 102 to introduce reflections and/or attenuation due to the nature of the particular operating environment 102, which will acclimate the model 310 to classifying the types of RF sources in the operating environment 102. In some embodiments, model 310 may be trained using RF signal encodings generated based on real RF signals received in the operating environment 102, thereby simulating training model 310 on a large dataset of RF signals while only using data from a small number of real RF signals. Alternatively or additionally, model 310 may be trained using RF signal encodings 110 generated based on simulated RF signals.

Figure 20:
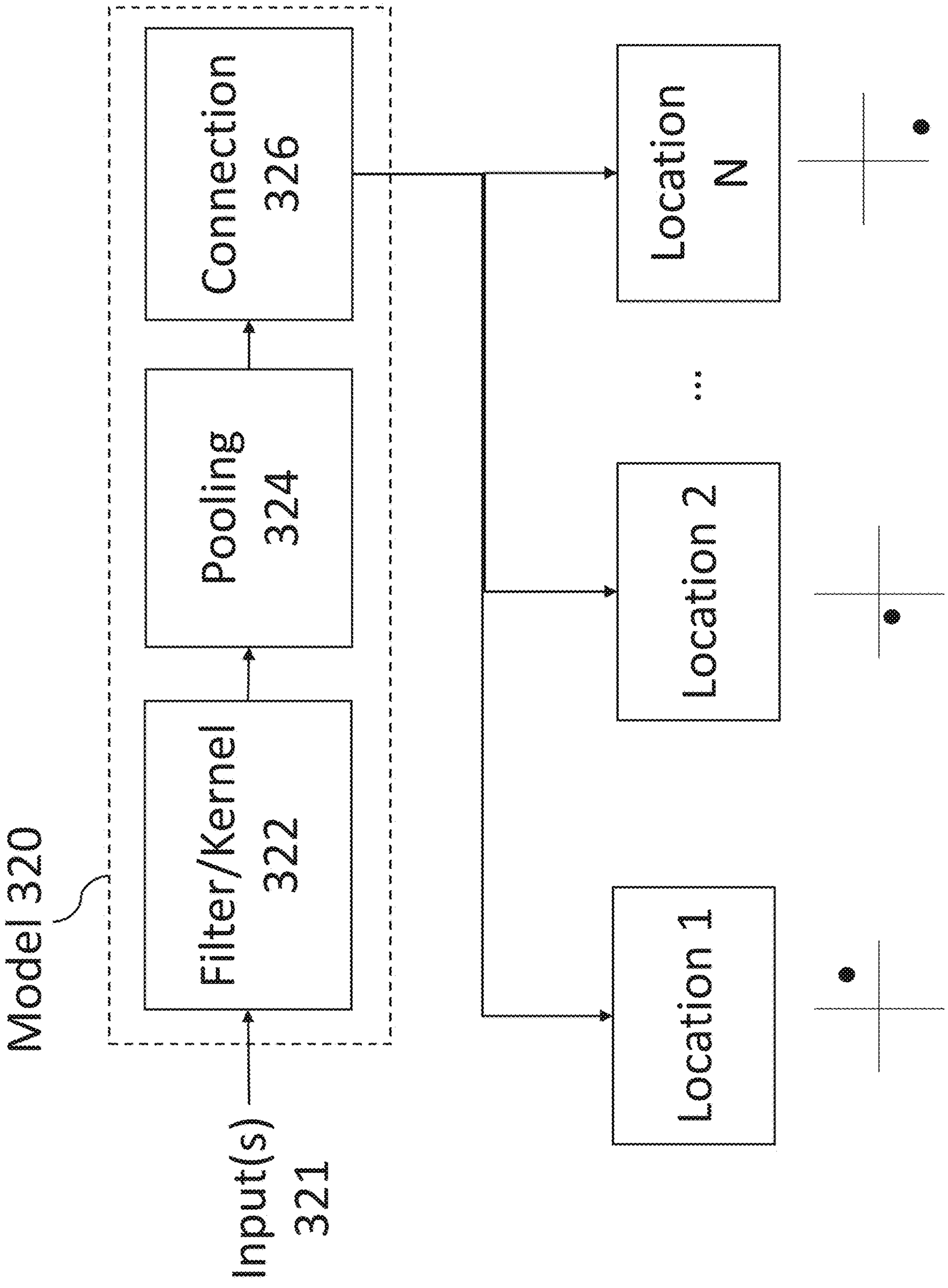
FIG. 20 is a block diagram of an example RF source localization model that may be executed within an aggregator, according to some embodiments.

FIG. 20 is a block diagram of an example RF source localization model 320 that may be executed by one or more processors of computer 300, according to some embodiments. In some embodiments, model 320 may be configured to classify and/or regress the location of the RF source that transmitted RF signal(s) 104 using one or more inputs 321. For example, as shown in FIG. 20, model 320 may include filter and/or kernel layers 322, pooling layers 324, and connection layers 326. According to various embodiments, input(s) 321 may include one or more RF signal encodings 110, decoded versions of RF signal encodings, RF characteristic data 112, supplemental information, and/or combinations thereof.

In some embodiments, filter and/or kernel layers 322 may include one or more weighted vectors for applying to (e.g., convolving with) input(s) 321. For example, the filter and/or kernel layers 322 may be configured with weights set when training model 320 such that, when applied to input(s) 321, the outputs of filter and/or kernel layers 322 indicate likely locations of the RF source of RF signal(s) 104 within the operating environment 102 of system 100, such as using the operating frequency, power level(s), and/or modulation characteristics of the RF signal(s) 104 and/or supplemental information indicated in the RF input(s). In some embodiments, the filter and/or kernel layers 322 may be applied to (e.g., convolved with) embedded representations of digital (e.g., time domain) samples of received RF radiation that include RF signal(s) 104, each indicating the power level of the RF signal(s) 104 at the sampled moment in time. Alternatively or additionally, in some embodiments the filter and/or kernel layers 322 may be applied to other portions of the input(s). In some embodiments, outputs from multiple filter and/or kernel layers 322 may be pooled using pooling layers 324 to highlight embedded representations of samples of RF signal(s) 104 and/or portions of input(s) 321 that most indicate the location of the RF source of RF signal(s) 104.

In some embodiments, connection layers 326 may be configured to regress and/or classify the location of the RF source of RF signal(s) 104 based on outputs from pooling layers 324. For example, the connection layers 326 may be configured to apply a loss function, used to train the model 320, to the outputs from pooling layers 324 to predict the location (e.g., in a one, two-, or three-dimensional space) of the RF source of RF signal(s) 104. In some embodiments, connection layers 326 may be configured to output a confidence score for the regressed location output. In some embodiments, the predicted location may be projected onto a map of the operating environment 102 to obtain a predicted location of the RF source of RF signal(s) 104 in the operating environment 102. In some embodiments, connection layers 326 may be configured to apply a Euclidean distance loss function trained to minimize distance between the selected location and the actual location of the RF source. For example, the Euclidean distance loss function may result from training the model 320 to minimize the two-dimensional and/or three-dimensional distance between selected and labeled RF source locations. In some embodiments, connection layers 326 may be further configured to apply a function that increases loss non-linearly with distance, which may penalize larger distance errors more strongly than closer distance errors. Alternatively or additionally, connection layers 326 may be configured to apply a step function that applies constant penalties within concentric circles about labeled RF source locations, which may cause some selected locations having different distances to the labeled RF source locations to be equally penalized.

Alternatively or additionally, in some embodiments, the connection layers 326 may be configured to determine the location of the RF source of RF signal(s) 104 from among a plurality of locations, such as those locations the model 320 was trained to classify. In the example shown in FIG. 20, the plurality of locations may include locations 1-N. As shown, location 1 may be classified as located in the upper right quadrant of a two-dimensional space, location 2 may be classified as located in the lower left quadrant of the space, and location N may be classified as located in the lower right quadrant of the space. For instance, the quadrants of the two-dimensional space may correspond to different rooms within the operating environment 102. In some embodiments, locations 1-N may be classified more precisely than in quadrants, such as at the respective points within the quadrants as shown in FIG. 20. It should be appreciated that the locations illustrated herein are intended as examples and, according to various embodiments, model 320 may be configured to classify any locations of RF sources in suitable spaces.

Figure 21:
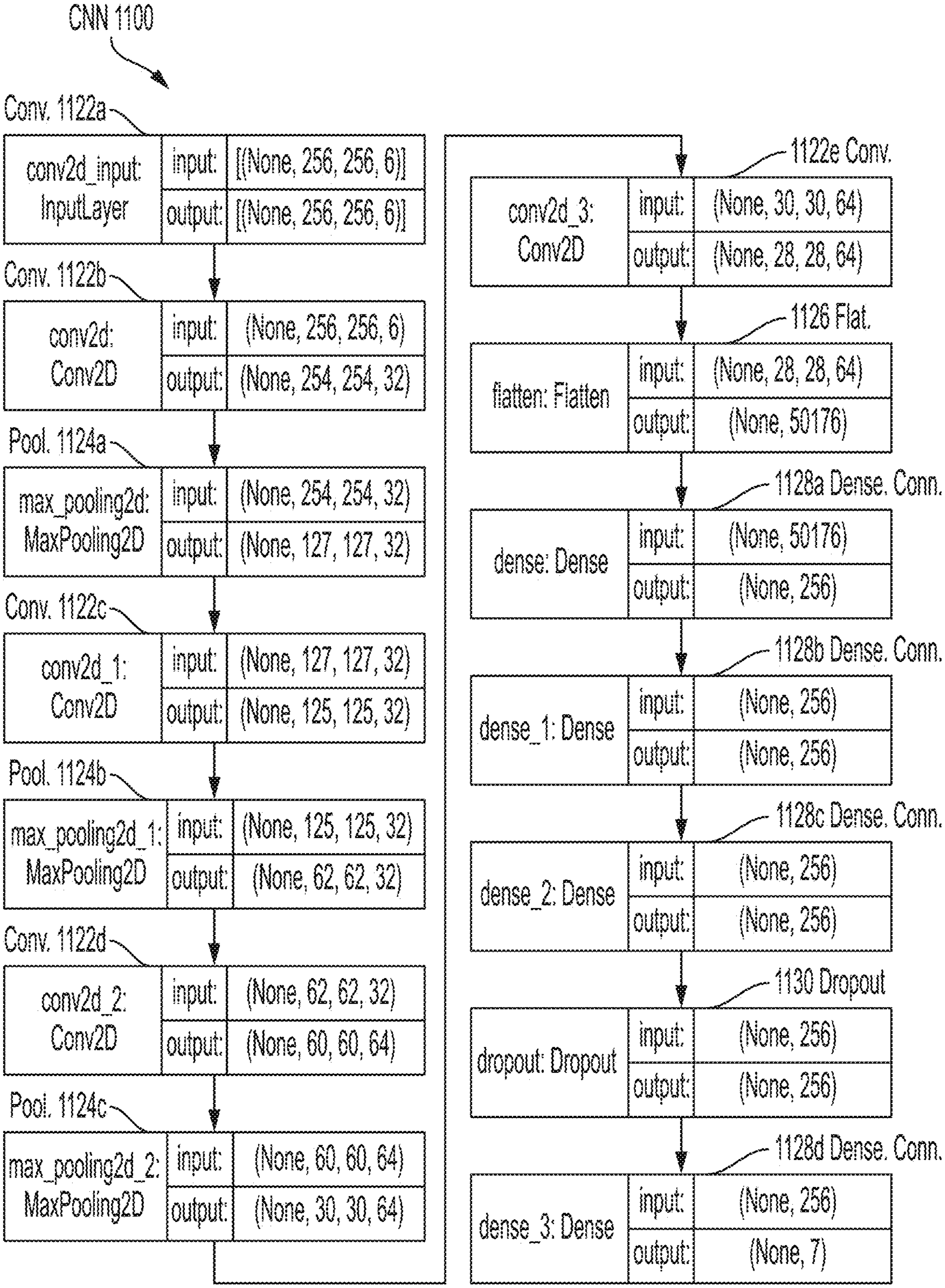
FIG. 21 is a block diagram of an example convolutional neural network (CNN) model that may be executed within an aggregator, according to some embodiments.

FIG. 21 is a block diagram of an example RF source localization model implemented as feed-forward convolutional neural network (CNN) model 1100, which may be executed by one or more processors of computer 300, according to some embodiments. In some embodiments, model 1100 may be configured to classify and/or regress the location of the RF source that transmitted one or more RF signals based on inputs (e.g., input(s) 321) to model 1100 indicating the RF signal(s). As shown in FIG. 21, model 1100 may include filter and/or kernel layers such as convolution layers 1122*a-e*, pooling layers 1124*a-c*, and connection layers such as flattening layer 1126, densely connected layers 1128*a-d*, and dropout layer 1130.

As shown in FIG. 21, model 1100 may be configured to start with the first and second convolution layers 1122*a* and 1122*b* followed by the first pooling layer 1124*a*, then proceed sequentially to the third convolution layer 1122*c* and second pooling layer 1124*b*, the fourth convolution layer 1122*d* and the fourth pooling layer 1124*c*, and the fifth convolution layer 1122*c*. Also shown in FIG. 21, model 1100 may be configured to then proceed to the output layers, flattening layer 1126 followed sequentially by first, second, and third densely connected layers 1128*a-c*, dropout layer 1130, and fourth densely connected layer 1128*d*.

In some embodiments, convolution layers 1122*a-e* may be configured in the manner described herein for filter and/or kernel layers 322 including in connection with FIG. 20. For example, convolution layers 1122*a-e* may be configured to apply vectors having weights set during training of model 1100 such that outputs of convolution layers 1122*a-e* indicate likely locations of the RF source of the RF signal(s).

In some embodiments, pooling layers 1124*a-c* may be configured in the manner described herein for pooling layers 324 including in connection with FIG. 20. For example, pooling layers 1124*a-c* may be configured as maximum pooling layers that output only portions output by convolution layers 1122*a-d* having maximum values. In FIG. 21, the first pooling layer 1124*a* is shown configured to pool an input having dimensions of 254×254×32 into an output having dimensions of 127×127×32, the second pooling layer 1124*b* is shown configured to pool an input having dimensions of 125×125×32 into an output having dimensions of 62×62×32, and the third pooling layer 1124*c* is shown configured to pool an input having dimensions of 60×60×64 into an output having dimensions of 30×30×64.

In some embodiments, flattening layer 1126 may be configured to convert the multidimensional vector output from the fifth convolution layer 1122*e* into a one-dimensional output for densely connected layer 1128*a*. For example, in FIG. 21, flattening layer 1126 is shown configured to convert an input having dimensions of 28×28×64 to a one-dimensional vector output having a size of 50,176. In some embodiments, densely-connected layers 1128*a-d* may be configured to output a one dimensional indication of the location of the RF source of the received RF signals. For example, in some embodiments, densely-connected layers 1128*a-d* may be configured to output a classification of the location of the RF source. Alternatively or additionally, in some embodiments, densely-connected layers 1128*a-d* may be configured to output a regressed prediction of the location of the RF source that may be projected onto a map of the operating environment 102 to locate the RF source. In some embodiments, dropout layer 1130 may be configured to randomly drop data from preceding layers, thereby approximating the outputs of multiple different model architectures during training of model 1100.

In some embodiments, a regressed prediction may include a single location with a confidence radius around the single location (e.g., 90% confidence that the RF sensor is within the radius), which may be superimposed on a map of the operating environment. In some embodiments, a regressed prediction may include a multidimensional (e.g., 2D) probability distribution that may be superimposed on a map of the operating environment to attribute a probability of the RF source being located at some or all discrete points within the operating environment. In some cases, a probability distribution may be continuous over a subregion or all of the operating environment, whereas in other cases a probability distribution may be discontinuous, either due to not having a probability value for some points in the operating environment, and/or due to determining a zero or otherwise insignificant probability that the RF source is located in at least some points in the operating environment.

While Model 1100 is shown in FIG. 21 having an input size of 256×256×6 and an output size of 7, five convolution layers 1122*a-e*, and three pooling layers 1124*a-c*, it should be appreciated that models described herein may have any suitable input or output size, and any suitable number of convolution, pooling, and connection layers, as embodiments described herein are not so limited.

Figure 22:
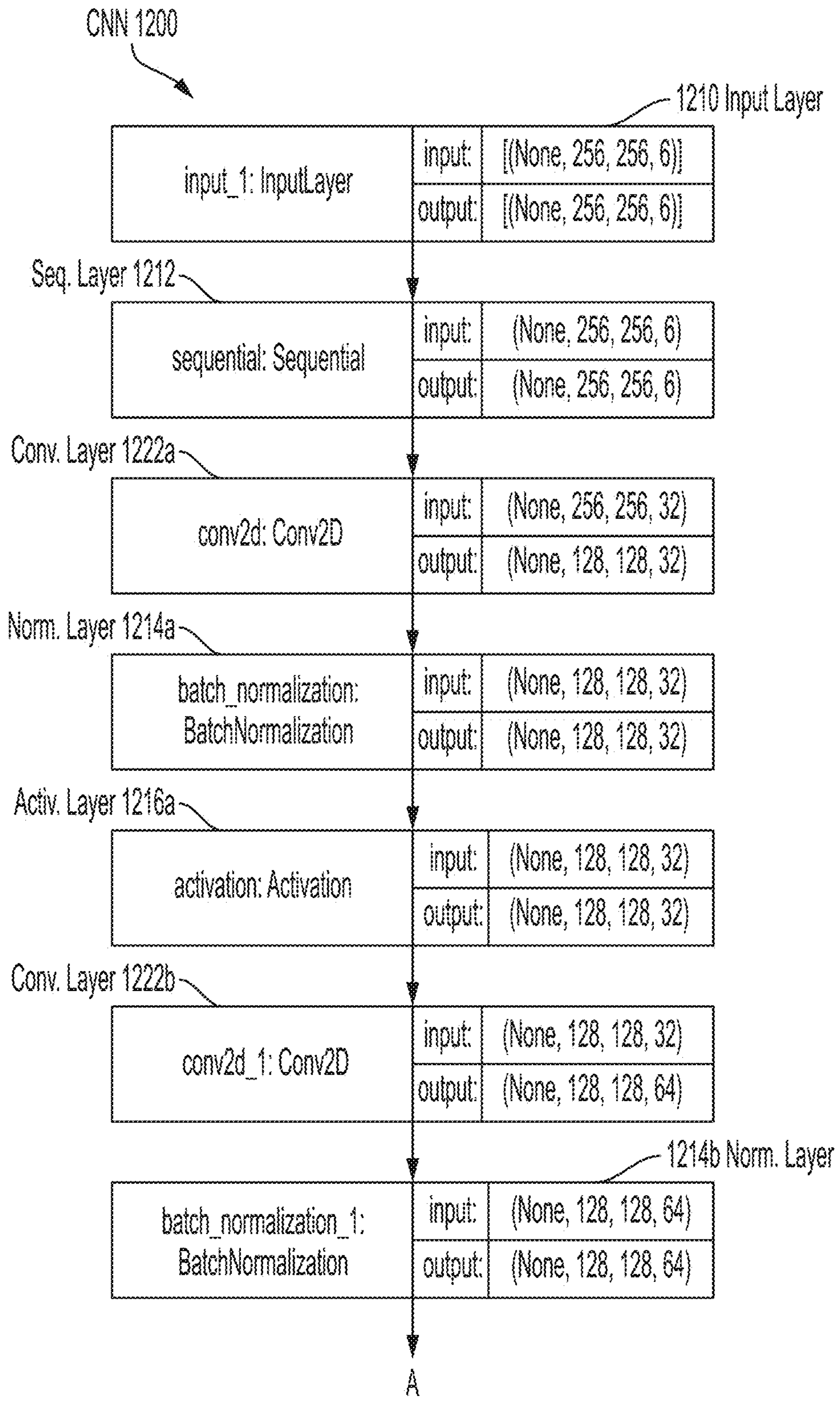
FIG. 22 is a block diagram of a first portion of an alternative example CNN model that may be executed in an aggregator, according to some embodiments.
Figure 23:
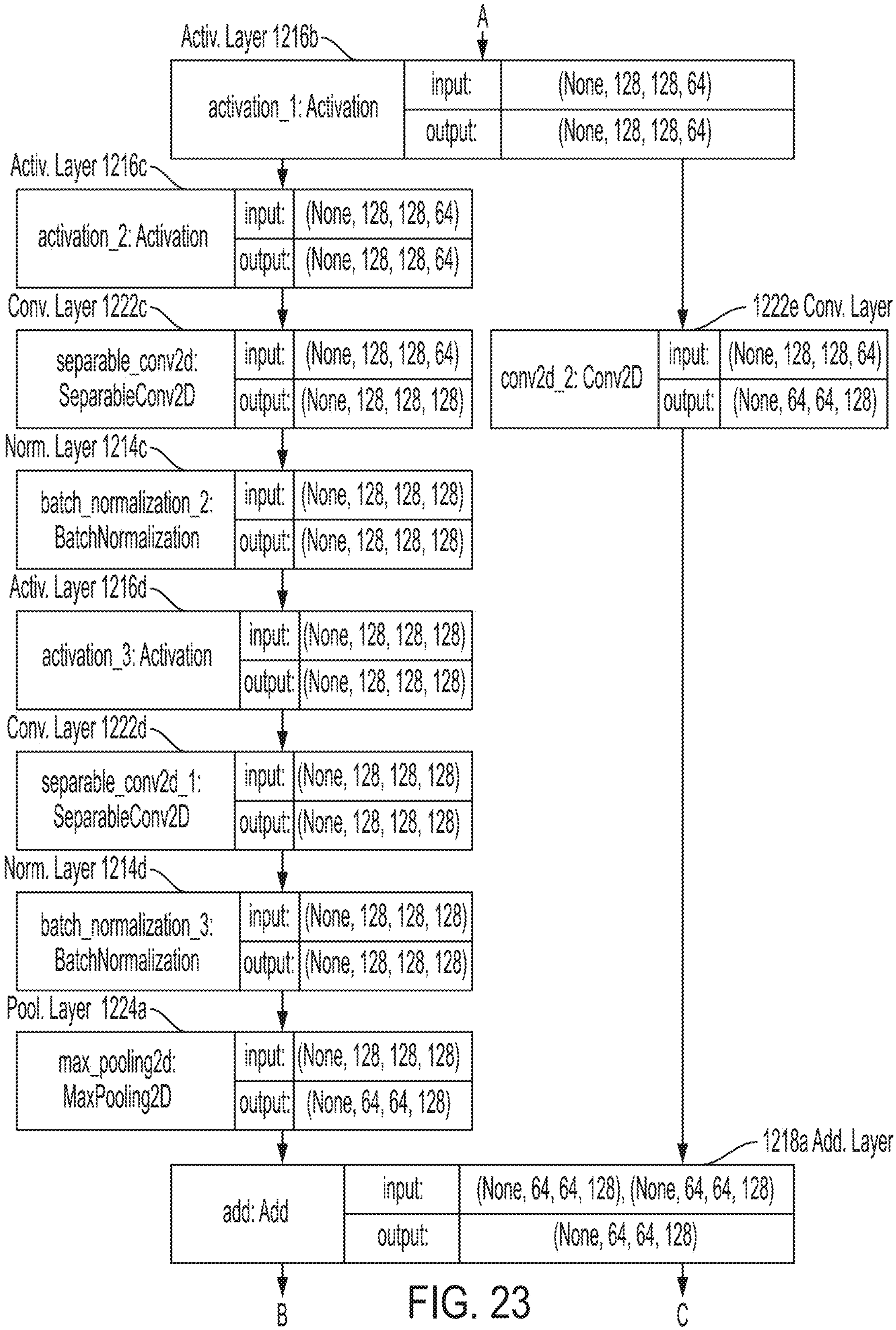
FIG. 23 is a block diagram of a second portion of the CNN model of FIG. 22, according to some embodiments.
Figure 24:
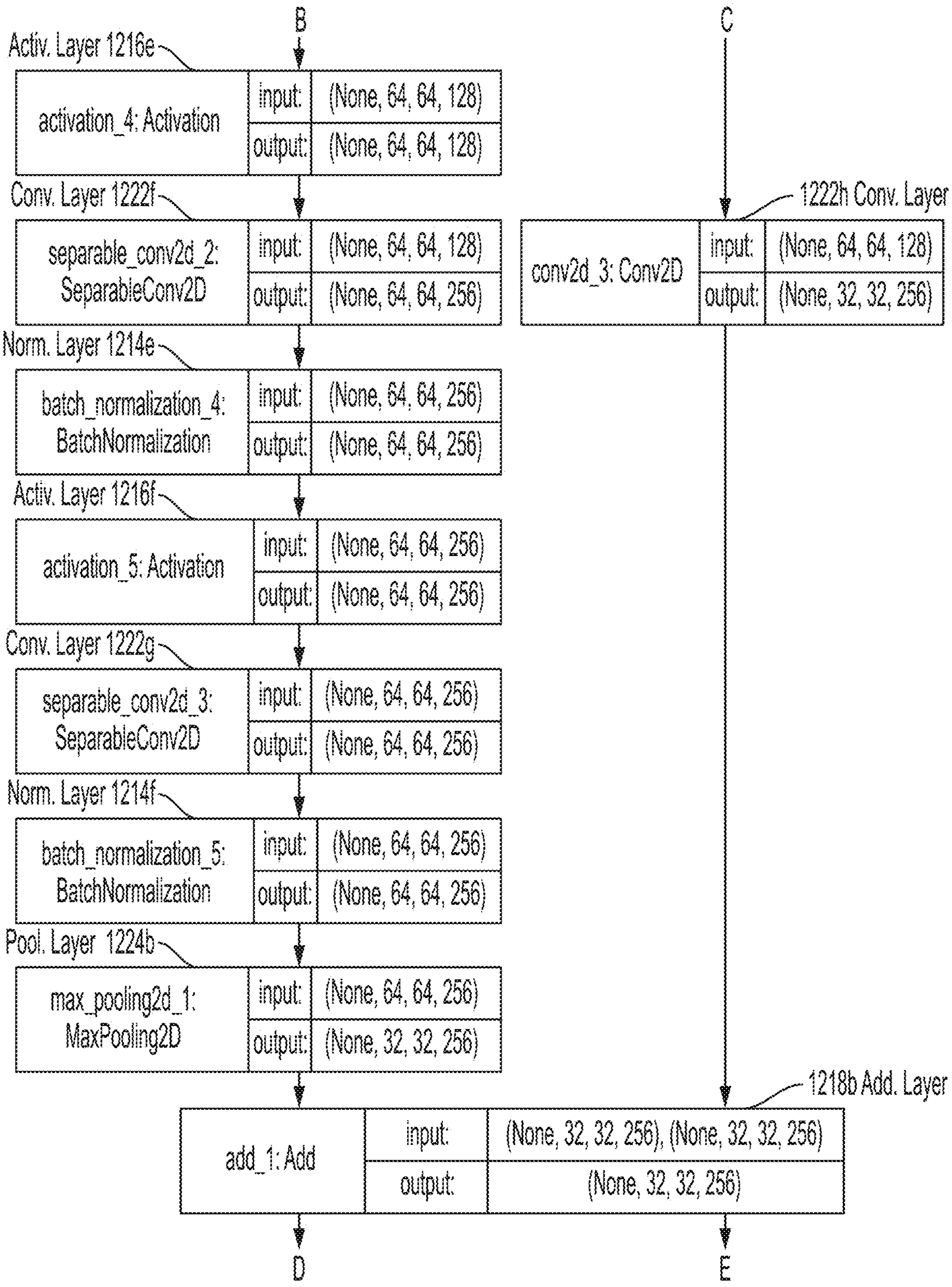
FIG. 24 is a block diagram of a third portion of the CNN model of FIG. 22, according to some embodiments.
Figure 25:
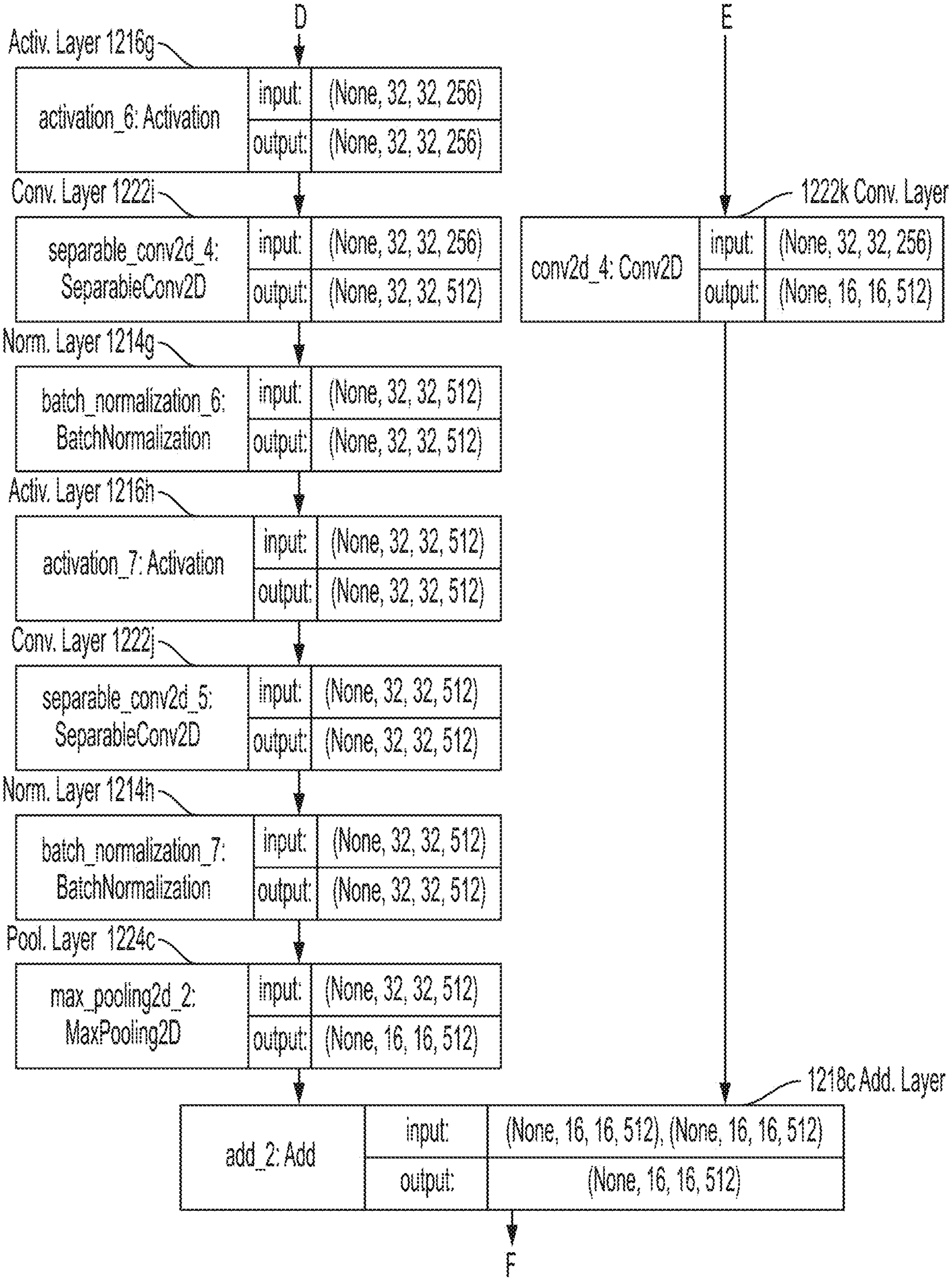
FIG. 25 is a block diagram of a fourth portion of the CNN model of FIG. 22, according to some embodiments.
Figure 26:
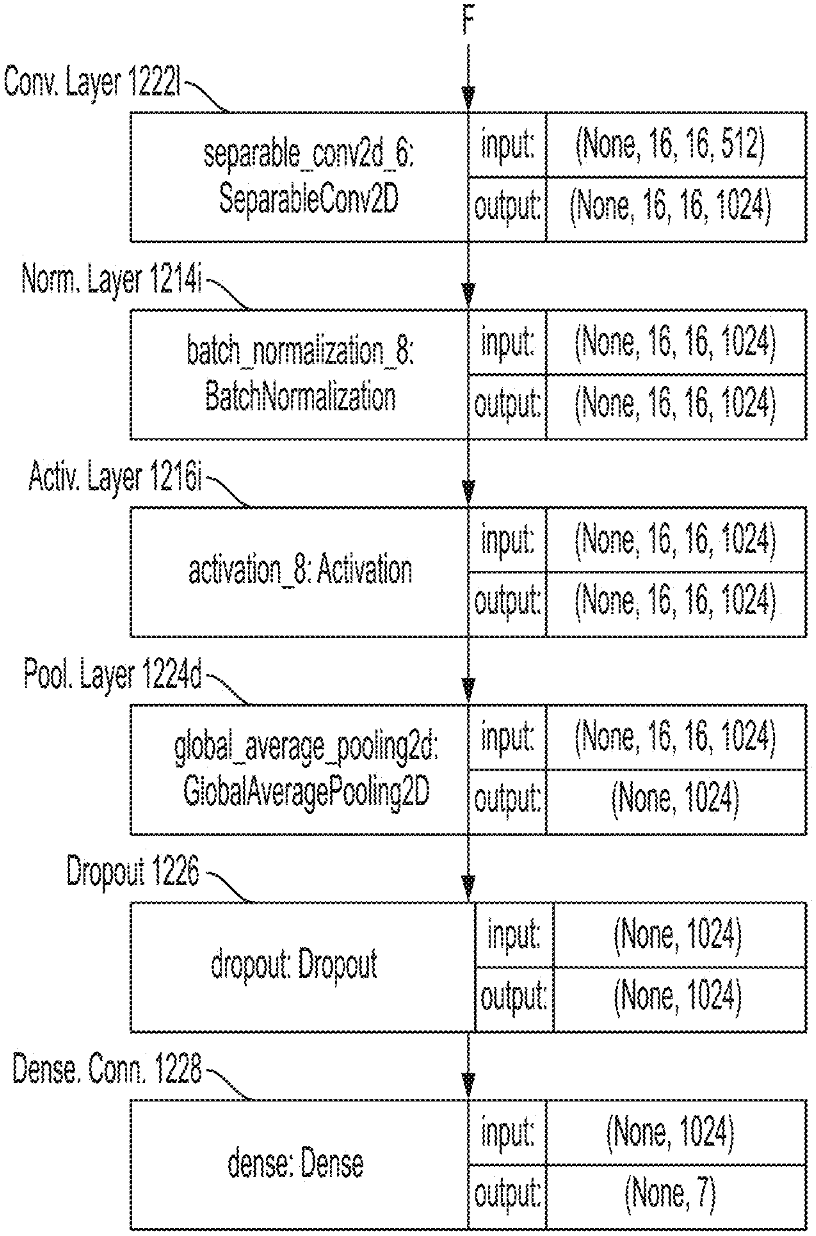
FIG. 26 is a block diagram of a fifth portion of the CNN model of FIG. 22, according to some embodiments.

FIG. 22 is a block diagram of a first portion of an alternative example feed-forward CNN model 1200 that may be executed by one or more processors of computer 300, according to some embodiments. FIG. 23 is a block diagram of a second portion of CNN model 1200, according to some embodiments. FIG. 24 is a block diagram of a third portion of CNN model 1200, according to some embodiments. FIG. 25 is a block diagram of a fourth portion of CNN model 1200, according to some embodiments. FIG. 26 is a block diagram of a fifth portion of CNN model 1200, according to some embodiments. In some embodiments, model 1200 may be configured to determine the location of an RF source of one or more RF signals, such as described herein for models 320 and 1100 including in connection with FIGS. 20-21.

The inventors recognized that feed-forward models, such as a feed-forward CNN may be advantageous for applications where a wide variety of RF signals and/or RF sources are present. In some embodiments, feedback models (e.g., RCNNs) may be alternatively or additionally used, such as for real-time detection and/or classification at high speed.

In some embodiments, model 1200 may include filter and/or kernel layers, such as convolution layers 1222*a*-12221, which may be configured in the manner described herein for filter and/or kernel layers 322 and/or convolution layers 1122*a-c*. As shown in FIG. 22, an input layer 1210 and a sequential layer 1212 may precede the first convolution layer 1222*a*, and a first normalization layer 1214*a* and activation layer 1216 may follow the first convolution layer 1222*a*. As shown in FIG. 22, the second convolution layer 1222*b* may follow the first activation layer 1216*a*, and may be followed sequentially by a second normalization layer 1214*b* and a second activation layer 1216*b*.

As shown in FIG. 23, model 1200 may be configured to split into two branches after the second activation layer 1216*b*, with the first branch proceeding to a third activation layer 1216*c*, the third convolution layer 1222*c*, a third normalization layer 1214*c*, a fourth activation layer 1216*d*, the fourth convolution layer 1222*d*, and a fourth normalization layer 1214*d*. Also shown in FIG. 23, the first branch may terminate with a first pooling layer 1224*a*, which may be configured in the manner described herein for pooling layers 324 and/or 1124*a-c*, and the second branch may include a fifth convolution layer 1222*e* followed by a first addition layer 1218*a* that combines the fifth convolution layer 1222*e* output with the output from the first pooling layer 1224*a*.

As shown in FIG. 24, model 1200 may be configured to split again into two branches following the first addition layer 1218*a*, with the first and second branches being configured in the manner described herein in connection with FIG. 23. For example, as shown in FIG. 24, the first branch may include, sequentially, a fifth activation layer 1216*e*, a sixth convolution layer 1222*f*, a fifth normalization layer 1214*c*, a sixth activation layer 1216*f*, a seventh convolution layer 1222*g*, a sixth normalization layer 1214*f*, and a second pooling layer 1224*b*, and the second branch may include an eighth convolution layer 1222. As shown in FIG. 24, the first and second branches can terminate in a second addition layer 1218*b*.

As shown in FIG. 25, model 1200 may be configured to split yet again into two branches following the second addition layer 1218*b*, with the first and second branches being configured in the manner described herein in connection with FIGS. 23-24. For example, as shown in FIG. 25, the first branch may include, sequentially, a seventh activation layer 1216*g*, a ninth convolution layer 1222*i*, a seventh normalization layer 1214*g*, an eighth activation layer 1216*h*, a tenth convolution layer 1222*j*, an eighth normalization layer 1214*h*, and a third pooling layer 1224*c*, and the second branch may include an eleventh convolution layer 1222*k*. As shown in FIG. 25, the first and second branches may terminate in a third addition layer 1218*c*.

As shown in FIG. 26, model 1200 may conclude with a twelfth convolution layer 12221 followed sequentially by a ninth normalization layer 1214*i*, a ninth activation layer 1216*i*, and a fourth pooling layer 1224*d*. In some embodiments, model 1200 may include connection layers such as dropout layer 1226 and densely connected layer 1228, which may be configured in the manner described herein for dropout layer 1130 and densely connected layers 1128*a-d*.

In some embodiments, a trained localization module may be configured to alternatively or additionally leverage inputs from one or more onboard positioning systems of a vehicle on which an RF sensor is deployed. For example, the positioning system(s) may include a global positioning system (GPS) receiver or similar global navigational satellite system (GNSS) receiver, and/or a vehicle orientation (e.g., bearing), elevation, and/or speed sensor that may be used as at least a partial basis for determining the location of an RF source such as described above. In some embodiments, where a directional antenna (e.g., having at least one main beam and at least one null) is used, the beamwidth (e.g., 3 dB beamwidth) of the antenna may be used (e.g., together with the vehicle orientation) as at least a partial basis for determining the location of an RF source. For instance, an RF signal received at a point in time may be localized with respect to a location of the vehicle at that point in time using the onboard positioning system(s), as the reception of an RF signal indicates a set of possible directions (e.g., consistent with the orientation of the antenna beamwidth) for where the RF source is located with respect to the vehicle. In some cases, even where the antenna is only slightly to moderately directional (e.g., substantially isotropic), a localization model trained on such an antenna may still capture the impact of the RF signal being received at or closer to a null in a beam pattern, such as when localization is performed on RF signals received over time and aggregated together for localization processing.

In some embodiments, a trained localization model such as described above may be further adapted for use with alternative or additional inputs using supplemental information, such as from one or more positioning systems. For example, a vehicle having an RF sensor onboard, and/or data derived therefrom, may be used to train such a model. For instance, a model may be trained to determine a location of an RF source using RF radiation data, RF signal data, and/or an RF signal encoding and vehicle location information from one or more onboard positioning systems. As one example, a vehicle may move in a predetermined route (e.g., flight pattern) within RF range of an RF source having a known location with respect to a location of the vehicle determined using the onboard positioning system(s), and the known location of the RF source used as labels for comparing outputs resulting from the model during training.

VI. INTERFACES

In some embodiments, system 100 may include one or more interfaces configured to provide RF characteristic information to a user and/or receive instructions for controlling the system. For example, the interface may present contextual information about RF sensors, characteristics of RF signals detected by the RF sensors, identified RF sources, locations of the RF sources, types of RF sources, and/or indications of when an RF signal and/or RF source was detected. In some embodiments, interfaces described herein may be linked with a database storing a list of RF sources, received RF signals, and RF sensors with data points for each detected RF signal and localization performed (e.g., within an aggregator). In some embodiments, the interface may further allow a user to input filter preferences, such as to limit reporting of RF sources and/or RF signals to particularly defined RF source types, modulation types, power limits, and/or detection timeframes. For example, the interface may allow a user to define categories (e.g., as described in connection with FIG. 40) as one or a combination of such filter preferences and focus the presentation within the interface on user-defined categories. In some embodiments, the interface may allow a user to set a frequency and/or geographic sweep for RF signals and/or sources that controls the RF front-end(s) of the RF sensors 200 and/or filters RF signals and/or RF sources reported to the interface.

In some embodiments, an aggregator of system 100 may be exposed via an interface as an application programming interface (API) for a user to access any or all aggregator outputs (e.g., data stored in the database). For example, the API may be directly linked to the aggregator and reached over the Internet from a user device. For instance, the use of an exposed and/or protected (e.g., secure) API may provide additional flexibility for users to access and/or control the system.

In some embodiments, the interface may be accessible by remote computer systems to pull data for presenting to users and/or to control operation of the system (e.g., tune RF sensor detection frequencies and/or characteristics for reporting). For example, data from the interface may be presented to users using one or more locally executed graphical user interfaces (GUIs), such as described herein. In some embodiments, GUIs described herein may advantageously streamline presentation of RF information from the system to user, such as an operator of a vehicle having at least one RF sensor positioned thereon. For example, RF information may be presented in real time and/or after offloading the information from an RF sensor and/or base station.

Figure 27:
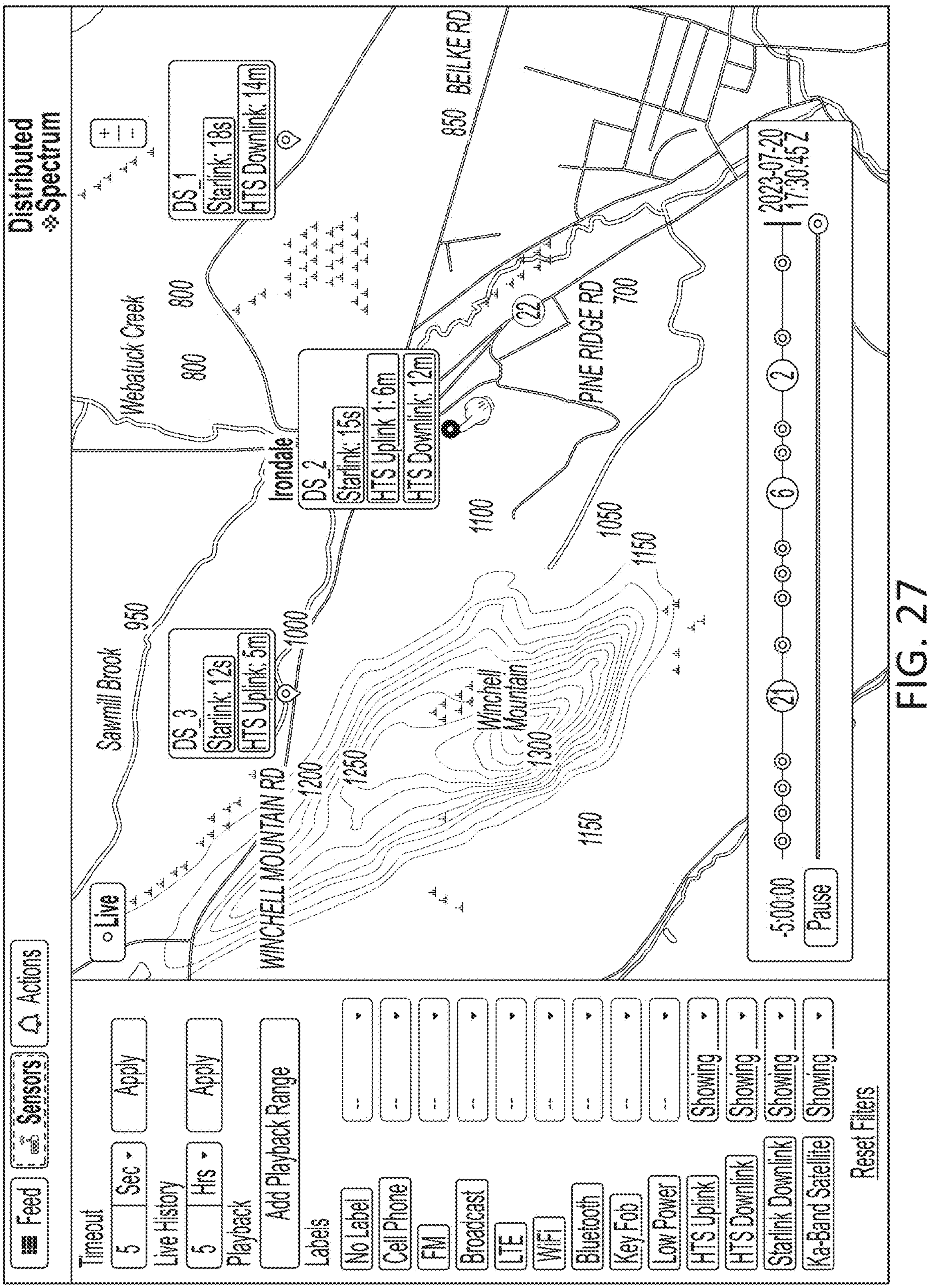
FIG. 27 is an example graphical user interface (GUI) screen that may be configured to display a map of RF sources detected and localized by a system described herein, according to some embodiments.

FIG. 27 is an example graphical user interface (GUI) screen that may be configured to display a map of RF sensors of a system described herein, according to some embodiments.

The example GUI screen shown in FIG. 27 includes, under a Sensors tab, a map showing a number of RF sources, of which three have Starlink category designation, two have HTS Downlink category designation, and one has an HTS Uplink category designation. For instance, a user may toggle whether to display RF sources by category using the panel on left. As shown, sources categorized by HTS Uplink, HTS Downlink, Starlink Downlink, and Ka-Band Satellite are shown in view, although no sources categorized as Ka-Band Satellite are reported detected by any of the RF sensors on the map. Below the map, the example GUI screen includes a timeline over the course of 5 hours, and the timeline marker is at the end of the timeline. For instance, a user may drag the timeline marker to view detections and/or locations of RF sources by category at any point along the timeline. The illustrated example provides a live history going back 5 hours, as may be obtained using the Live History setting on the left panel. A user may switch to a recorded playback by using the Add Playback Range button. In some embodiments, the timeline and/or categorized RF source data may be obtained from a database (e.g., of an aggregator) in real time and/or after offloading the data from an RF sensor and/or base station.

Figure 28:
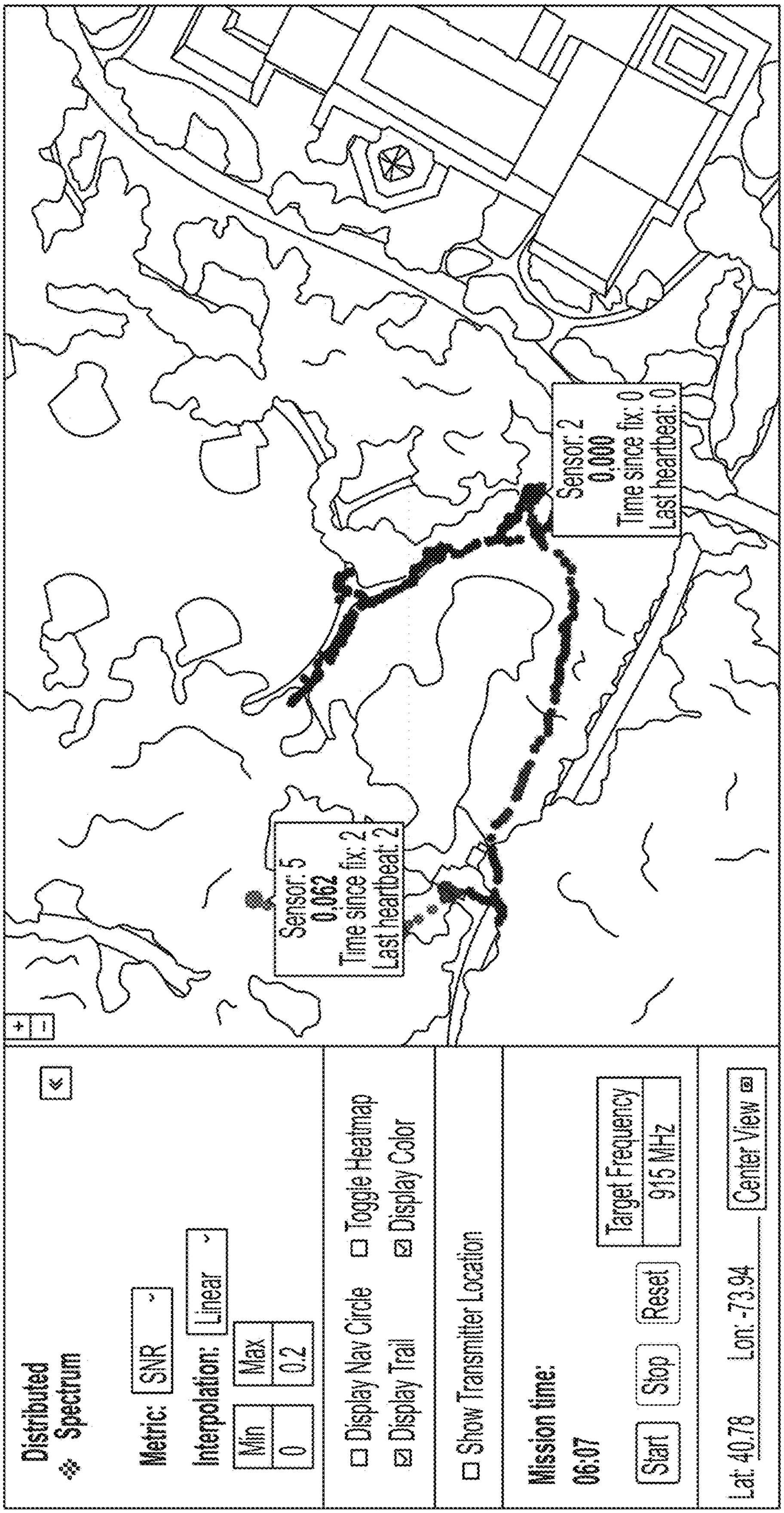
FIG. 28 is an example GUI screen that may be configured to display location and power level information of RF signals detected by a system described herein, according to some embodiments.

FIG. 28 is an example GUI screen that may be configured to display location and power level information of RF signals detected by a system described herein, according to some embodiments.

The example GUI screen shown in FIG. 28 includes a satellite image of an area superimposed with a trail of indicators, a subset of which are categorized. For instance, each indicator may refer to radiation data at a predetermined frequency (e.g., 915 MHz in the illustrated example), to which at least some of the RF sensors in the area may be tuned. In the illustrated example, the darkness of the indicators may correspond to a signal metric (e.g., SNR in the illustrated example). For instance, as shown, a first detection by RF sensor #2 shows a metric of 0, whereas a second detection by RF sensor #5 shows a metric of 0.062 and is brighter than the first detection. In some embodiments, RF sensors in the area may be mobile and have known locations (e.g., worn by multiple people and co-located with GPS units), and signal metrics captured by the RF sensors may be reported and linked to the known locations of the RF sensors. In some embodiments, probability heatmaps indicating predicted locations of RF sources (described further below) may be superimposed over the satellite image by selecting the Toggle Heatmap option. For example, the probability heatmaps may be generated using predicted locations of RF sources generated by a system described herein using RF radiation received by the RF sensor(s).

In some embodiments, predicted locations of RF sources may be provided within a determined confidence radius (e.g., provided with the output of a regression model), and/or a range of radii may be provided with different confidence metrics. In some embodiments, multiple (e.g., disjoint) confidence radii and/or probability heatmaps may be obtained, such as due to multiple possible locations that are at least partially inconsistent with one another. As one example, a first predicted location may have been blocked by a known geographic feature (e.g., building) at a first time and/or location of the RF sensor when an RF signal arrived from the RF source, whereas a second predicted location may have been blocked by a different geographic feature (e.g., mountain) at that time and/or location of the RF sensor, resulting in an ambiguity that may be at least partially resolved in favor of one or the other location.

In some embodiments, reported RF radiation detection may be filtered using the signal metric filter options (e.g., Min and Max) shown in the example GUI screen.

Figure 29A:
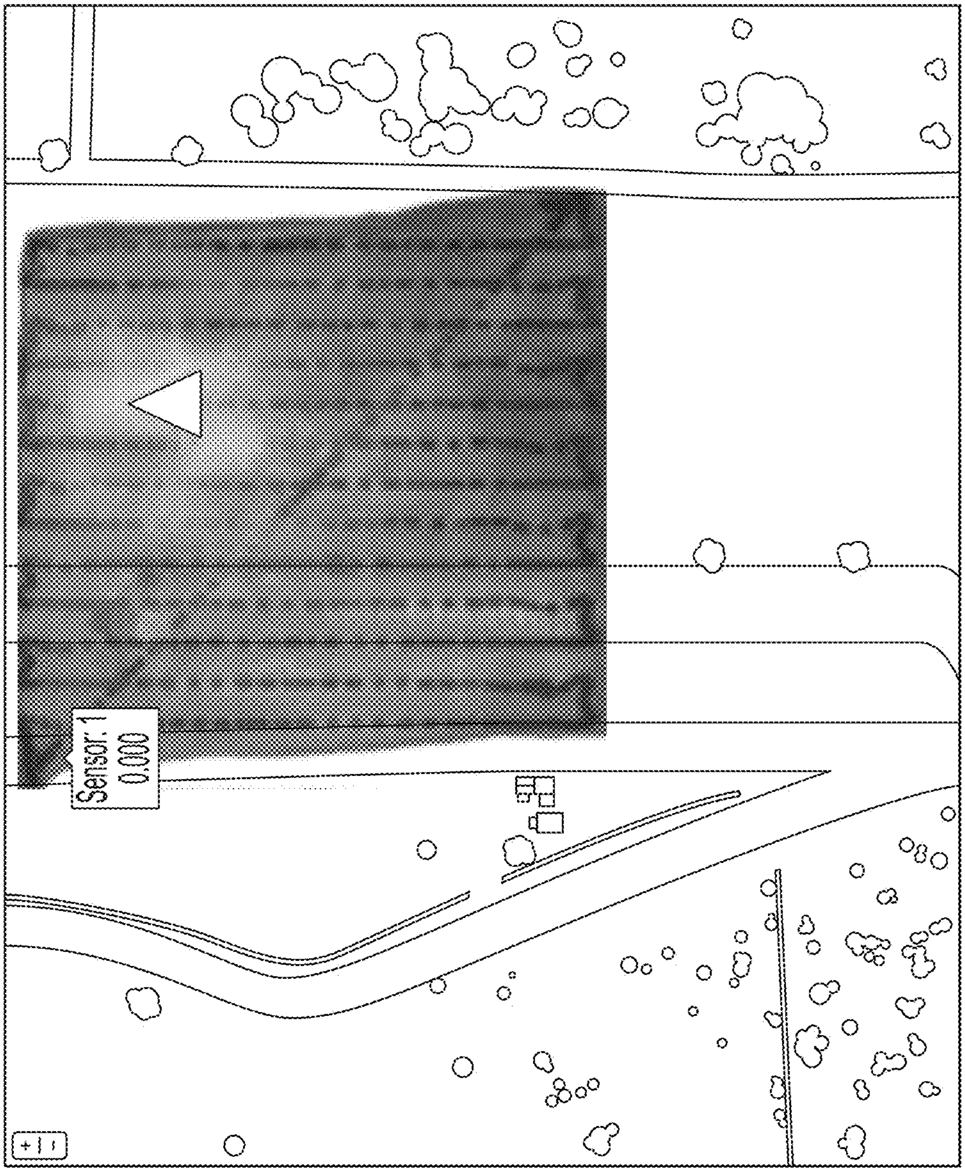
FIG. 29A is an example GUI screen that may be configured to display location information of RF sources detected by a system described herein juxtaposed with a current location of a vehicle, according to some embodiments.

FIG. 29A is an example GUI screen that may be configured to display location information of RF sources detected by a system described herein juxtaposed with a current location of a vehicle, according to some embodiments.

The example GUI screen shown in FIG. 29A includes a satellite image of an area superimposed with a location of a vehicle (indicated by triangle), a flight path (indicated by dotted line), and an RF source location probability heatmap. For instance, the RF source location probability heatmap may indicate the predicted locations of one or more RF sources that transmitted one or more RF signals detected by one or more RF sensors co-located with the vehicle while the vehicle travels in the flight path. In some embodiments, the RF source location probability may be provided to the processor executing the GUI in real time while the vehicle is flying, and/or the probability may be provided after the completion of flight when data is offloaded from the RF sensor(s) and/or a base station.

Figure 29B:
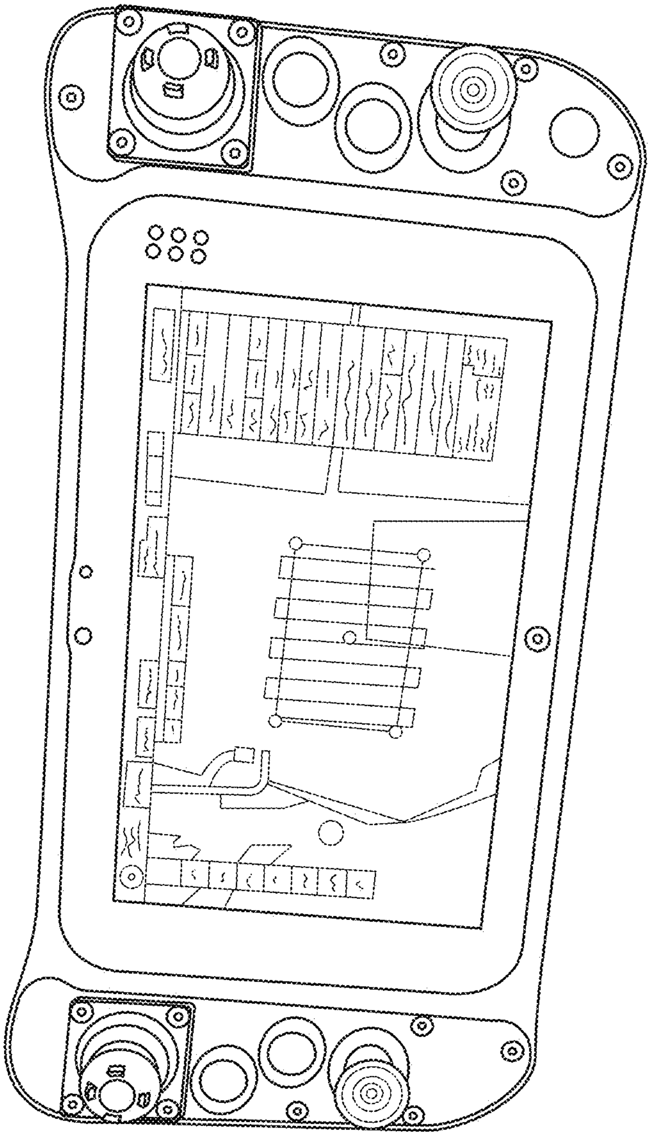
FIG. 29B is a perspective view of a vehicle controller with a built-in display screen configured to display the GUI of FIG. 29A to a user, according to some embodiments.

FIG. 29B is a perspective view of a vehicle controller with a built-in display screen configured to display the GUI screen of FIG. 29A to a user, according to some embodiments.

In some embodiments, the GUI screen shown in FIG. 29A may be displayed on a controller of the vehicle whose location is shown in the GUI screen. For example, an operator of the vehicle may deviate from the flight path to pursue an RF source detected by the system during flight. Alternatively or additionally, the vehicle may be operated autonomously and/or semi-autonomously, in which case the vehicle's computer system may receive data indicating the location of an RF source and the operator (e.g., monitoring personnel) may be provided with a display (e.g., as in FIG. 29B) to provide context as to why the vehicle may deviate from its flight path autonomously and/or semi-autonomously. For instance, autonomous deviation may be based on instructions to deviate and/or may be determined by the autonomous control system based on information provided over an interface.

In some embodiments, a control system of the vehicle (e.g., onboard and/or communicatively linked to the vehicle) may be instructed (e.g., by computer 300 and/or another computer executing the interface) to adjust vehicle movement in response to localization of one or more RF sources. For example, the vehicle may be instructed to accelerate (e.g., turn and/or change movement speed) in a direction of a determined location of an RF source, and/or toward a location and/or path along which an RF signal is predicted to be received (e.g., at all and/or with greater power than along other paths and/or at other locations). Alternatively or additionally, such systems may be configured to provide directional guidance (e.g., video, audio, and/or both) to an operator of the vehicle through an interface (e.g., the illustrated GUI or a GUI natively executed on a vehicle computer system for controlling the vehicle) indicating a direction of a determined location of an RF source to assist an operator in locating the RF source.

In some embodiments, a vehicle may alternatively or additionally include one or more onboard communication systems. For example, the communication system(s) may include a dedicated radio link to an operator computer system (e.g., which may be controlled by a pilot of the vehicle). In some embodiments, outputs indicating detection of RF signals and/or types and/or locations of RF signals may be communicated over the onboard communication system(s). In some embodiments, such outputs may be displayed (e.g., as shown in FIGS. 29A-29B) within an operator computer system via communication over the radio link and/or in a GUI such as shown in FIGS. 29A-29B.

In some embodiments, a frequency range in which to scan for RF radiation may be set based on instructions received over the onboard communication system (e.g., from an operator computer system). Alternatively or additionally, a predetermined range of frequencies may be scanned (e.g., a frequency sweep). In some embodiments, vehicle-assisted localization of RF sources may be facilitated when the vehicle moves in a predetermined movement pattern (e.g., flight pattern) while scanning a predetermined frequency and/or range of scanned frequencies for electromagnetic radiation. In some embodiments, where a predetermined range of frequencies is scanned, locations only for predetermined types of RF sources may be determined using vehicle-assisted localization.

While the example of FIGS. 29A and 29B refers to a flying vehicle, such as a drone, it should be appreciated that other vehicles, manner or unmanned, may be used such as cars. Moreover, in some embodiments, such aspects may be applicable to systems not involving vehicles, such as where sensor are worn and/or carried by people.

Figure 30:
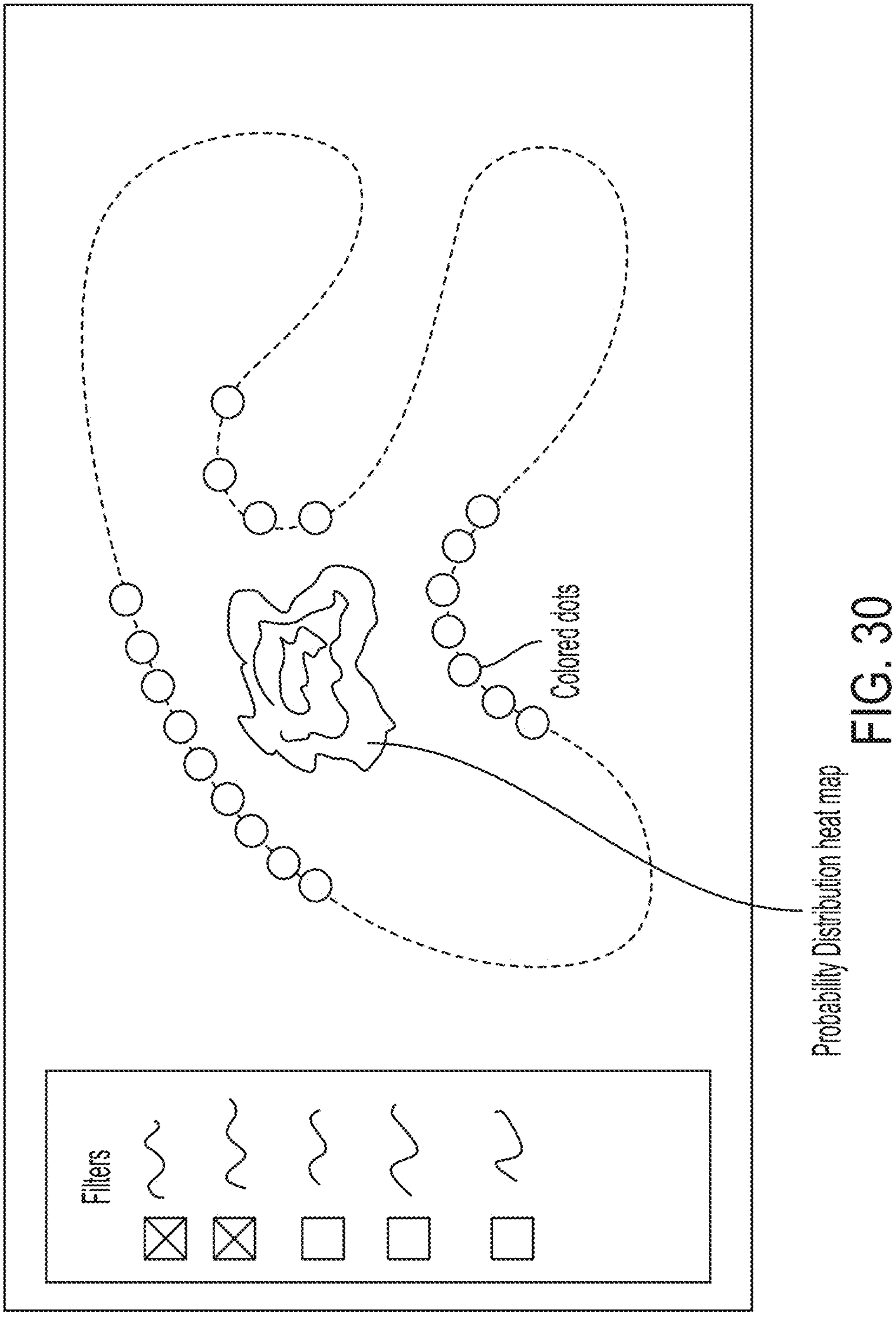
FIG. 30 is an example GUI screen that may be configured to display location information of RF sources detected by a system described herein juxtaposed with a flight path of a vehicle, according to some embodiments.

FIG. 30 is an example GUI screen that may be configured to display location information of RF sources detected by a system described herein juxtaposed with a flight path of a vehicle, according to some embodiments.

The example GUI screen shown in FIG. 30 includes a map superimposed with a flight path (indicated by dashed line), a trail of indicators (e.g., colored dots) partially along the flight path, and an RF source location probability heatmap. For instance, the indicators may be configured as described above for FIG. 28 to indicate RF radiation strength at one or more identified RF sensors when located at the indicator. In some embodiments, the example GUI screen shown in FIG. 30 may be generated using data offloaded from one or more RF sensors and/or a base station, such as by generating the indicators using stored locations of the RF sensor(s) (e.g., using GPS information from a vehicle co-located with the RF sensor(s)) and power levels of RF radiation detected by the RF sensor(s) and generating the probability heatmaps as described above. The example GUI screen also includes a filter sidebar that may be configured to toggle different types of RF sources from view, such as described for the category-based filtering in FIG. 27.

Figure 31:
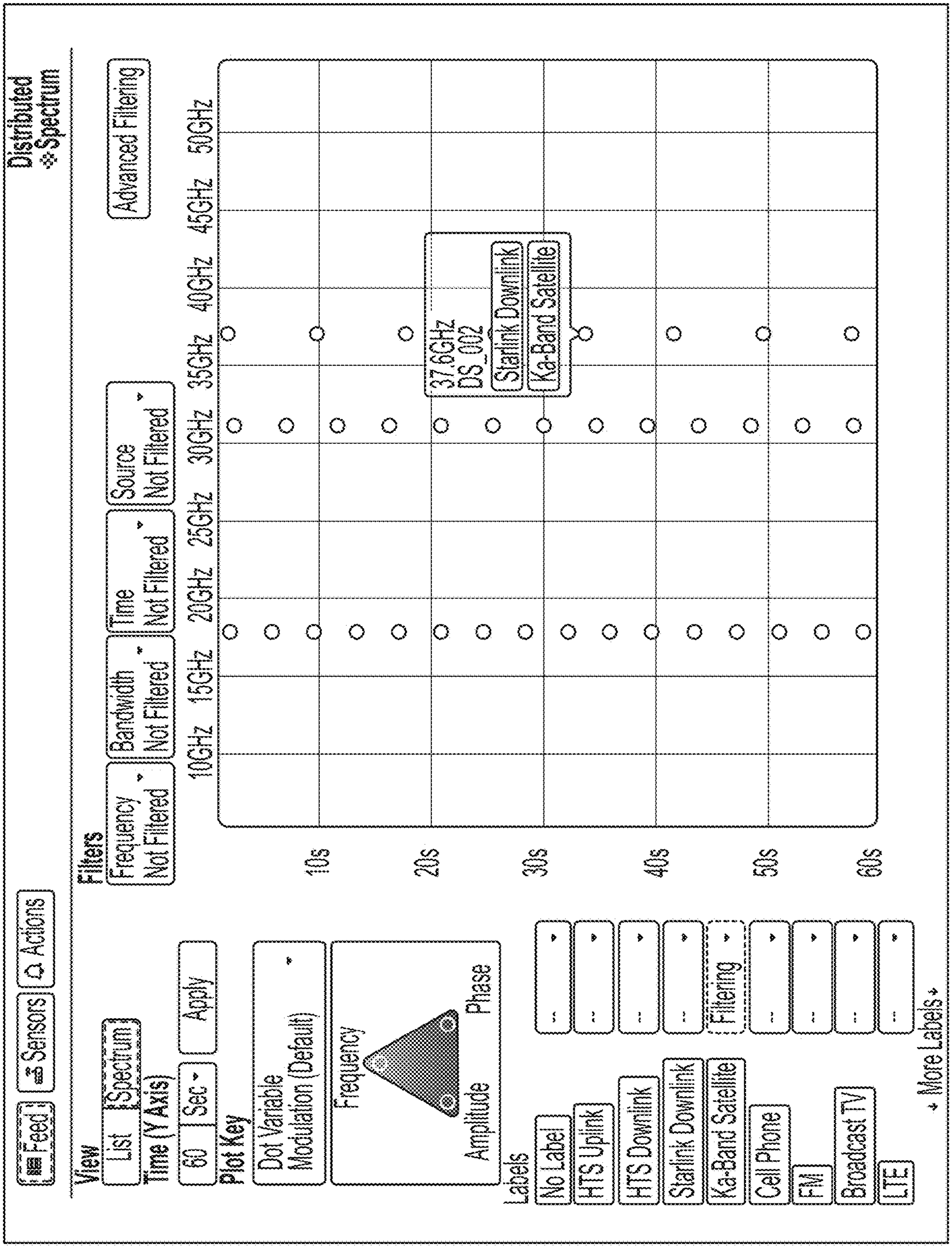
FIG. 31 is an example GUI screen that may be configured to frequency and modulation characteristics of RF signals detected by a system described herein, according to some embodiments.

FIG. 31 is an example GUI screen that may be configured to display frequency and modulation characteristics of RF signals detected by a system described herein, according to some embodiments.

In some embodiments, the GUI screen in FIG. 31 may appear when a user selects the Feed tab at the top of the GUI screen shown in FIG. 27. The example GUI screen shown in FIG. 31 includes a graph of frequency vs. time with color-dot indicators (color not shown), where the color of the dots corresponds to a modulation type (e.g., using the triangular legend on the left panel, color not shown). As shown, hovering the cursor over a color-dot indicator shows the center frequency of the RF signal indicated by the color-dot indicator, as well as any attributed source categories. On the left panel, a user may filter the display of RF sources by category. As shown, a filter is applied only leaving sources categorized as Ka-Band Satellite in view. In some embodiments, multiple categories may be applied to a source, such as the Starlink Downlink category applied to the highlighted entry in addition to the Ka-Band Satellite category.

Figure 32:
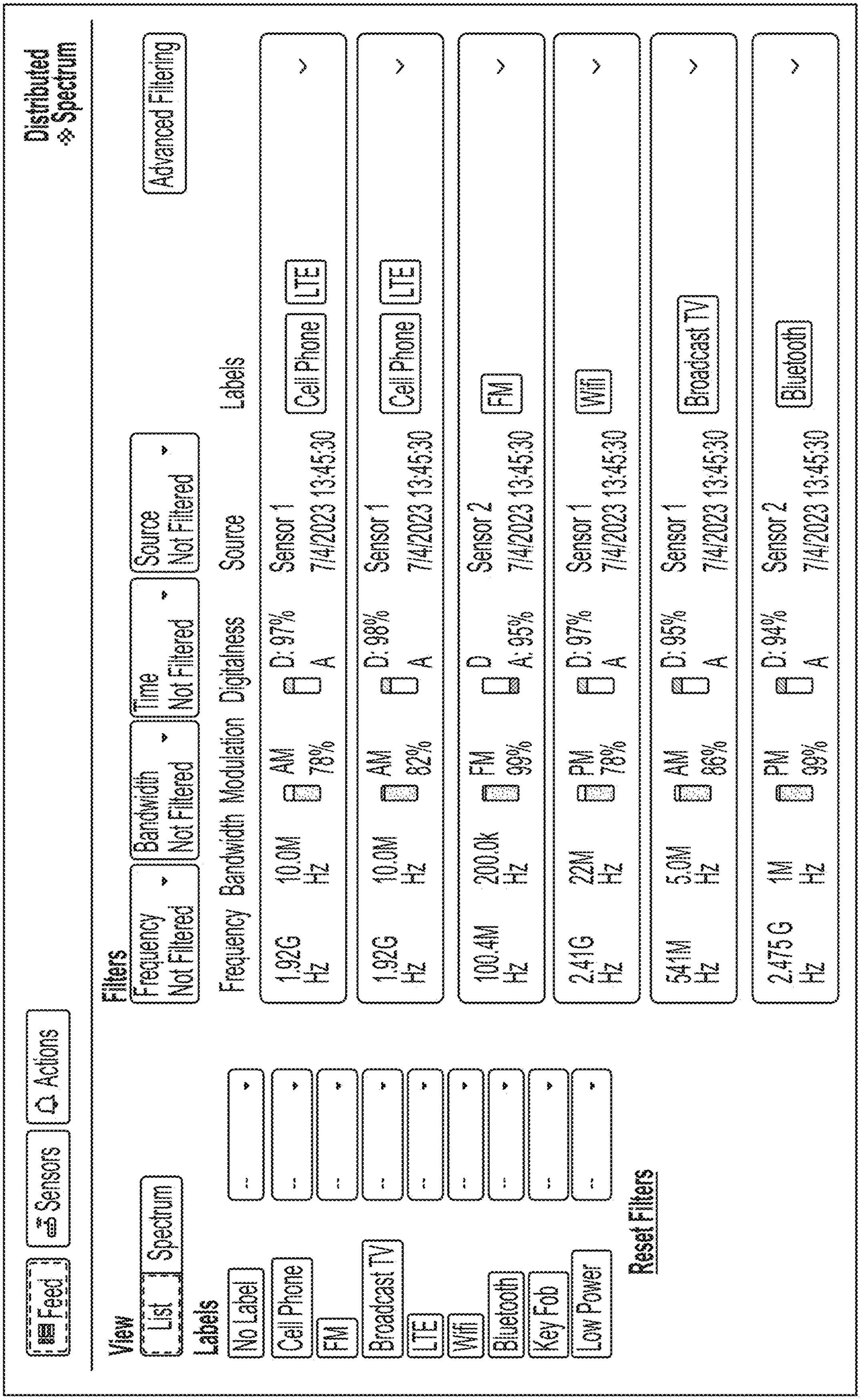
FIG. 32 is an example GUI screen that may be configured to display a list of RF signals detected by a system described herein, according to some embodiments.

FIG. 32 is an example GUI screen that may be configured to display a list of RF signals detected by a system described herein, according to some embodiments.

The example GUI screen of FIG. 32 shows a list of entries of RF signals in compressed view. In some embodiments, the GUI screen in FIG. 32 may appear when a user selects the List view at the top of the left panel in the GUI screen shown in FIG. 31. The left panel in FIG. 32 may be used to control category-based filtering of the list of RF signal entries displayed in the List, such as described herein in connection with FIG. 33.

Also shown in the example GUI screen of FIG. 32 is a portion of a list of detected RF signals. In the list, entries for RF signals are shown in compressed view and may be expanded using the expansion arrows at the right side of the GUI screen. The listed RF signal entries have been categorized as Cell Phone, LTE, FM, WiFi, Broadcast TV, and Bluetooth as RF source types and a number of characteristics of the RF signal entries are shown, as well as indications of which RF sensors detected the RF signals and the times of detection.

In some embodiments, categories may be applied to the RF signal using an output of a trained model (e.g., within an extractor and/or aggregator) based on criteria specified (e.g., by a user). For example, a user may specify certain characteristic criteria for a category, which may be applied to content in an encoding of the RF signal, indications of characteristics of an RF signal (e.g., center frequency) received from an RF sensor (e.g., with a signal encoding and/or individually), and/or to decoded content of RF signal from a signal encoding. For instance, the RF signal entries that are categorized as Cell Phone may be due to their center frequencies being 1.92 GHz, their modulation being amplitude modulation (AM), theirs bandwidth being 10 MHZ, and/or their analog vs. digital confidence metric characteristic being 97-98% digital, as may be specified by a user for a category. Alternatively or additionally, a user may have selected one of the RF signal shown in category Cell Phone and created the category as any RF signal that is similar to that RF signal. For instance, vector representations of the RF signals shown having the category of Cell Phone may be within a predetermined vector-based distance (e.g., Euclidean distance) of one another in vector space, causing the other of the RF signals to also be shown in category Cell Phone.

In some embodiments, RF signals may be categorized at an aggregator upon receipt (e.g., of a vector representation), and/or RF signals may be categorized upon creation of the category. For example, RF signals may be categorized when first received when a category has been previously defined, and/or vector representations of (e.g., previously recorded) RF signals stored in a database may be analyzed for categorization in a new category once the category is created.

Figure 33:
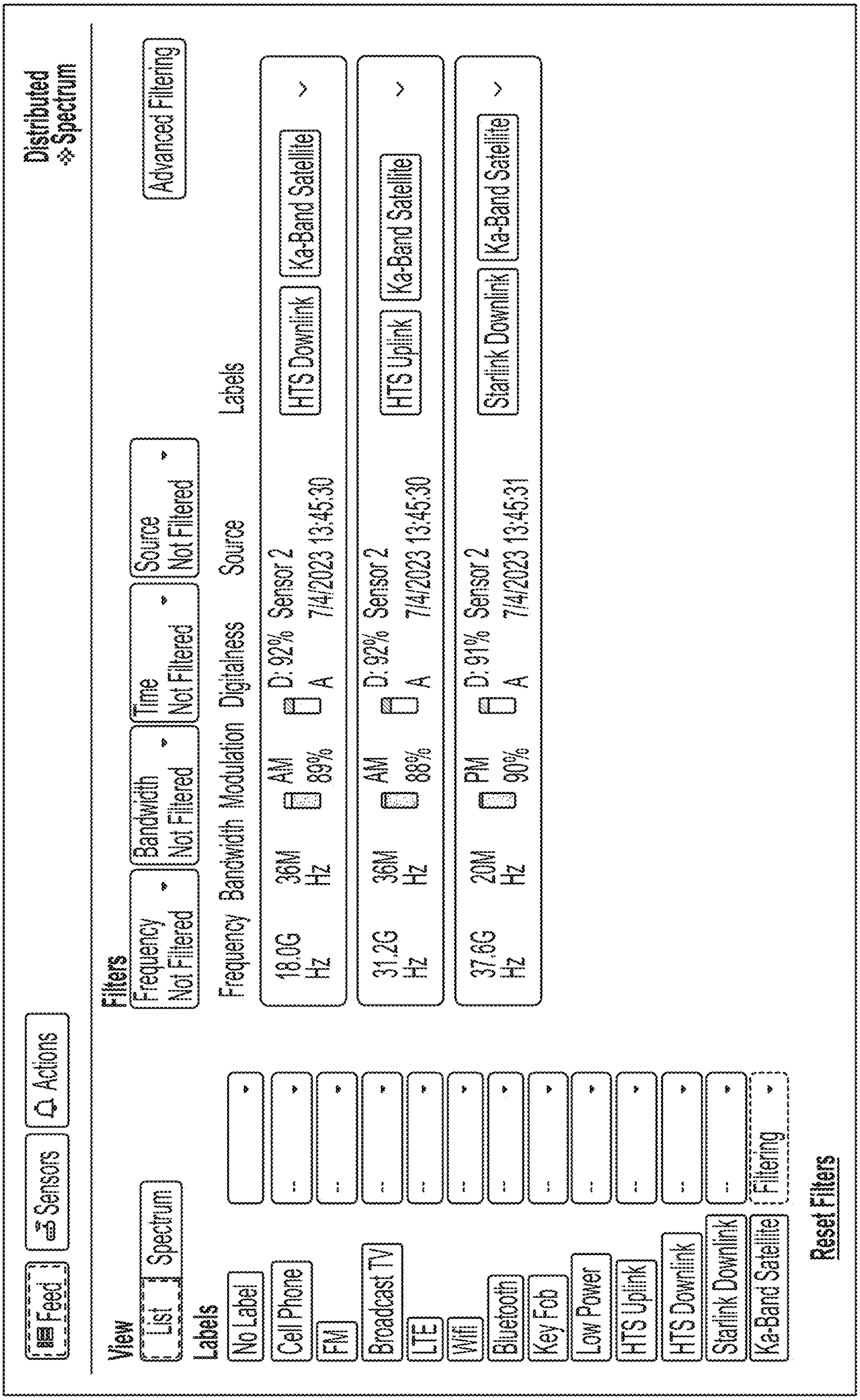
FIG. 33 is an example GUI screen that may be configured to display a source-filtered list of RF signals detected by a system described herein, according to some embodiments.

FIG. 33 is an example GUI screen that may be configured to display a category-filtered list of RF signals detected by a system described herein, according to some embodiments.

The example GUI screen of FIG. 33 shows a subset of the list of RF signal entries shown in FIG. 32 in compressed view. Shown in the left panel is an indication of category-filtering limiting the list to RF signals in the Ka-Band Satellite category, thus retaining only the three entries shown having frequencies of 18 GHZ, 31.2 GHZ, and 37.6 GHZ.

Figure 34:
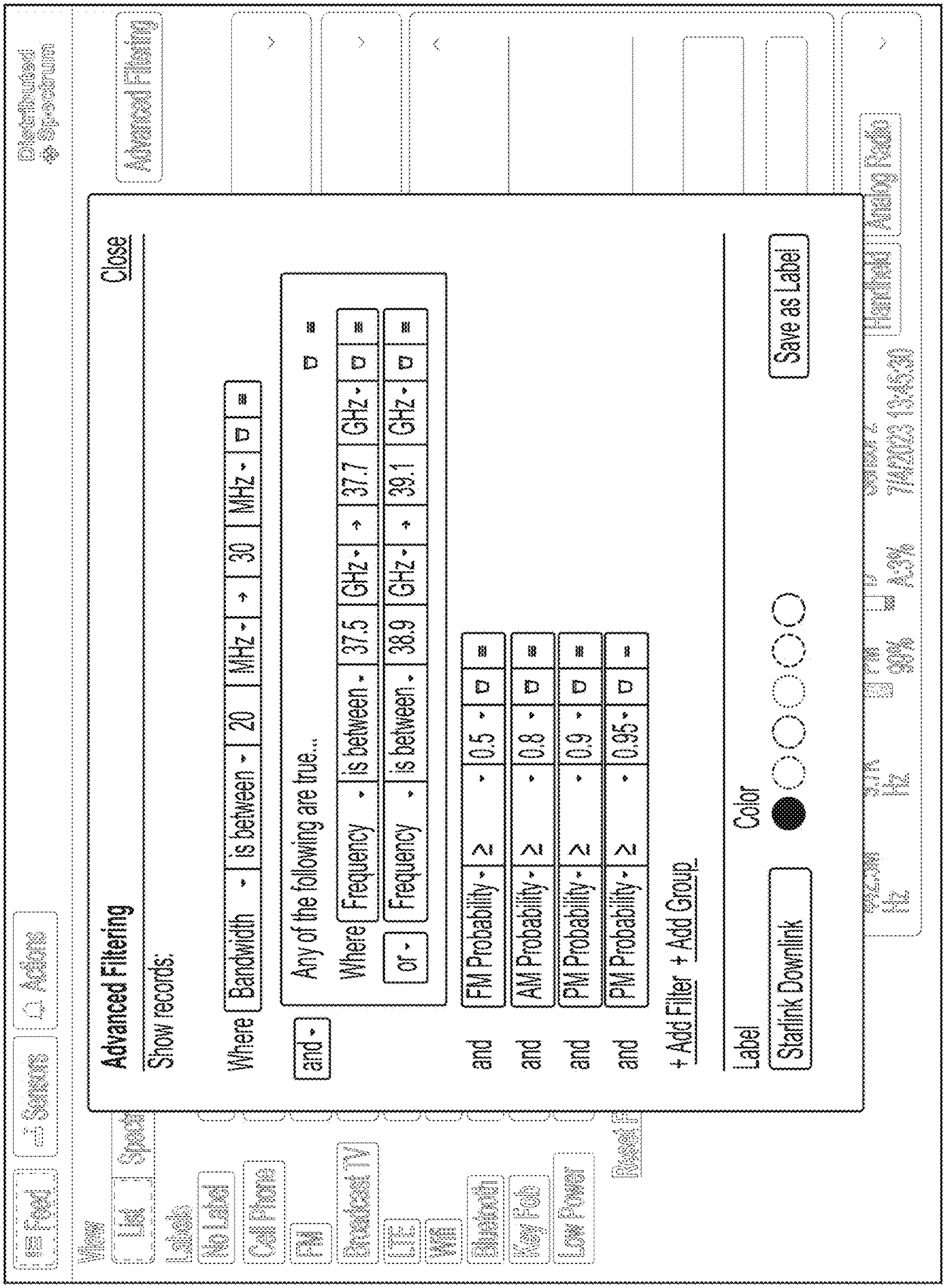
FIG. 34 is an example GUI screen that may be configured to create a filter for RF signals detected by a system described herein, according to some embodiments.

FIG. 34 is an example GUI screen that may be configured to create a category for RF signals detected by a system described herein, according to some embodiments.

The example GUI screen of FIG. 34 shows an option for a user to designate upper and lower frequency bounds for a category that may be used to filter a list of RF signal entries in the List (FIG. 32). The screen of FIG. 34 may be reached by selecting the Advanced Filtering option in the List. Multiple filters may be used at once by using the Add Filter or Add Group option(s). For example, in FIG. 34, a bandwidth filter is intersected (e.g., ANDed) with a union (e.g., OR) of frequency filters, further intersected with modulation probability filters (e.g., which may be used to set thresholds on associated confidence metrics). Other types of filters may be applied in various manners using the dropdown options within the Advanced Filtering window. In the example shown in FIG. 34, the set of filters applied on screen may be saved as a category ("Label") such that detected and/or previously recorded signals satisfying the filter criteria will be automatically categorized in the interface. In some embodiments, applying categories on RF signal encodings (e.g., vector representations) may be more computationally efficient for analyzing and/or consolidating RF signals to be presented to a user than performing analysis directly on underlying RF radiation data (e.g., digital samples) including the RF signals, such as where a large quantity of RF signals are recorded in a database (e.g., over a long period of time, over a large frequency range, and/or upon very frequent scanning), such as may result in gigabytes or more of underlying RF radiation data.

Figure 35:
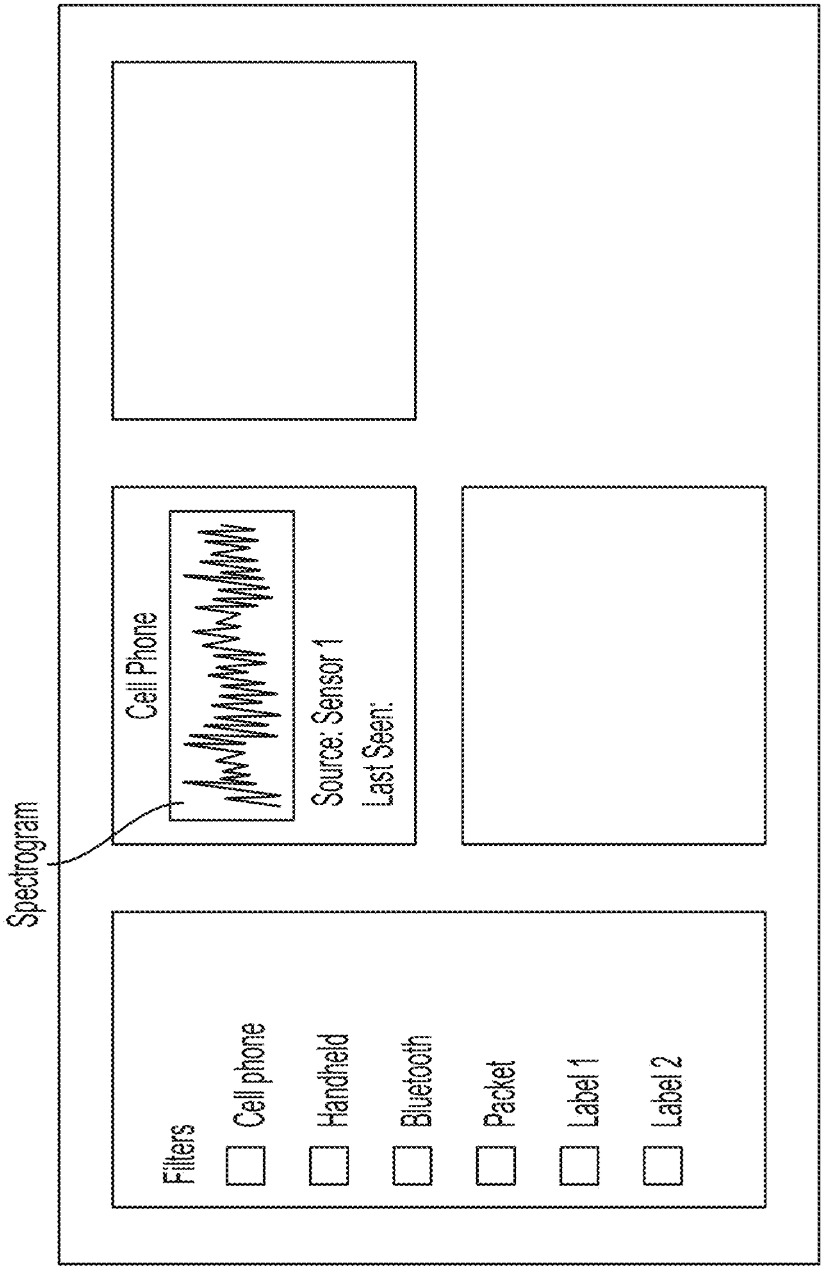
FIG. 35 is an alternative example GUI screen that may be configured to display a list of RF signals detected by a system described herein, according to some embodiments.

FIG. 35 is an alternative example GUI screen that may be configured to display a list of RF signals detected by a system described herein, according to some embodiments.

The example GUI screen of FIG. 35 provides an alternative view of RF signal entries shown as tiles, each including a spectrogram and characteristics, with a filter option on the left panel (e.g., as described herein in connection with FIG. 32). In some embodiments, a spectrogram may be alternatively or additionally viewable for an RF signal entry shown in the GUI screens of FIGS. 32 and/or 33 by expanding an RF signal entry in the list. In some embodiments, the spectrogram may be generated onboard the RF sensor and/or decoded from an encoded signal provided (e.g., to an aggregator) by the RF sensor using techniques described herein.

Figure 36:
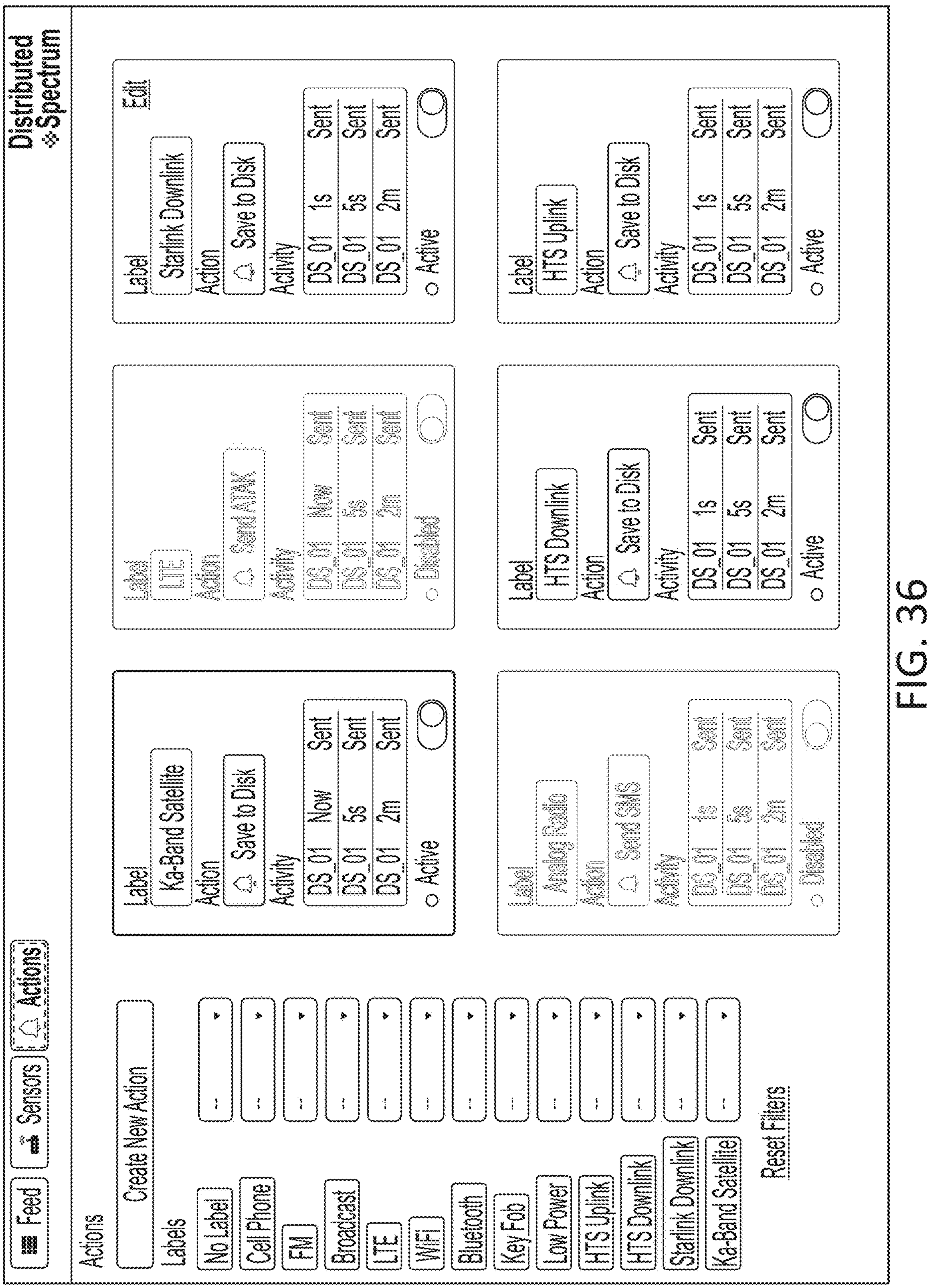
FIG. 36 is an example GUI screen that may be configured to display currently configured actions in response to reporting of RF sources detected by a system described herein, according to some embodiments.

FIG. 36 is an example GUI screen that may be configured to display currently configured actions in response to reporting of RF sources detected by a system described herein, according to some embodiments.

Figure 37:
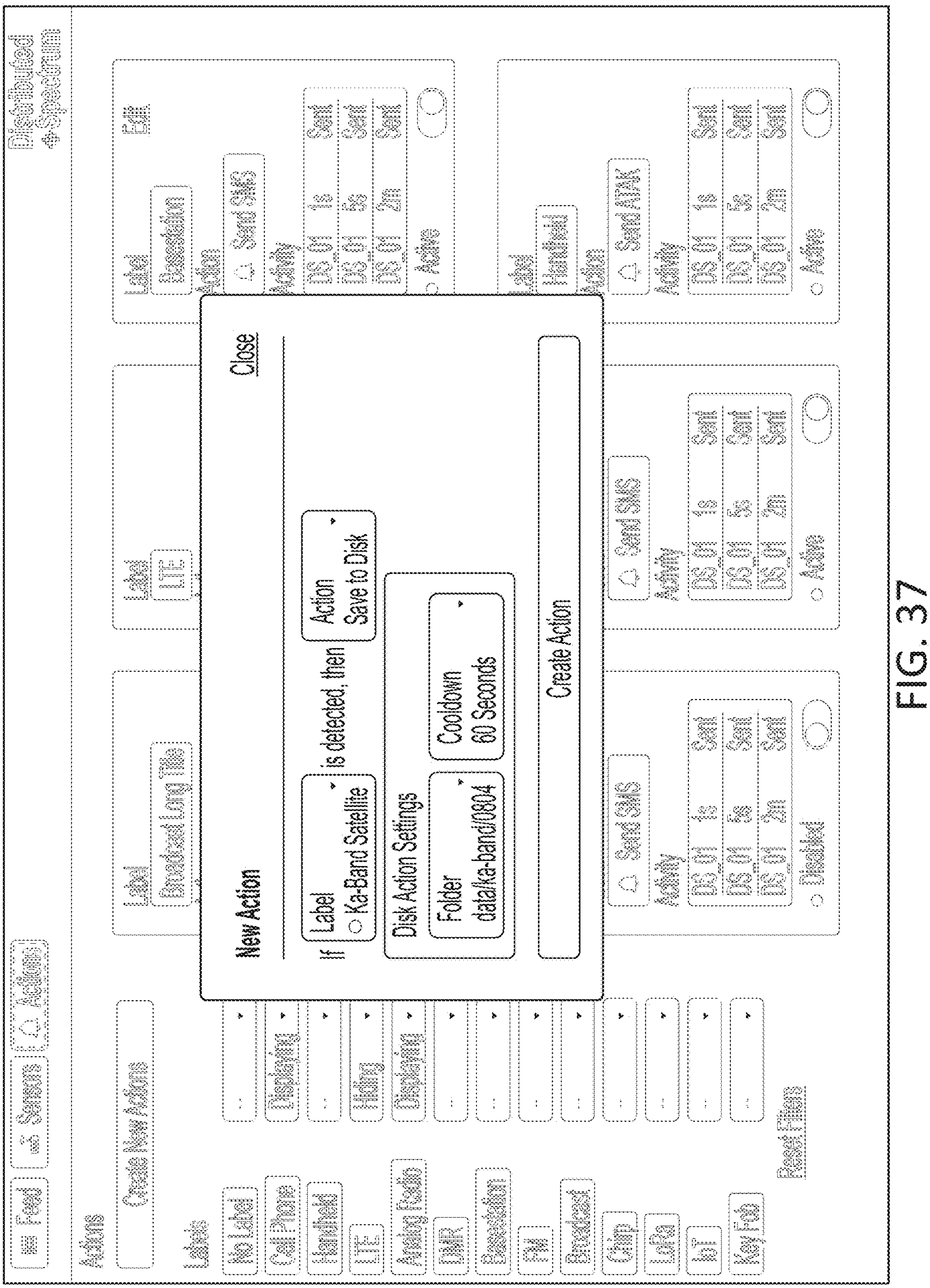
FIG. 37 is an example GUI screen that may be configured to control actions in response to reporting of RF sources detected by a system described herein, according to some embodiments.

The example GUI screen of FIG. 36 includes a number of action tiles each corresponding to an RF source category from the list of categories shown in the left panel. For instance, selecting an action tile such as the selected Ka-Band Satellite category action tile shown in the figure may cause an action rule window to appear in front of the tiles, such as shown in FIG. 37. In some embodiments, the GUI screen shown in FIG. 36 may be reached by selecting the Actions tab shown at the top of the illustrated GUI screen while viewing the Feed or Sensors tab. In some embodiments, the actions tab may be made suitable for displaying on a small screen, such as a mobile device screen, suitable for interaction with a user deployed in the field (e.g., a battlefield) without a full size computer, laptop computer, or even a tablet, though the actions tab may be made suitable for any screen and/or computer type depending on the implementation.

FIG. 37 is an example GUI screen that may be configured to control actions in response to reporting of RF sources detected by a system described herein, according to some embodiments.

The example GUI screen of FIG. 37 includes customizable actions may be configured to trigger upon detection by the system of an RF source within a category (e.g., determined to match the category by an aggregator). As shown, RF radiation data and/or RF signal data may be saved to local memory of the RF sensor and/or of the computer executing the interface upon detecting an RF signal from a source categorized as Ka-Band Satellite. For instance, the category may be used as a constraint sent to the RF sensor for determining whether to save digital samples and/or a vector representation of an RF signal to non-volatile memory. Alternatively or additionally, such a constraint may be used to determine whether the RF sensor should transmit digital samples, a vector representation, and/or an indication of characteristics (e.g., center frequency, bandwidth) for aggregation. In another example, where the action includes an alert, the type of alert (e.g., send SMS, send ATAK) may be customized using the action dropdown list. In the case of an alert, the duration in which the alert persists may be customized using a timeout option.

Figure 38:
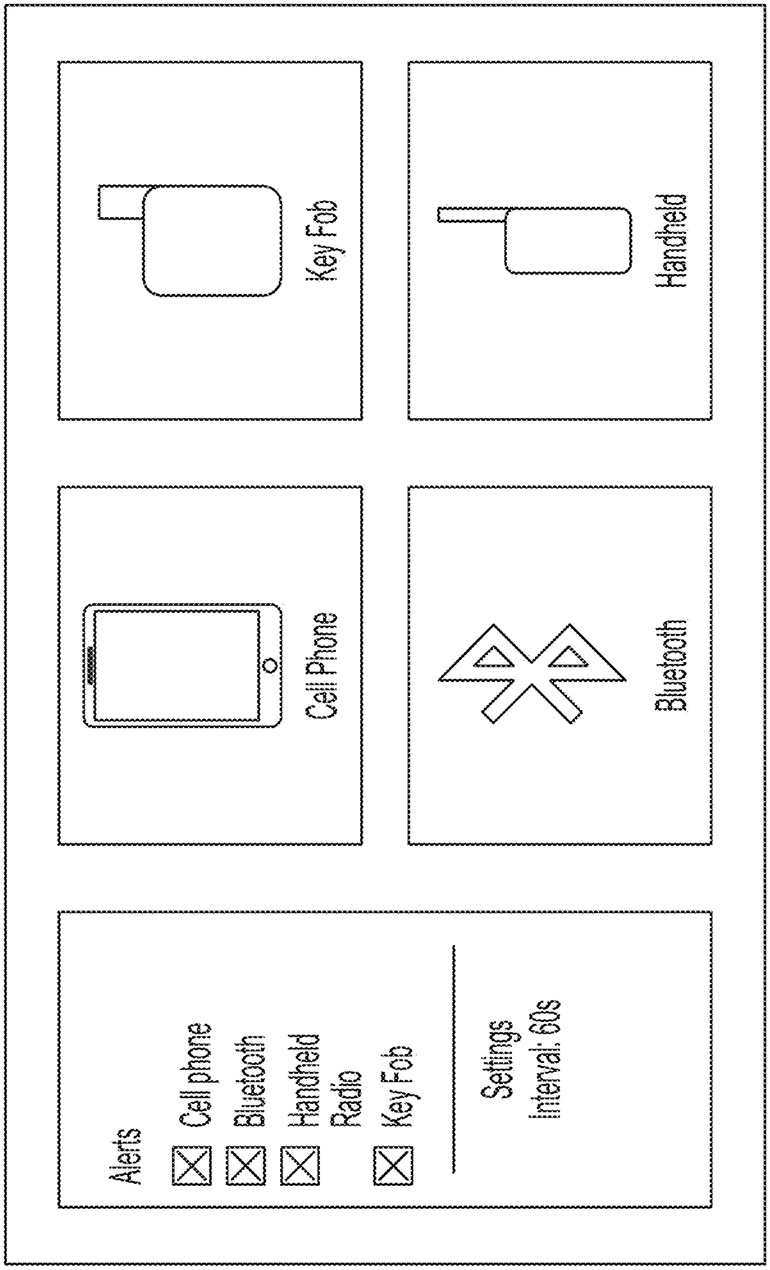
FIG. 38 is an alternative example GUI screen that may be configured to control actions in response to reporting of RF sources detected by a system described herein, according to some embodiments.

FIG. 38 is an alternative example GUI screen that may be configured to control actions in response to reporting of RF sources detected by a system described herein, according to some embodiments.

The example GUI screen of FIG. 38 provides an alternative view of action tiles in which actions for particular RF source categories may be selected using the options in the left panel. In some embodiments, selecting one of the action tiles shown in FIG. 38 may transition to a more complex option configuration screen such as shown in FIG. 37.

Figure 39:
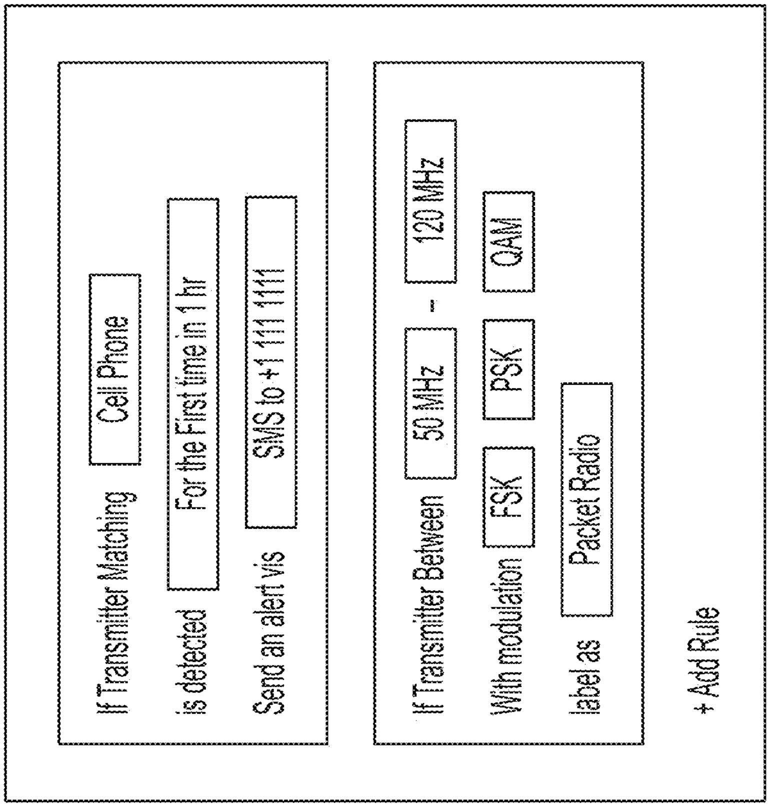
FIG. 39 is an example GUI screen that may be configured to create user-defined rules for reporting of RF sources detected by a system described herein, according to some embodiments.

FIG. 39 is an example GUI screen that may be configured to create user-defined action rules for reporting of RF sources detected by a system described herein, according to some embodiments.

The example GUI screen of FIG. 39 provides action rule customization for a particular RF source category. For instance, action rules may be unique to an RF source category and may be triggered based at least in part on any one or each of detection timing, frequency, modulation, and/or other characteristics. In some embodiments, such as shown in FIG. 39, an action rule may further include circumstances under which to replace and/or add an RF source category, such as based on characteristics determined by the system (e.g., onboard the RF sensor and/or by an aggregator).

In some embodiments, actions available for user selection may include jamming a detected and/or localized RF source, such as where the system is integrated (e.g., over a communication network) with a programmable jamming device. For example, the jamming device may be operated to jam a particular frequency predicted to be in use by the RF source based on RF signal detection and/or RF source classification and/or localization described herein. Another example of an action available for user selection may include initiating navigational guidance towards a predicted location of an RF source and/or a location and/or path along which a detected RF signal is predicted to be received at all and/or with higher power and/or SNR than other locations and/or paths. For instance, a vehicle operator may have the option of having guided navigation displayed in a vehicle control interface, and/or a person operating a mobile device may have the option of having guided navigation displayed on a map in a user interface of the mobile device.

VII. LISTING OF CERTAIN EXAMPLE ASPECTS

According to a first example aspect, an RF source localization system comprises a processor operatively coupled to memory and configured to generate a graphical user interface (GUI) displaying an indication of a predicted location of an RF source and an indication of a location of an RF sensor, wherein the predicted location of the RF source is based on one or more RF signals transmitted by the RF source and received by the RF sensor.

In some embodiments, the indication of the location of the RF sensor comprises a member selected from the group consisting of: a location of a vehicle and/or person co-located with the RF sensor; a location of a vehicle co-located with the RF sensor derived from a global navigational satellite system (GNSS) device onboard the vehicle; and a known location of the RF sensor stored in the memory.

In some embodiments, the predicted location of the RF source is obtained using RF radiation data generated by the RF sensor in response to receiving the one or more RF signals.

In some embodiments, the predicted location of the RF source is obtained using an output of a trained model generated in response to the trained model receiving the RF radiation data as an input.

In some embodiments, the output of the trained model is generated in response to the trained model further receiving an indication of the location of the RF sensor.

In some embodiments, the predicted location comprises a probability distribution over a geographical area.

In some embodiments, the GUI further displays an indication of a signal metric of a first RF signal of the one or more RF signals, the signal metric comprising a signal-to-noise ratio (SNR) of the first RF signal.

In some embodiments, the GUI further displays at least a portion of a spectrogram that includes the one or more RF signals.

In some embodiments, the GUI further comprises a filter option permitting a user to select one or more types of RF sources for which to display a predicted location.

In some embodiments, the system further comprising the RF sensor, wherein the processor is configured to receive RF radiation data from the RF sensor over a communication network and determine the predicted location using the RF radiation data, and/or the processor is configured to receive the predicted location from another processor that is configured to receive the RF radiation data from the RF sensor over the communication network.

In some embodiments, the processor is configured to receive the predicted location of the RF source over a communication network via an application programming interface (API), and the processor is further configured to receive the location of the RF sensor via the API.

Further according to the first example aspect, a method of localizing an RF source comprises: generating, by a processor operatively coupled to memory, a graphical user interface (GUI) displaying an indication of a predicted location of an RF source and an indication of a location of an RF sensor, wherein the predicted location of the RF source is based on one or more RF signals transmitted by the RF source and received by the RF sensor.

In some embodiments, the indication of the location of the RF sensor comprises a member selected from the group consisting of: a location of a vehicle and/or person co-located with the RF sensor; a location of a vehicle co-located with the RF sensor derived from a global navigational satellite system (GNSS) device onboard the vehicle; and a known location of the RF sensor stored in the memory.

In some embodiments, the predicted location of the RF source is obtained using RF radiation data generated by the RF sensor in response to receiving the one or more RF signals.

In some embodiments, the predicted location of the RF source is obtained using an output of a trained model generated in response to the trained model receiving the RF radiation data as an input.

In some embodiments, the output of the trained model is generated in response to the trained model further receiving an indication of the location of the RF sensor.

In some embodiments, the predicted location comprises a probability distribution over a geographical area.

In some embodiments, the GUI further displays an indication of a signal metric of a first RF signal of the one or more RF signals, the signal metric comprising a signal-to-noise ratio (SNR) of the first RF signal.

In some embodiments, the GUI further displays at least a portion of a spectrogram that includes the one or more RF signals.

In some embodiments, the GUI further comprises a filter option permitting a user to select one or more types of RF sources for which to display a predicted location.

In some embodiments, the method further comprises performing a step selected from the group consisting of: receiving, by the processor, RF radiation data from the RF sensor over a communication network and determining the predicted location using the RF radiation data; and receiving, by the processor, the predicted location from another processor that receives the RF radiation data from the RF sensor over the communication network.

In some embodiments, the predicted location of the RF source is received over a communication network via an application programming interface (API) and the method further comprises receiving, by the processor, the location of the RF sensor via the API.

According to a second example aspect, an RF source localization method comprises: obtaining RF radiation data indicating characteristics of RF radiation received by an RF sensor; obtaining vehicle data indicating a position, orientation, and/or speed of a vehicle onboard which the RF sensor is located; inputting the RF radiation data and the vehicle data to a trained model; and based on an output from the trained model, localizing an RF source of an RF signal that is present among the RF radiation data.

According to the second example aspect, an RF source localization system comprises: a processor operatively coupled to memory and configured to: obtain RF radiation data indicating characteristics of RF radiation received by an RF sensor; obtain vehicle data indicating a position, orientation, and/or speed of a vehicle onboard which the RF sensor is located; input the RF radiation data and the vehicle data to a trained model; and based on an output from the trained model, localize an RF source of an RF signal that is present among the RF radiation data.

In some embodiments, the vehicle data indicates the position, orientation, and/or speed of the vehicle at a time of reception of the RF radiation data by the RF sensor.

In some embodiments, the vehicle data comprises at least one of: global navigation satellite system (GNSS) signals and/or position data derived therefrom; vehicle orientation data indicating a bearing and/or elevation of the vehicle; and/or speed sensor data indicating the speed of the vehicle.

In some embodiments, the vehicle data comprises the vehicle orientation data indicating the bearing of the vehicle and the processor is further configured to input to the trained mode directivity data of the RF sensor in a direction of the bearing of the vehicle.

In some embodiments, the RF radiation data comprises samples of the RF radiation that include the RF signal.

In some embodiments, the RF source of the RF signal is localized with respect to a position of the vehicle indicated in and/or derived from at least a portion of the vehicle data.

In some embodiments, the system or method further comprises the RF sensor, wherein the RF sensor comprises an RF antenna configured to receive the RF radiation and the processor coupled to the RF antenna to receive the RF radiation data and further coupled to the vehicle to receive the vehicle data.

According to a third example aspect, an RF signal-based navigation method comprises: obtaining RF radiation data indicating characteristics of RF radiation received by an RF sensor; obtaining vehicle data indicating a position, orientation, and/or speed of a vehicle onboard which the RF sensor is located; inputting the RF radiation data and the vehicle data into a trained model; and based on an output from the trained model, performing a step selected from the group consisting of: instructing a control system of the vehicle to adjust vehicle movement in response to localizing an RF source of an RF signal detected among the RF radiation data; and providing information to an interface of the vehicle for directionally guiding an operator of the vehicle toward at least one of: a location of an RF source of the RF signal detected among the RF radiation data; and/or a location at which an RF signal is predicted to be received from an RF source of the RF signal.

According to the third example aspect, an RF signal-based navigation system, comprises: a processor operatively coupled to memory and configured to: obtain RF radiation data indicating characteristics of RF radiation received by an RF sensor; obtain vehicle data indicating a position, orientation, and/or speed of a vehicle onboard which the RF sensor is located; input the RF radiation data and the vehicle data to a trained model; and based on an output from the trained model, perform a step selected from the group consisting of: instructing a control system of the vehicle to adjust vehicle movement in response to localizing an RF source of an RF signal detected among the RF radiation data; and providing information to an interface of the vehicle for directionally guiding an operator of the vehicle toward at least one of: a location of an RF source of an RF signal detected among the RF radiation data; and/or a location at which an RF signal is predicted to be received from an RF source of the RF signal.

In some embodiments, wherein providing information to the interface of the vehicle is performed, and the location is one at which an RF signal is predicted to be received from an RF source of the RF signal, and the information directionally guides the operator along a different navigational path along which the RF signal is predicted to be received with a higher power level than along a previous navigational path.

Other example aspects are described above and/or in the attached claim listing.

VIII. CONCLUSION

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in any of numerous ways. One or more aspects and embodiments of the present disclosure involving the performance of processes or methods may utilize program instructions executable by a device (e.g., a computer, a processor, or other device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above. The computer readable medium or media may be transportable, such that the program or programs stored thereon may be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present disclosure need not reside on a single computer or processor, but may be distributed in a modular fashion among a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more input and output devices. These devices may be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately" and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value.

The invention claimed is:

1. A radio frequency (RF) sensing method, comprising:
by a processor, operatively coupled to memory, of an RF sensor that further comprises an RF antenna:
receiving a constraint over a communication network;
receiving RF radiation via the RF antenna, the RF radiation including an RF signal;
inputting RF radiation data of the RF radiation, to a trained model; and
based on an output from the trained model indicating that the RF signal satisfies the constraint, performing a processing step selected from the group consisting of:
storing, in memory, a vector representation of the RF signal and/or digital samples of the RF signal; and
transmitting, over the communication network, a vector representation of the RF signal, an indication of a characteristic of the RF signal, and/or digital samples of the RF signal.

2. The RF sensing method of claim 1, wherein the processing step comprises storing the vector representation and/or the digital samples of the RF signal in non-volatile memory.

3. The RF sensing method of claim 1, wherein the output of the trained model comprises the vector representation of the RF signal, and the vector representation is compressed with respect to the RF radiation data.

4. The RF sensing method of claim 1, wherein the constraint comprises a reference vector representation of a reference RF signal and/or the constraint comprises a filter on content in dimensions of the vector representation of the RF signal.

5. The RF sensing method of claim 4, wherein the constraint comprises the reference vector representation and the processing step is performed based on content in dimensions of the vector representation of the RF signal being within a predetermined vector-based distance of content in dimensions of the reference vector representation.

6. The RF sensing method of claim 4, wherein the constraint comprises a filter on content in dimensions of the vector representation and the processor performs the processing step based on the content in the dimensions of the vector representation satisfying the constraint.

7. The RF sensing method of claim 6, wherein the constraint comprises the content being within a predetermined vector-based distance of a vector space.

8. The RF sensing method of claim 1, wherein:
the constraint constrains the characteristic of the RF signal; and
the processing step is performed in response to the processor determining, using content in dimensions of the vector representation, that the characteristic of the RF signal satisfies the constraint.

9. The RF sensing method of claim 1, wherein the processing step comprises transmitting, over the communication network, the indication of the characteristic of the RF signal, and the characteristic is selected from the group consisting of:
modulation type of the RF signal;
pulse rate of the RF signal;
signal-to-noise ratio (SNR) of the RF signal;
type and/or location of an RF source that transmitted the RF signal;
confidence metric of the RF signal being analog and/or digital;
confidence metric of the RF signal matching another RF signal;
confidence metric of the RF signal being amplitude modulated (AM);
confidence metric of the RF signal being frequency modulated (FM);
confidence metric of the RF signal being a chirp;
confidence metric of the RF signal being frequency-shift keyed (FSK);
confidence metric of the RF signal being amplitude-shift keyed (ASK);
confidence metric of the RF signal being phase-shift keyed (PSK);
confidence metric of the RF signal being a chirp spread spectrum (CSS); and
confidence metric of the RF signal being constellation modulated.

10. The RF sensing method of claim 9, wherein the output of the trained model comprises the vector representation of the RF signal, and the RF sensing method further comprises determining the characteristic using content in dimensions of the vector representation of the RF signal.

11. A radio frequency (RF) sensor, comprising:
an RF antenna; and
a processor operatively coupled to memory and configured to:
receive a constraint over a communication network;
receive RF radiation via the RF antenna, the RF radiation including an RF signal;
input RF radiation data of the RF radiation, to a trained model; and
based on an output from the trained model indicating that the RF signal satisfies the constraint, perform a processing step selected from the group consisting of:
storing, in memory, a vector representation of the RF signal and/or digital samples of the RF signal; and
transmitting, over the communication network, a vector representation of the RF signal, an indication of a characteristic of the RF signal, and/or digital samples of the RF signal.

12. The RF sensor of claim 11, wherein the processor is configured to store the vector representation and/or the digital samples of the RF signal in non-volatile memory.

13. The RF sensor of claim 11, wherein the output of the trained model comprises the vector representation of the RF signal, and the vector representation is compressed with respect to the RF radiation data.

14. The RF sensor of claim 11, wherein the constraint comprises a reference vector representation of a reference RF signal and/or the constraint comprises a filter on content in dimensions of the vector representation of the RF signal.

15. The RF sensor of claim 14, wherein the constraint comprises the reference vector representation and the processor is configured to perform the processing step based on content in dimensions of the vector representation of the RF signal being within a predetermined vector-based distance of content in dimensions of the reference vector representation.

16. The RF sensor of claim 14, wherein the constraint comprises a filter on content in dimensions of the vector representation and the processor is configured to perform the processing step based on the content in the dimensions of the vector representation satisfying the constraint.

17. The RF sensor of claim 16, wherein the constraint comprises the content being within a predetermined vector-based distance of a vector space.

18. The RF sensor of claim 11, wherein:

the constraint constrains the characteristic of the RF signal; and the processor is configured to perform the processing step in response to determining, using content in dimensions of the vector representation, that the characteristic of the RF signal satisfies the constraint.

19. The RF sensor of claim 11, wherein the processing step comprises transmitting, over the communication network, the indication of the characteristic of the RF signal, and the characteristic is selected from the group consisting of:

modulation type of the RF signal;

pulse rate of the RF signal;

signal-to-noise ratio (SNR) of the RF signal;

type and/or location of an RF source that transmitted the RF signal;

confidence metric of the RF signal being analog and/or digital;

confidence metric of the RF signal matching another RF signal;

confidence metric of the RF signal being amplitude modulated (AM);

confidence metric of the RF signal being frequency modulated (FM);

confidence metric of the RF signal being a chirp;

confidence metric of the RF signal being frequency-shift keyed (FSK);

confidence metric of the RF signal being amplitude-shift keyed (ASK);

confidence metric of the RF signal being phase-shift keyed (PSK);

confidence metric of the RF signal being a chirp spread spectrum (CSS); and confidence metric of the RF signal being constellation modulated.

20. The RF sensor of claim 19, wherein the output of the trained model comprises the vector representation of the RF signal, and the processor is configured to determine the characteristic using content in dimensions of the vector representation of the RF signal.

* * * * *